US012568471B2

(12) United States Patent
Liu et al.

(10) Patent No.: US 12,568,471 B2
(45) Date of Patent: Mar. 3, 2026

(54) METHOD AND DEVICE IN NODES USED FOR WIRELESS COMMUNICATION

(71) Applicant: BUNKER HILL TECHNOLOGIES LLC, Allen, TX (US)

(72) Inventors: Jin Liu, Shanghai (CN); Qi Jiang, Shanghai (CN); Xiaobo Zhang, Shanghai (CN)

(73) Assignee: BUNKER HILL TECHNOLOGIES LLC, Allen, CA (US)

( * ) Notice: Subject to any disclaimer, the term of this patent is extended or adjusted under 35 U.S.C. 154(b) by 509 days.

(21) Appl. No.: 18/131,882

(22) Filed: Apr. 7, 2023

(65) Prior Publication Data

US 2023/0247588 A1 Aug. 3, 2023

Related U.S. Application Data

(63) Continuation of application No. PCT/CN2021/120819, filed on Sep. 27, 2021.

(30) Foreign Application Priority Data

Oct. 9, 2020 (CN) .......................... 202011071338.8
Oct. 27, 2020 (CN) .......................... 202011163311.1

(51) Int. Cl.
*H04W 72/00* (2023.01)
*H04W 72/02* (2009.01)
(Continued)

(52) U.S. Cl.
CPC ....... *H04W 72/02* (2013.01); *H04W 72/0446* (2013.01); *H04W 72/0453* (2013.01); *H04W 72/563* (2023.01)

(58) Field of Classification Search
CPC ... H04W 72/02; H04W 72/563; H04W 72/25; H04W 74/002; H04W 74/0816; H04L 5/0094
See application file for complete search history.

(56) References Cited

U.S. PATENT DOCUMENTS

2021/0320777 A1* 10/2021 Dutta ..................... H04W 72/04
2022/0394697 A1* 12/2022 Kim ........................ H04B 7/088

FOREIGN PATENT DOCUMENTS

CN 111148129 A 5/2020
CN 111182632 A 5/2020
(Continued)

OTHER PUBLICATIONS

ISR received in application No. PCT/CN2021/120819 dated Jan. 7, 2022.

*Primary Examiner* — Lan-Huong Truong
(74) *Attorney, Agent, or Firm* — Ascenda Law Group, PC

(57) ABSTRACT

Present application provides a method and device in a node for wireless communications. A first node receives a first signaling; executes channel sensing in a first resource pool; and transmits a third signaling; any first-type time-frequency resource block in the first resource pool occupies L frequency-domain resource unit(s) in frequency domain; the first signaling indicates L and a first priority; a first time-frequency resource block has an overlapping with time-frequency resources occupied by a first reference signal; the first priority and the second priority are used together to determine a first threshold; a measurement performed on the first reference signal and the first threshold are used together to determine whether a second time-frequency resource block belongs to a first candidate resource pool, and the second time-frequency resource block is associated with the first time-frequency resource block. The present application effectively implements inter-user coordination, which avoids continuous interference between users.

20 Claims, 9 Drawing Sheets

(51) Int. Cl.
H04W 72/0446 (2023.01)
H04W 72/0453 (2023.01)
H04W 72/563 (2023.01)

(56) References Cited

FOREIGN PATENT DOCUMENTS

| | | | | |
|---|---|---|---|---|
| CN | 111436109 A | 7/2020 | | |
| EP | 3297358 A1 * | 3/2018 | ............ | H04W 72/20 |
| WO | WO-2019031926 A1 * | 2/2019 | ............ | H04W 72/56 |
| WO | 2020160566 A1 | 8/2020 | | |
| WO | WO-2021060936 A1 * | 4/2021 | ............ | H04W 72/20 |

* cited by examiner

METHOD AND DEVICE IN NODES USED FOR WIRELESS COMMUNICATION

CROSS REFERENCE TO RELATED APPLICATIONS

This application is the continuation of the international patent application No. PCT/CN2021/120819, filed on Sep. 27, 2021, which claims the priority benefit of Chinese Patent Application No. 202011071338.8, field on Sep. 9, 2020, and claims the priority benefit of Chinese Patent Application No. 202011163311.1, filed on Oct. 27, 2020, the full disclosure of which is incorporated herein by reference.

BACKGROUND

Technical Field

The present application relates to transmission methods and devices in wireless communication systems, and in particular to a transmission scheme and device related to sidelink in wireless communication.

Related Art

Starting from Long Term Evolution (LTE), 3rd Generation Partner Project (3GPP) has been developing sidelink (SL) as a direct communication method between users, and has completed a first New Radio (NR) SL standard of "5G V2X with NR Sidelink" in Release-16 (Rel-16). In Rel-16, the NR SL is mainly designed for Vehicle-To-Everything (V2X), but it can also be used for Public Safety.

While due to time constraints, the NR SL Rel-16 cannot fully support traffic requirements and work scenarios identified by 3GPP for 5G V2X. Therefore, the NR SL is enhanced in Rel-17 in 3GPP.

SUMMARY

In Rel-16 system, due to the distributed system of NR SL, a User Equipment (UE) can select resources independently, the problem of half duplex (that is, a user cannot transmit and receive simultaneously) or a hidden UE can easily lead to a pair of users or multiple users selecting same SL resources to transmit a signal, thereby causing continuous interferences and resource collision between users. Enhancing inter-UE coordination is a feasible way to solve resource collision between UEs. However, how to effectively implement inter-user coordination, minimize resource overhead, and reduce latency requirements remains to be studied.

In response to the above issues, the present application discloses a specific method for SL inter-user coordination, which effectively reduces resource overhead and latency requirements. It should be noted that the embodiments in a User Equipment (UE) in the present application and characteristics of the embodiments may be applied to a base station if no conflict is incurred, and vice versa. And the embodiments in the present application and the characteristics in the embodiments can be arbitrarily combined if there is no conflict. Though originally targeted at SL, the present application is also applicable to uplink (UL). Though originally targeted at single-carrier communications, the present application is also applicable to multicarrier communications. Though originally targeted at single-antenna communications, the present application is also applicable to multi-antenna communications. Besides, the present application is not only targeted at scenarios of V2X scenarios, but also at communication scenarios between terminals and base stations, terminals and relays as well as relays and base stations where similar technical effect can be achieved. Additionally, the adoption of a unified solution for various scenarios, including but not limited to V2X scenarios and communication scenarios between terminals and base stations, contributes to the reduction of hardware complexity and costs.

It should be noted that interpretations of the terminology in the present application refer to definitions given in the 3GPP TS36 series, TS37 series, TS38 series, as well as definitions given in Institute of Electrical and Electronics Engineers (IEEE) protocol specifications.

The present application provides a method in a first node for wireless communications, comprising:

receiving a first signaling;

executing channel sensing in a first resource pool; and transmitting a third signaling;

herein, the first resource pool comprises M first-type time-frequency resource blocks, any of the M first-type time-frequency resource blocks occupies L continuous frequency-domain resource unit(s) in frequency domain, M being a positive integer greater than 1, L being a positive integer; the first signaling indicates L, and the first signaling comprises a first priority; the channel sensing comprises receiving a second signaling, the second signaling comprises a second priority, the second signaling indicates time-frequency resources occupied by a first reference signal, at least one of the M first-type time-frequency resource blocks is overlapped with time-frequency resources occupied by the first reference signal; a first time-frequency resource block is a first-type time-frequency resource block overlapping with time-frequency resources occupied by the first reference signal among the M first-type time-frequency resource blocks; a transmitter of the first signaling and a transmitter of the second signaling are non-co-located; the first priority and the second priority are used together to determine a first threshold; the channel sensing comprises measuring a first reference signal, a measurement performed on the first reference signal and the first threshold are used together to determine whether a second time-frequency resource block belongs to a first candidate resource pool, and the second time-frequency resource block is associated with the first time-frequency resource block; the first candidate resource pool comprises N second-type time-frequency resource block(s), and any of the N second-type time-frequency resource block(s) is associated with one of the M first-type time-frequency resource blocks, N being a positive integer; the third signaling is used to indicate the first candidate resource pool.

In one embodiment, a problem to be solved in the present application is: resource collisions and continuous interference problems between users incurred by user's independent selection of resources.

In one embodiment, a method in the present application is: effectively triggering a receiving user to assist in channel sensing.

In one embodiment, a method in the present application is: establishing an association between a first priority and a second priority.

In one embodiment, a method in the present application is: establishing an association between a received first signaling, a received second signaling and channel sensing.

In one embodiment, a method in the present application is: establishing an association between a received first priority, a received second priority and a first threshold.

In one embodiment, the above method is characterized in that a first signaling only carries a first priority and a number of needed continuous frequency-domain resource unit(s), L, without carrying any resource scheduling information.

In one embodiment, the above method is characterized in that two received priorities, a first priority and a second priority, are used to determine a first threshold and execute channel sensing.

In one embodiment, the above method is characterized in that inter-user coordination is effectively executed while ensuring resource overhead and latency requirements, thereby avoiding resource collisions and continuous interference between users.

According to one aspect of the present application, the above method is characterized in comprising:

monitoring a fourth signaling in a first receiving resource pool; and receiving a first radio signal on a third time-frequency resource block;

herein, the first receiving resource pool comprises X third-type time-frequency resource block(s), and the third time-frequency resource block is one of the X third-type time-frequency resource block(s); the fourth signaling indicates the third time-frequency resource block, and the fourth signaling comprises the first priority; the N second-type time-frequency resource block(s) comprised in the first candidate resource pool is (are respectively) associated with N third-type time-frequency resource block(s) in the first receiving resource pool, X being a positive integer not less than N.

According to one aspect of the present application, the above method is characterized in that the third signaling comprises N third-type sub-signaling(s); the N third-type sub-signaling(s) is (are respectively) transmitted on the N second-type time-frequency resource block(s) comprised in the first candidate resource pool.

According to one aspect of the present application, the above method is characterized in comprising:

receiving a target signaling;

herein, the target signaling comprises a first field, and the first field in the target signaling indicates one of a positive integer number of first-type value(s) or a positive integer number of second-type value(s);

when the first field in the target signaling indicates one of a positive integer number of first-type value(s), the target signaling is the first signaling, and the target signaling is used to trigger a transmission of the third signaling;

when the second field in the target signaling indicates one of the positive integer number of second-type value(s), the target signaling is the second signaling, the target signaling is used to schedule a second data block, the second data block is used to generate a second radio signal, and the second radio signal comprises the first reference signal.

According to one aspect of the present application, the above method is characterized in that the first node is a UE.

According to one aspect of the present application, the above method is characterized in that the first node is a relay node.

According to one aspect of the present application, the above method is characterized in that the first node is a base station.

The present application provides a method in a second node for wireless communications, comprising:

transmitting a first signaling; and receiving a third signaling;

herein, the first signaling comprises a first priority, and the first priority is a priority of a first data block; time-frequency resources reserved for the first data block comprise L continuous frequency-domain resource unit(s) in frequency domain, and the first signaling is used to indicate L, L being a positive integer; the first signaling is not used to schedule the first data block; the third signaling indicates a first candidate resource pool, and the first candidate resource pool comprises N second-type time-frequency resource block(s), N being a positive integer.

According to one aspect of the present application, the above method is characterized in comprising:

transmitting a fourth signaling; and transmitting a first radio signal on a third time-frequency resource block;

herein, the fourth signaling comprises the first priority, the fourth signaling is used to indicate the third time-frequency resource block, and the third time-frequency resource block comprises L continuous frequency-domain resource unit(s) in frequency domain; the third time-frequency resource block is associated with a second time-frequency resource block, and the second time-frequency resource block is one of the N second-type time-frequency resource block(s) comprised in the first candidate resource pool; the first data block is used to generate the first radio signal.

According to one aspect of the present application, the above method is characterized in that the third signaling comprises N third-type sub-signaling(s); the N third-type sub-signaling(s) is (are respectively) received on the N second-type time-frequency resource block(s) comprised in the first candidate resource pool.

According to one aspect of the present application, the above method is characterized in that the first signaling comprises a first field, the first field in the first signaling indicates one of a positive integer number of first-type value(s), and the first signaling is used to trigger a reception of the third signaling.

According to one aspect of the present application, the above method is characterized in that the second node is a UE.

According to one aspect of the present application, the above method is characterized in that the second node is a relay node.

According to one aspect of the present application, the above method is characterized in that the second node is a base station.

The present application provides a method in a third node for wireless communications, comprising:

transmitting a second signaling and a first reference signal;

herein, the second signaling comprises a second priority, and the second signaling indicates time-frequency resources occupied by the first reference signal; the second signaling comprises a first field, the first field in the second signaling indicates one of a positive integer number of second-type value(s), the second signaling is used to schedule a second data block, the second data block is used to generate a second radio signal, and the second radio signal comprises the first reference signal.

According to one aspect of the present application, the above method is characterized in that the third node is a UE.

According to one aspect of the present application, the above method is characterized in that the third node is a relay node.

According to one aspect of the present application, the above method is characterized in that the third node is a base station.

The present application provides a first node for wireless communications, comprising:

a first receiver, receiving a first signaling; executing channel sensing in a first resource pool; and a first transmitter, transmitting a third signaling;

herein, the first resource pool comprises M first-type time-frequency resource blocks, any of the M first-type time-frequency resource blocks occupies L continuous frequency-domain resource unit(s) in frequency domain, M being a positive integer greater than 1, L being a positive integer; the first signaling indicates L, and the first signaling comprises a first priority; the channel sensing comprises receiving a second signaling, the second signaling comprises a second priority, the second signaling indicates time-frequency resources occupied by a first reference signal, at least one of the M first-type time-frequency resource blocks is overlapped with time-frequency resources occupied by the first reference signal; a first time-frequency resource block is a first-type time-frequency resource block overlapping with time-frequency resources occupied by the first reference signal among the M first-type time-frequency resource blocks; a transmitter of the first signaling and a transmitter of the second signaling are non-co-located; the first priority and the second priority are used together to determine a first threshold; the channel sensing comprises measuring a first reference signal, a measurement performed on the first reference signal and the first threshold are used together to determine whether a second time-frequency resource block belongs to a first candidate resource pool, and the second time-frequency resource block is associated with the first time-frequency resource block; the first candidate resource pool comprises N second-type time-frequency resource block(s), and any of the N second-type time-frequency resource block(s) is associated with one of the M first-type time-frequency resource blocks, N being a positive integer; the third signaling is used to indicate the first candidate resource pool.

The present application provides a second node for wireless communications, comprising:

a second transmitter, transmitting a first signaling; and a second receiver, receiving a third signaling; and herein, the first signaling comprises a first priority, and the first priority is a priority of a first data block; time-frequency resources reserved for the first data block comprise L continuous frequency-domain resource unit(s) in frequency domain, and the first signaling is used to indicate L, L being a positive integer; the first signaling is not used to schedule the first data block; the third signaling indicates a first candidate resource pool, and the first candidate resource pool comprises N second-type time-frequency resource block(s), N being a positive integer.

The present application provides a third node for wireless communications, comprising:

a third transmitter, transmitting a second signaling and a first reference signal;

herein, the second signaling comprises a second priority, and the second signaling indicates time-frequency resources occupied by the first reference signal; the second signaling comprises a first field, the first field in the second signaling indicates one of a positive integer number of second-type value(s), the second signaling is used to schedule a second data block, the second data block is used to generate a second radio signal, and the second radio signal comprises the first reference signal.

In one embodiment, the present application is advantageous in the following aspects:

a problem to be solved in the present application is: resource collisions and continuous interference problems between users incurred by user's independent selection of resources;

the present application effectively triggers a receiving user to assist in channel sensing;

the present application establishes an association between a first priority and a second priority;

the present application establishes an association between a received first signaling, a received second signaling and channel sensing;

the present application establishes an association between a received first priority, a received second priority and a first threshold;

in the present application, a first signaling only carries a first priority and a number of needed continuous frequency-domain resource unit(s), L, without carrying any resource scheduling information;

in the present application, two received priorities, a first priority and a second priority, are used to determine a first threshold and execute channel sensing;

the present application effectively executes inter-user coordination while ensuring resource overhead and latency requirements, thereby avoiding resource collisions and continuous interference between users.

To address the above problems, the present application discloses a specific method for SL inter-user coordination, which effectively reduces the problem of hidden nodes without increasing signaling overhead. It should be noted that the embodiments in a User Equipment (UE) in the present application and characteristics of the embodiments may be applied to a base station if no conflict is incurred, and vice versa. And the embodiments in the present application and the characteristics in the embodiments can be arbitrarily combined if there is no conflict. Though originally targeted at SL, the present application is also applicable to uplink (UL). Though originally targeted at single-carrier communications, the present application is also applicable to multicarrier communications. Though originally targeted at single-antenna communications, the present application is also applicable to multi-antenna communications. Besides, the present application is not only targeted at scenarios of V2X scenarios, but also at communication scenarios between terminals and base stations, terminals and relays as well as relays and base stations, where similar technical effect can be achieved. Additionally, the adoption of a unified solution for various scenarios, including but not limited to V2X scenarios and communication scenarios between terminals and base stations, contributes to the reduction of hardware complexity and costs.

The present application provides a method in a first node for wireless communications, comprising:

receiving a first signaling in a first time window; and transmitting a second signaling and a second signal on a second time-frequency resource block;

herein, the first signaling comprises a first priority and a first identifier, the first signaling indicates a first time-frequency resource block, and the first time-frequency resource block is a first-type time-frequency resource block in the first time window; the second signaling comprises a second priority and a second identifier, and the second signaling indicates the second time-frequency resource block; a first bit block is used to generate the second signal; the first priority and the second priority are used together to determine a first threshold, and the first priority and the second priority are used together to determine a second threshold; when the first identifier is the same as the second identifier, a target threshold is the first threshold; when the first identifier is different from the second identifier, a target threshold is the second threshold; the first time-frequency resource block is associated with a first target time-frequency resource block, and the target threshold is used to determine whether the first target time-frequency resource block belongs to a first candidate resource pool; the first candidate resource pool comprises a positive integer number of second-type time-frequency resource block(s), and the second time-frequency resource block is a second-type time-frequency resource block in the first candidate resource pool.

In one embodiment, a problem to be solved in the present application is: the problem of hidden nodes leads to resource collisions and continuous interference between users.

In one embodiment, a method in the present application is: an association between a destination identifier (ID) and a target threshold is established.

In one embodiment, a method in the present application is: an association is established between whether a first identifier and a second identifier are the same and the target threshold.

In one embodiment, the above method is characterized in that when receiving users are the same, a target threshold is reduced, and the resource collision probability is reduced.

In one embodiment, the above method is characterized in that when a target receiver of a first signaling and a target receiver of a second signaling are the same, a target threshold is reduced to increase the probability of collision resources being excluded.

In one embodiment, the above method is advantageous in that the problem of hidden nodes with a same receiving user is solved without increasing any signaling overhead.

According to one aspect of the present application, the above method is characterized in that the first threshold is less than the second threshold.

According to one aspect of the present application, the above method is characterized in that the first identifier is used to identify a target receiver of the first signaling; the second identifier is used to identify a target receiver of the second signaling.

According to one aspect of the present application, the above method is characterized in comprising:

measuring a first signal on the first time-domain resource block;

herein, when a measurement performed on the first signal is greater than the target threshold, the first target time-frequency resource block does not belong to the first candidate resource pool; when a measurement performed on the first signal is not greater than the target threshold, the first target time-frequency resource block belongs to the first candidate resource pool.

According to one aspect of the present application, the above method is characterized in comprising:

receiving a third signaling;

herein, the third signaling is used to indicate a first offset value, and the second threshold is a sum of the first threshold and the first offset value.

According to one aspect of the present application, the above method is characterized in that the first node is a UE.

According to one aspect of the present application, the above method is characterized in that the first node is a relay node.

According to one aspect of the present application, the above method is characterized in that the first node is a base station.

The present application provides a method in a second node for wireless communications, comprising:

transmitting a first signaling in a first time window; and transmitting a first signal on a first time-domain resource block;

herein, the first signaling comprises a first priority and a first identifier, the first signaling indicates a first time-frequency resource block, and the first time-frequency resource block is a first-type time-frequency resource block in the first time window; the first priority is used to determine a first threshold and a second threshold; the first identifier is used to determine that a target threshold is one of the first threshold or the second threshold; the first time-frequency resource block is associated with a first target time-frequency resource block, and the target threshold and a measurement performed on the first signal are used together to determine whether the first target time-frequency resource block belongs to a first candidate resource pool; the first candidate resource pool comprises a positive integer number of second-type time-frequency resource block(s).

According to one aspect of the present application, the above method is characterized in that the first threshold is less than the second threshold.

According to one aspect of the present application, the above method is characterized in that the first identifier is used to identify a target receiver of the first signaling.

According to one aspect of the present application, the above method is characterized in that when a measurement performed on the first signal is greater than the target threshold, the first target time-frequency resource block does not belong to the first candidate resource pool; when a measurement performed on the first signal is not greater than the target threshold, the first target time-frequency resource block belongs to the first candidate resource pool.

According to one aspect of the present application, the above method is characterized in that a difference value between the second threshold and the first threshold is a first offset value, and the first offset value is indicated by a third signaling; a transmitter of the third signaling is a target receiver of the first signaling.

According to one aspect of the present application, the above method is characterized in that the second node is a UE.

According to one aspect of the present application, the above method is characterized in that the second node is a relay node.

According to one aspect of the present application, the above method is characterized in that the second node is a base station.

The present application provides a method in a third node for wireless communications, comprising:

receiving a first signaling in a first time window; and receiving a second signaling and a second signal on a second time-frequency resource block;

herein, the first signaling comprises a first priority and a first identifier, the first signaling indicates a first time-frequency resource block, and the first time-frequency resource block is a first-type time-frequency resource block in the first time window; the second signaling comprises a second priority and a second identifier, and the second identifier is used to identify the third node; the second signaling indicates the second time-frequency resource block; a first bit block is used to generate the second signal; the first priority and the second priority are used together to determine a first threshold, and the first priority and the second priority are used together to determine a second threshold; when the first identifier is used to identify the third node, a target threshold is the first threshold; when the first identifier is not used to identify the third node, a target threshold is the second threshold; the first time-frequency resource block is associated with a first target time-frequency resource block, and the target threshold is used to determine whether the first target time-frequency resource block belongs to a first candidate resource pool; the first candidate resource pool comprises a positive integer number of second-type time-frequency resource block(s), and the second time-frequency resource block is a second-type time-frequency resource block in the first candidate resource pool.

According to one aspect of the present application, the above method is characterized in that the first threshold is less than the second threshold.

According to one aspect of the present application, the above method is characterized in comprising:

receiving a first signal on the first time-domain resource block;

herein, the first signaling is used to schedule the first signaling, and the received first signal is used to determine a first offset value.

According to one aspect of the present application, the above method is characterized in comprising:

transmitting a third signaling;

herein, the third signaling is used to indicate the first offset value, and the first offset value is a difference value between the second threshold and the first threshold.

According to one aspect of the present application, the above method is characterized in that the third node is a UE.

According to one aspect of the present application, the above method is characterized in that the third node is a relay node.

According to one aspect of the present application, the above method is characterized in that the third node is a base station.

The present application provides a first node for wireless communications, comprising:

a first receiver, receiving a first signaling in a first time window; and a first transmitter, transmitting a second signaling and a second signal on a second time-frequency resource block;

herein, the first signaling comprises a first priority and a first identifier, the first signaling indicates a first time-frequency resource block, and the first time-frequency resource block is a first-type time-frequency resource block in the first time window; the second signaling comprises a second priority and a second identifier, and the second signaling indicates the second time-frequency resource block; a first bit block is used to generate the second signal; the first priority and the second priority are used together to determine a first threshold, and the first priority and the second priority are used together to determine a second threshold; when the first identifier is the same as the second identifier, a target threshold is the first threshold; when the first identifier is different from the second identifier, a target threshold is the second threshold; the first time-frequency resource block is associated with a first target time-frequency resource block, and the target threshold is used to determine whether the first target time-frequency resource block belongs to a first candidate resource pool; the first candidate resource pool comprises a positive integer number of second-type time-frequency resource block(s), and the second time-frequency resource block is a second-type time-frequency resource block in the first candidate resource pool.

The present application provides a second node for wireless communications, comprising:

a second transmitter, transmitting a first signaling in a first time window; and the second transmitter, transmitting a first signal on a first time-frequency resource block;

herein, the first signaling comprises a first priority and a first identifier, the first signaling indicates a first time-frequency resource block, and the first time-frequency resource block is a first-type time-frequency resource block in the first time window; the first priority is used to determine a first threshold and a second threshold; the first identifier is used to determine that a target threshold is one of the first threshold or the second threshold; the first time-frequency resource block is associated with a first target time-frequency resource block, and the target threshold and a measurement performed on the first signal are used together to determine whether the first target time-frequency resource block belongs to a first candidate resource pool; the first candidate resource pool comprises a positive integer number of second-type time-frequency resource block(s).

The present application provides a third node for wireless communications, comprising:

a second receiver, receiving a first signaling in a first time window; and the second receiver, receiving a second signaling and a second signal on a second time-frequency resource block;

herein, the first signaling comprises a first priority and a first identifier, the first signaling indicates a first time-frequency resource block, and the first time-frequency resource block is a first-type time-frequency resource block in the first time window; the second signaling comprises a second priority and a second identifier, and the second identifier is used to identify the third node; the second signaling indicates the second time-frequency resource block; a first bit block is used to generate the second signal; the first priority and the second priority are used together to determine a first threshold, and the first priority and the second priority are used together to determine a second threshold; when the first identifier is used to identify the third node, a target threshold is the first threshold; when the first identifier is not used to identify the third node, a target threshold is the second threshold; the first time-frequency resource block is associated with a first target time-frequency resource block, and the target threshold is used to determine whether the first target time-frequency resource block belongs to a first candidate resource pool; the first candidate resource pool comprises a positive integer number of second-type time-frequency resource block(s), and the second time-frequency resource block is a second-type time-frequency resource block in the first candidate resource pool.

In one embodiment, the present application is advantageous in the following aspects:

a problem to be solved in the present application is: the problem of hidden nodes leads to resource collisions and continuous interference between users;

the present application establishes an association between a destination identifier and a target threshold;

the present application establishes an association between whether a first identifier and a second identifier are the same and the target threshold;

in the present application, when receiving users are the same, a target threshold is reduced, and the resource collision probability is reduced;

in the present application, when a target receiver of a first signaling is the same as a target receiver of the second signaling, a target threshold is reduced to increase the probability of collision resources being excluded;

in the present application, the problem of hidden nodes with a same receiving user is effectively solved without increasing any signaling overhead.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1A

Figure 1A:
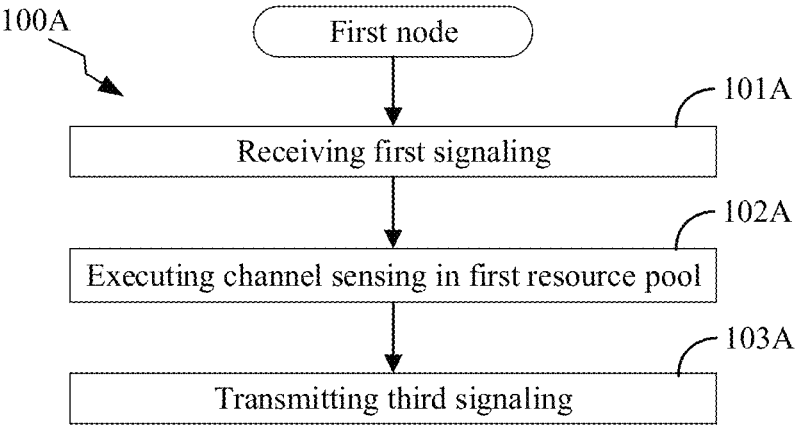
FIG. 1A illustrates a flowchart of the processing of a first node according to one embodiment of the present application.

Embodiment 1A illustrates a flowchart of the processing of a first node according to one embodiment of the present application, as shown in FIG. 1A. In FIG. 1A, each block represents a step.

In embodiment 1A, a first node in the present application first receives a first signaling in step 101A; then executes channel sensing in a first resource pool in step 102A; and then transmits a third signaling in step 103A; the first resource pool comprises M first-type time-frequency resource blocks, any of the M first-type time-frequency resource blocks occupies L continuous frequency-domain resource unit(s) in frequency domain, M being a positive integer greater than 1, L being a positive integer; the first signaling indicates L, and the first signaling comprises a first priority; the channel sensing comprises receiving a second signaling, the second signaling comprises a second priority, the second signaling indicates time-frequency resources occupied by a first reference signal, at least one of the M first-type time-frequency resource blocks is overlapped with time-frequency resources occupied by the first reference signal; a first time-frequency resource block is a first-type time-frequency resource block overlapping with time-frequency resources occupied by the first reference signal among the M first-type time-frequency resource blocks; a transmitter of the first signaling and a transmitter of the second signaling are non-co-located; the first priority and the second priority are used together to determine a first threshold; the channel sensing comprises measuring a first reference signal, a measurement performed on the first reference signal and the first threshold are used together to determine whether a second time-frequency resource block belongs to a first candidate resource pool, and the second time-frequency resource block is associated with the first time-frequency resource block; the first candidate resource pool comprises N second-type time-frequency resource block(s), and any of the N second-type time-frequency resource block(s) is associated with one of the M first-type time-frequency resource blocks, N being a positive integer; the third signaling is used to indicate the first candidate resource pool.

In one embodiment, the first resource pool is used for sidelink transmission.

In one embodiment, the first resource pool comprises all or partial resources of an SL Resource Pool.

In one embodiment, the first resource pool comprises all or partial resources of an SL Transmission Resource Pool.

In one embodiment, the first resource pool comprises all or partial resources of an SL Reception Resource Pool.

In one embodiment, the first resource pool comprises a Physical Sidelink Control Channel (PSCCH).

In one embodiment, the first resource pool comprises a Physical Sidelink Shared Channel (PSSCH).

In one embodiment, the first resource pool comprises a Physical Sidelink Feedback Channel (PSFCH).

In one embodiment, the first resource pool is used to transmit a Sidelink Channel State Information Reference Signal (SL CSI-RS).

In one embodiment, the first resource pool is used to transmit a PSCCH Demodulation Reference Signal (DMRS).

In one embodiment, the first resource pool is used to transmit a PSSCH DMRS.

In one embodiment, the first resource pool comprises multiple Resource Elements (REs).

In one embodiment, any of the multiple REs comprised in the first resource pool occupies a multicarrier symbol in time domain and a subcarrier in frequency domain.

In one embodiment, the first resource pool is configured by a Higher Layer Signalling.

In one embodiment, the first resource pool is configured by a Radio Resource Control (RRC) layer signaling.

In one embodiment, the first resource pool is configured by a Multimedia Access Control (MAC) layer signaling.

In one embodiment, the first resource pool is pre-configured.

In one embodiment, the first resource pool comprises M first-type time-frequency resource blocks, and any of the M first-type time-frequency resource blocks comprises multiple REs.

In one embodiment, the first resource pool comprises M first-type time-frequency resource blocks, and any of the M first-type time-frequency resource blocks comprises L continuous frequency-domain resource unit(s).

In one embodiment, the first resource pool comprises M first-type time-frequency resource blocks, and any of the M first-type time-frequency resource blocks comprises a positive integer number of multicarrier symbol(s) in time domain.

In one embodiment, the first resource pool comprises M first-type time-frequency resource blocks, and any of the M first-type time-frequency resource blocks comprises a positive integer number of slot(s) in time domain.

In one embodiment, subcarrier spacings of subcarriers occupied by any two of M first-type time-frequency resource blocks comprised in the first resource pool are equal.

In one embodiment, numbers of Physical Resource Blocks comprised in sub-channels occupied by any two of M first-type time-frequency resource blocks comprised in the first resource pool are equal.

In one embodiment, M is a positive integer greater than 1.

In one embodiment, L is a positive integer.

In one embodiment, any of the L continuous frequency-domain resource units comprises a positive integer number of subcarrier(s).

In one embodiment, any of the L continuous frequency-domain resource units comprises a positive integer number of Physical Resource Block(s).

In one embodiment, any of the L continuous frequency-domain resource units comprises a positive integer number of sub-channel(s).

In one embodiment, any of the L continuous frequency-domain resource units is a sub-channel.

In one embodiment, the L continuous frequency-domain resource units are respectively L continuous sub-channels.

In one embodiment, any of the M first-type time-frequency resource blocks comprised in the first resource pool comprises a PSCCH.

In one embodiment, any of the M first-type time-frequency resource blocks comprised in the first resource pool comprises a PSSCH.

In one embodiment, the first signaling comprises one or multiple fields in a Physical Layer (PHY) layer.

In one embodiment, the first signaling comprises one or more fields in Sidelink Control Information (SCI).

In one embodiment, the first signaling comprises an SCI.

In one embodiment, the first signaling comprises one or multiple fields in $1^{st}$-stage SCI format.

In one embodiment, the first signaling comprises at least one of multiple fields in $1^{st}$-stage SCI format and at least one of multiple fields in $2^{nd}$-stage SCI format.

In one embodiment, for definition of the SCI, refer to section 8.3 and section 8.4 in 3GPP TS38.212.

In one embodiment, for definition of the $1^{st}$-stage SCI format, refer to 3GPP TS38.212, section 8.3.

In one embodiment, for definition of the rd-stage SCI format, refer to 3GPP TS38.212, section 8.4.

In one embodiment, the first signaling comprises all or part of a higher-layer signaling.

In one embodiment, the first signaling comprises all or part of an RRC signaling.

In one embodiment, the first signaling comprises one or more fields in an RRC Information Element (IE).

In one embodiment, the first signaling comprises all or part of a PC5-RRC signaling.

In one embodiment, the first signaling comprises all or part of a MAC layer signaling.

In one embodiment, the first signaling comprises one or more fields in a MAC Control Element (CE).

In one embodiment, a channel occupied by the first signaling comprises a PSCCH.

In one embodiment, a channel occupied by the first signaling comprises a PSSCH.

In one embodiment, the first signaling is carried in at least one of a PSCCH or a PSCCH.

In one embodiment, the first signaling transmits sensing information.

In one embodiment, the first signaling transmits SL Sensing Information.

In one embodiment, the first signaling transmits Resource Selection Information.

In one embodiment, the first signaling transmits SL Resource Selection Information.

In one embodiment, the first signaling is not used to transmit Scheduling Information.

In one embodiment, the first signaling is not used to transmit SL Scheduling Information.

In one embodiment, the first signaling comprises a second field, and the second field is used to indicate the M first-type time-frequency resource blocks.

In one embodiment, a PHY channel carrying the first signaling comprises a PSCCH, and the first signaling is not used to schedule a PSCCH.

In one embodiment, a PHY channel carrying the first signaling comprises a PSCCH, and the first signaling is not used to schedule a transmission of a transport block.

In one embodiment, the first signaling comprises a third field, the third field indicates a given value, and the first signaling is not used to schedule a PSSCH.

In one embodiment, the first signaling indicates the first priority.

In one embodiment, the first signaling indicates L and a first priority.

In one embodiment, the first signaling comprises L and a first priority.

In one embodiment, the first signaling comprises multiple fields, and L and the first priority are respectively at least two of the multiple fields comprised in the first signaling.

In one embodiment, L indicated by the first signaling and the first priority are used for the channel sensing.

In one embodiment, L comprised in the first signaling and the first priority are used for the channel sensing.

In one embodiment, the first signaling is not associated with any PSSCH.

In one embodiment, the first signaling is not used to indicate any PSSCH.

In one embodiment, the first signaling is not used to schedule a first data block.

In one embodiment, the first signaling is not used to indicate any time-frequency resource block.

In one embodiment, the first signaling is not used to indicate time-frequency resources occupied by any radio signal generated by a first data block.

In one embodiment, a first data block is used to generate a positive integer number of first-type radio signal(s), and the first signaling is not used to schedule any of the positive integer number of first-type radio signal(s).

In one embodiment, a first data block is used to generate a positive integer number of first-type radio signal(s), and the first signaling is not used to indicate time-frequency resources occupied by any of the positive integer number of first-type radio signal(s).

In one embodiment, the first signaling is not used to schedule the first data block, the first signaling comprises the first priority, and the first priority is a priority of the first data block.

In one embodiment, the first signaling is not used to indicate time-frequency resources occupied by any first-type radio signal generated by the first data block, the first signaling comprises the first priority, and the first priority is a priority of the first data block.

In one embodiment, the first signaling is not used to indicate any PSSCH, the first signaling comprises the first priority, and the first priority is a priority of a PSSCH waited to be received by the first node.

In one embodiment, the first signaling indicates a priority of a first data block waited to be received by the first node.

In one embodiment, the first signaling indicates a number of frequency-domain resource unit(s) comprised by a PSSCH waited to be received by the first node in frequency domain.

In one embodiment, the first signaling indicates a number of frequency-domain resource unit(s) occupied by a first radio signal waited to be received by the first node in frequency domain, and the first data block is used to generate the first radio signal.

In one embodiment, the second signaling comprises one or more fields of a PHY layer signaling.

In one embodiment, the second signaling comprises one or more fields of an SCI.

In one embodiment, the second signaling comprises an SCI.

In one embodiment, the second signaling comprises one or multiple fields in $1^{st}$-stage SCI format.

In one embodiment, the second signaling comprises at least one of multiple fields of $1^{st}$-stage SCI format and at least one of multiple fields of $2^{nd}$-stage SCI format.

In one embodiment, the second signaling comprises all or part of a higher-layer signaling.

In one embodiment, the second signaling comprises all or part of an RRC signaling.

In one embodiment, the second signaling comprises one or multiple fields of an RRC IE.

In one embodiment, the second signaling comprises one or multiple fields in a PC5-RRC signaling.

In one embodiment, the second signaling comprises all or part of a MAC layer signaling.

In one embodiment, the second signaling comprises one or multiple fields of a MAC CE.

In one embodiment, a channel occupied by the second signaling comprises a PSCCH.

In one embodiment, a channel occupied by the second signaling comprises a PSSCH.

In one embodiment, the second signaling transmits Scheduling information.

In one embodiment, the second signaling transmits SL scheduling information.

In one embodiment, the second signaling is used to schedule a second data block, and the second data block comprises a positive integer number of bit(s).

In one embodiment, the second signaling indicates the first reference signal.

In one embodiment, the first reference signal is used to demodulate the second data block.

In one embodiment, the second signaling indicates the second priority.

In one embodiment, the second priority is a priority of the second data block.

In one embodiment, the second signaling indicates time-frequency resources occupied by a first reference signal.

In one embodiment, the second signaling comprises the second priority and time-frequency resources occupied by the first reference signal.

In one embodiment, the second signaling comprises multiple fields, and the second priority and time-frequency resources occupied by the first reference signal are respectively at least two fields in the multiple fields comprised in the second signaling.

In one embodiment, the second priority indicated by the second signaling and time-frequency resources occupied by the first reference signal are used for the channel sensing.

In one embodiment, the first priority is a positive integer.

In one embodiment, the first priority is configured by a higher-layer signaling.

In one embodiment, the first priority is one of P positive integer(s), P being a positive integer.

In one embodiment, the first priority is a positive integer from 1 to P.

In one embodiment, P is equal to 8.

In one embodiment, P is equal to 9.

In one embodiment, the first priority is a priority of a first data block, and the first data block is generated by a transmitter of the first signaling.

In one embodiment, the first priority is a priority of a first radio signal in the present application.

In one embodiment, the second priority is a positive integer.

In one embodiment, the second priority is configured by a higher-layer signaling.

In one embodiment, the second priority is one of P positive integer(s), P being a positive integer.

In one embodiment, the second priority is a positive integer from 1 to P.

In one embodiment, the first priority is a positive integer from 1 to P, and the second priority is a positive integer from 1 to P.

In one embodiment, the second priority is a priority of a second data block, and the second data block is generated by a transmitter of the second signaling.

In one embodiment, the first signaling comprises the first priority, the second signaling comprises the second priority, the first priority is a priority of the first data block, the second priority is a priority of the second data block, the first data block is generated by a transmitter of the first signaling, and the second data block is generated by a transmitter of the second signaling.

In one embodiment, both the first priority and the second priority are receiving priorities.

In one embodiment, both the first priority and the second priority are priorities of a receiving data block.

In one embodiment, the first priority is a priority of the first data block, the second priority is priority of the second data block, and the first node is a receiver of the first data block and the second data block.

In one embodiment, a first signaling indicates the first priority, a second signaling indicates the second priority, and the first node is a receiver of the first signaling and the second signaling.

In one embodiment, a first signaling indicates the first priority, a second signaling indicates the second priority, and the first node is a receiver of the first signaling, and the first node is also a receiver of the second signaling.

In one embodiment, the third signaling comprises one or multiple fields of a PHY layer signaling.

In one embodiment, the third signaling comprises one or multiple fields in an SCI.

In one embodiment, the third signaling comprises an SCI.

In one embodiment, the third signaling comprises a Hybrid Automatic Repeat Request (HARQ).

In one embodiment, the third signaling comprises HARQ-Acknowledge (HARQ-ACK).

In one embodiment, the third signaling comprises all or part of a higher-layer signaling.

In one embodiment, the third signaling comprises all or part of an RRC signaling.

In one embodiment, the third signaling comprises one or multiple fields of an RRC IE.

In one embodiment, the third signaling comprises one or multiple fields in a PC5-RRC signaling.

In one embodiment, the third signaling comprises all or part of a MAC layer signaling.

In one embodiment, the third signaling comprises one or multiple fields of a MAC CE.

In one embodiment, a channel occupied by the third signaling comprises a PSCCH.

In one embodiment, a channel occupied by the third signaling comprises a PSSCH.

In one embodiment, a channel occupied by the third signaling comprises a PSFCH.

In one embodiment, the third signaling transmits Coordination information.

In one embodiment, the third signaling transmits Inter-UE Coordination information.

In one embodiment, the third signaling indicates the first candidate resource pool.

In one embodiment, the third signaling indicates the N second-type time-frequency resource block(s) comprised in the first candidate resource pool.

In one embodiment, the third signaling comprises the first priority.

In one embodiment, the multicarrier symbol is a Single-Carrier Frequency-Division Multiple Access (SC-FDMA) symbol.

In one embodiment, the multicarrier symbol is a Discrete Fourier Transform Spread Orthogonal Frequency Division Multiplexing (DFT-S-OFDM) symbol.

In one embodiment, the multicarrier symbol is a Frequency Division Multiple Access (FDMA) symbol.

In one embodiment, the multi-carrier symbol is a Filter Bank Multi-Carrier (FBMC) symbol.

In one embodiment, the multicarrier symbol is an Interleaved Frequency Division Multiple Access (IFDMA) symbol.

Embodiment 1B

Figure 1B:
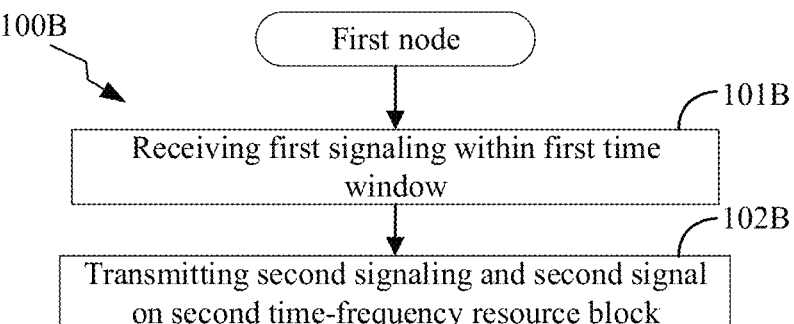
FIG. 1B illustrates a flowchart of the processing of a first node according to one embodiment of the present application.

Embodiment 1B illustrates a flowchart of the processing of a first node according to one embodiment of the present application, as shown in FIG. 1. In FIG. 1B, each block represents a step.

In embodiment 1B, a first node in the present application first receives a first signaling in a first time window in step 101B; then transmits a second signaling and a second signal on a second time-frequency resource block in step 102B; the first signaling comprises a first priority and a first identifier, the first signaling indicates a first time-frequency resource block, and the first time-frequency resource block is a first-type time-frequency resource block in the first time window; the second signaling comprises a second priority and a second identifier, and the second signaling indicates the second time-frequency resource block; a first bit block is used to generate the second signal; the first priority and the second priority are used together to determine a first threshold, and the first priority and the second priority are used together to determine a second threshold; when the first identifier is the same as the second identifier, a target threshold is the first threshold; when the first identifier is different from the second identifier, a target threshold is the second threshold; the first time-frequency resource block is associated with a first target time-frequency resource block, and the target threshold is used to determine whether the first target time-frequency resource block belongs to a first candidate resource pool; the first candidate resource pool comprises a positive integer number of second-type time-frequency resource block(s), and the second time-frequency resource block is a second-type time-frequency resource block in the first candidate resource pool.

In one embodiment, the first resource pool is used for a sidelink transmission.

In one embodiment, the first resource pool comprises all or partial resources of an SL Resource Pool.

In one embodiment, the first resource pool comprises all or partial resources of an SL Transmission Resource Pool.

In one embodiment, the first resource pool comprises all or partial resources of an SL Reception Resource Pool.

In one embodiment, the first resource pool comprises a Physical Sidelink Control Channel (PSCCH).

In one embodiment, the first resource pool comprises a Physical Sidelink Shared Channel (PSSCH).

In one embodiment, the first resource pool comprises a Physical Sidelink Feedback Channel (PSFCH).

In one embodiment, the first resource pool is used to transmit an SL RS.

In one embodiment, the SL RS comprises an SL CSI-RS.

In one embodiment, the SL RS comprises a PSCCH DMRS.

In one embodiment, the SL RS comprises a PSSCH DMRS.

In one embodiment, the first resource pool comprises multiple Resource Elements (REs).

In one embodiment, any of the multiple REs comprised in the first resource pool occupies a multicarrier symbol in time domain and a subcarrier in frequency domain.

In one embodiment, the first resource pool comprises multiple time-domain resource units in time domain, and the first resource pool comprises multiple frequency-domain resource units in frequency domain.

In one embodiment, any of the multiple time-domain resource units comprised in the first resource pool comprises a positive integer number of multicarrier symbol(s) in time domain.

In one embodiment, any of the multiple time-domain resource units comprised in the first resource pool comprises a positive integer number of slot(s) in time domain.

In one embodiment, any of the multiple time-domain resource units comprised in the first resource pool comprises a positive integer number of subcarrier(s) in time domain.

In one embodiment, any of the multiple frequency-domain resource units comprised in the first resource pool comprises a positive integer number of Physical Resource Block(s) (PRB(s)) in frequency domain.

In one embodiment, any of the multiple frequency-domain resource units comprised in the first resource pool comprises a positive integer number of sub-channel(s) in frequency domain.

In one embodiment, the first resource pool comprises multiple time-frequency resource blocks, any of the multiple time-frequency resource blocks comprised in the first resource pool occupies a positive integer number of time-domain resource unit(s) in the first resource pool in time domain, and any of the multiple time-frequency resource block(s) comprised in the first resource pool occupies a positive integer number of frequency-domain resource unit(s) in the first resource pool in frequency domain.

In one embodiment, the first resource pool comprises multiple time-frequency resource blocks, any of the multiple time-frequency resource blocks comprised in the first resource pool occupies a time-domain resource unit in the first resource pool in time domain, and any of the multiple time-frequency resource blocks comprised in the first resource pool occupies a frequency-domain resource unit in the first resource pool in frequency domain.

In one embodiment, the first time window comprises TO first-type time-domain resource unit(s), TO being a positive integer.

In one embodiment, the first time window crosses TO first-type time-domain resource unit(s) in time domain, TO being a positive integer.

In one embodiment, the TO first-type time-domain resource unit(s) comprised in the first time window belongs (belong) to the first resource pool.

In one embodiment, the TO first-type time-domain resource unit(s) comprised in the first time window belongs (belong) the multiple time-domain resource units comprised in the first resource pool.

In one embodiment, any of the TO first-type time-domain resource unit(s) comprised in the first time window is one of the multiple first-type time-domain resource units comprised in the first resource pool in time domain.

In one embodiment, the TO first-type time-domain resource unit(s) comprised in the first time window is (are respectively) TO time-domain resource unit(s) from (reference time-domain resource unit-TO) to (reference time-domain resource unit-processing time) in the first resource pool.

In one embodiment, the reference time-domain resource unit is a time-domain resource unit in the first resource pool.

In one embodiment, the reference time-domain resource unit is a time-domain resource unit other than the first time window.

In one embodiment, the first candidate resource pool is triggered to be reported on the reference time-domain resource unit.

In one embodiment, the first node is triggered to report the first candidate resource pool on the reference time-domain resource unit.

In one embodiment, the processing time comprises a positive integer number of time-domain resource unit(s).

In one embodiment, the processing time comprises a positive integer number of multicarrier symbol(s).

In one embodiment, the processing time is measured by ms.

In one embodiment, a spacing of a subcarrier occupied by any RE in the first resource pool in frequency domain is used to determine the processing time.

In one embodiment, the processing time comprises one of 1 slot, 2 slots or 4 slots.

In one embodiment, the first resource pool comprises M first-type time-frequency resource blocks, and the first time window crosses time-domain resources occupied by the M first-type time-frequency resource blocks in the first resource pool, M being a positive integer.

In one embodiment, the first time window crosses time-domain resources occupied by M first-type time-frequency resource blocks, and any of the M first-type time-frequency resource blocks belongs to the first resource pool.

In one embodiment, the first time window crosses time-domain resources occupied by M first-type time-frequency resource blocks, and any of the M first-type time-frequency resource blocks belongs to the multiple time-frequency resource blocks comprised in the first resource pool.

In one embodiment, M first-type time-frequency resource blocks are time-frequency resource blocks of the first resource pool in the first time window.

In one embodiment, any of M first-type time-frequency resource blocks are time-frequency resource blocks of the first resource pool in the first time window.

In one embodiment, the first time window crosses time-domain resources occupied by M first-type time-frequency resource blocks, and any of the M first-type time-frequency resource blocks comprises multiple REs.

In one embodiment, the first time window crosses time-domain resources occupied by M first-type time-frequency resource blocks, and any of the M first-type time-frequency resource blocks occupies one of the TO first-type time-domain resource unit(s) in time domain.

In one embodiment, the first time window crosses M first-type time-frequency resource blocks, and any of the M first-type time-frequency resource blocks comprises L continuous frequency-domain resource unit(s), L being a positive integer.

In one embodiment, time-domain resources occupied by the M first-type time-frequency resource blocks are the TO first-type time-domain resource unit(s) comprised in the first time window.

In one embodiment, any of the M first-type time-frequency resource blocks comprises one of the TO first-type time-domain resource unit(s) comprised in the first time window in time domain, and any of the M first-type time-frequency resource blocks comprises L continuous frequency-domain resource units in the first resource pool in frequency domain.

In one embodiment, the first time window is configured by a Higher Layer Signalling.

In one embodiment, the first time window is configured by a Radio Resource Control (RRC) layer signaling.

In one embodiment, the first time window is configured by a Multimedia Access Control (MAC) layer signaling.

In one embodiment, the first time window is pre-configured.

In one embodiment, the first signaling comprises one or multiple fields in a Physical Layer (PHY) layer.

In one embodiment, the first signaling comprises one or multiple fields in Sidelink Control Information (SCI).

In one embodiment, the first signaling comprises an SCI.

In one embodiment, the first signaling comprises one or multiple fields in $1^{st}$-stage SCI format.

In one embodiment, the first signaling comprises $1^{st}$-stage SCI format and $2^{nd}$-stage SCI format.

In one embodiment, the first signaling comprises at least one of multiple fields of $1^{st}$-stage SCI format and at least one of multiple fields of $2^{nd}$-stage SCI format.

In one embodiment, for definition of the SCI, refer to section 8.3 and section 8.4 in 3GPP TS38.212.

In one embodiment, for definition of the $1^{st}$-stage SCI format, refer to section 8.3 in 3GPP TS38.212.

In one embodiment, for definition of the $2^{nd}$-stage SCI format, refer to section 8.4 in 3GPP TS38.212.

In one embodiment, the first signaling comprises all or part of a higher-layer signaling.

In one embodiment, the first signaling comprises all or part of an RRC signaling.

In one embodiment, the first signaling comprises all or part of a PC5-RRC signaling.

In one embodiment, the first signaling comprises all or part of a MAC layer signaling.

In one embodiment, a channel occupied by the first signaling comprises a PSCCH.

In one embodiment, a channel occupied by the first signaling comprises a PSSCH.

In one embodiment, the first signaling is carried in at least one of a PSCCH or a PSCCH.

In one embodiment, the first signaling indicates the first priority.

In one embodiment, the first signaling indicates the first priority and the first identifier.

In one embodiment, the first signaling comprises multiple fields, and the first priority and the first identifier are respectively at least two of the multiple fields comprised in the first signaling.

In one embodiment, the first signaling comprises a first sub-signaling and a second sub-signaling, the first sub-signaling indicates the first priority, and the second sub-signaling indicates the first identifier.

In one embodiment, the first sub-signaling comprised in the first signaling is $1^{st}$-stage SCI format, and the second sub-signaling comprised in the first signaling comprised is $2^{nd}$-stage SCI format.

In one embodiment, the first signaling indicates the first time-frequency resource block.

In one embodiment, the first signaling indicates time-frequency resources occupied by the first time-frequency resource block.

In one embodiment, the first signaling indicates time-domain resources occupied by the first time-frequency resource block.

In one embodiment, the first signaling indicates frequency-domain resources occupied by the first time-frequency resource block.

In one embodiment, the first signaling comprises multiple fields, the first priority, the first identifier and time-frequency resources occupied by the first time-frequency resource block are respectively at least three of the multiple fields comprised in the first signaling.

In one embodiment, the first signaling comprises a first sub-signaling and a second sub-signaling, the first sub-signaling indicates the first priority and time-frequency resources occupied by the first time-frequency resource block, and the second sub-signaling indicates the first identifier.

In one embodiment, the first time-frequency resource block is a first-type time-frequency resource block in the first time window.

In one embodiment, the first time-frequency resource block is one of the M first-type time-frequency resource blocks in the first time window.

In one embodiment, the first time-frequency resource block is one of the M first-type time-frequency resource blocks, and time-domain resources occupied by the M first-type time-frequency resource blocks belong to the first time window.

In one embodiment, the first time-frequency resource block is one of the M first-type time-frequency resource blocks, and time-domain resources occupied by the M first-type time-frequency resource blocks belong to the TO time-domain resource unit(s) comprised in the first time window.

In one embodiment, the second signaling comprises one or multiple fields of a PHY layer signaling.

In one embodiment, the second signaling comprises one or multiple fields of an SCI.

In one embodiment, the second signaling comprises an SCI.

In one embodiment, the second signaling comprises $1^{st}$-stage SCI format and $2^{nd}$-stage SCI format.

In one embodiment, the second signaling comprises one or multiple fields in $1^{st}$-stage SCI format.

In one embodiment, the second signaling comprises at least one of multiple fields of $1^{st}$-stage SCI format and at least one of multiple fields of $2^{nd}$-stage SCI format.

In one embodiment, the second signaling comprises all or part of a higher-layer signaling.

In one embodiment, the second signaling comprises all or part of an RRC signaling.

In one embodiment, the second signaling comprises one or multiple fields in a PC5-RRC signaling.

In one embodiment, the second signaling comprises all or part of a MAC-layer signaling.

In one embodiment, a channel occupied by the second signaling comprises a PSCCH.

In one embodiment, a channel occupied by the second signaling comprises a PSSCH.

In one embodiment, the second signaling is carried in at least one of a PSCCH or a PSCCH.

In one embodiment, the second signaling indicates the second priority.

In one embodiment, the second signaling indicates the second priority and the second identifier.

In one embodiment, the second signaling comprises multiple fields, and the second priority and the second identifier are respectively at least two of the multiple fields comprised in the second signaling.

In one embodiment, the second signaling comprises a third sub-signaling and a fourth sub-signaling, the third sub-signaling indicates the second priority, and the fourth sub-signaling indicates the second identifier.

In one embodiment, the third sub-signaling comprised in the second signaling is $1^{st}$-stage SCI format, and the fourth sub-signaling comprised in the second signaling is $2^{nd}$-stage SCI format.

In one embodiment, the second signaling indicates the second time-frequency resource block.

In one embodiment, the second signaling indicates time-frequency resources occupied by the second time-frequency resource block.

In one embodiment, the second signaling indicates time-domain resources occupied by the second time-frequency resource block.

In one embodiment, the second signaling indicates frequency-domain resources occupied by the second time-frequency resource block.

In one embodiment, the second signaling comprises multiple fields, the second priority, the second identifier and time-frequency resources occupied by the second time-frequency resource block are respectively at least three of the multiple fields comprised in the second signaling.

In one embodiment, the second signaling comprises a third sub-signaling and a fourth sub-signaling, the third sub-signaling indicates the second priority and time-frequency resources occupied by the second time-frequency resource block, and the fourth sub-signaling indicates the second identifier.

In one embodiment, the first time-frequency resource block and the second time-frequency resource block are respectively two of the multiple time-frequency resource blocks comprised in the first resource pool.

In one embodiment, the first resource pool comprises M first-type time-frequency resource blocks and N second-type time-frequency resource block(s), the first time-frequency resource block is one of the M first-type time-frequency resource blocks comprised in the first resource pool, and the second time-frequency resource block is one of the N second-type time-frequency resource block(s) comprised in the first resource pool, N being a positive integer.

In one embodiment, the second time-frequency resource block does not belong to the M first-type time-frequency resource blocks in the first time window.

In one embodiment, the second time-frequency resource block is a time-frequency resource block other than the first time window in the first resource pool.

In one embodiment, the second time-frequency resource block is a time-frequency resource block other than the M first-type time-frequency resource blocks comprised in the first resource pool.

In one embodiment, the second time-frequency resource block is different from any of the M first-type time-frequency resource blocks comprised in the first resource pool.

In one embodiment, time-domain resources occupied by the second time-frequency resource block are different from time-domain resources occupied by any of the M first-type time-frequency resource blocks comprised in the first resource pool.

In one embodiment, the first candidate resource pool comprises the N second-type time-frequency resource block(s), and the second time-frequency resource block is a second-type time-frequency resource block in the first candidate resource pool, N being a positive integer.

In one embodiment, the second signal comprises a base-band signal.

In one embodiment, the second signal comprises a radio-frequency signal.

In one embodiment, the second signal comprises a radio signal.

In one embodiment, the second signal is transmitted on an SL-SCH.

In one embodiment, the second signal is transmitted on a PSCCH.

In one embodiment, the second signal is transmitted on a PSSCH.

In one embodiment, the second signal comprises all or part of a higher-layer signaling.

In one embodiment, the second signal comprises all or part of an RRC-layer signal.

In one embodiment, the second signal comprises one or multiple fields of a PHY layer signaling.

In one embodiment, the second signal comprises an SCI.

In one embodiment, the second signal comprises a $2^{nd}$-stage SCI.

In one embodiment, the second signal comprises a first bit block, and the first bit block comprises a positive integer number of bit(s).

In one embodiment, a first bit block is used to generate the second signal, and the first bit block comprises a positive integer number of bit(s).

In one embodiment, the first bit block comprises a positive integer number of bit(s), and all or partial bit(s) of the positive integer number of bit(s) comprised in the first bit block is(are) used to generate the second signal.

In one embodiment, the first bit block comprises one CW.

In one embodiment, the first bit block comprises one CB.

In one embodiment, the first bit block comprises one CBG.

In one embodiment, the first bit block comprises one TB.

In one embodiment, the second signal is obtained after all or partial bits of the first bit block sequentially through transport block-level Cyclic Redundancy Check (CRC) attachment, Code Block Segmentation, code block-level CRC attachment, Channel Coding, Rate Matching, Code Block Concatenation, Scrambling, Modulation, Layer Mapping, Antenna Port Mapping, Mapping to Physical Resource Blocks, Baseband Signal Generation and Modulation and Upconversion.

In one embodiment, the second signal is an output after the first bit block is sequentially through a modulation mapper, a layer mapper, precoding, a resource element mapper, and multi-carrier symbol generation.

In one embodiment, the channel coding is based on a polar code.

In one embodiment, the channel coding is based on a Low-density Parity-Check (LDPC) code.

In one embodiment, the first priority is a positive integer.

In one embodiment, the first priority is configured by a higher-layer signaling.

In one embodiment, the first priority is one of P positive integer(s), P is a positive integer.

In one embodiment, the first priority is a positive integer from 1 to P.

In one embodiment, P is equal to 8.

In one embodiment, P is equal to 9.

In one embodiment, the second priority is a positive integer.

In one embodiment, the second priority is configured by a higher-layer signaling.

In one embodiment, the second priority is one of P positive integer(s), P is a positive integer.

In one embodiment, the second priority is a positive integer from 1 to P.

In one embodiment, the first priority is a positive integer from 1 to P, and the second priority is a positive integer from 1 to P.

In one embodiment, the second priority is a priority of the first bit block, and the first bit block is used to generate the second signal.

In one embodiment, the first signaling comprises the first priority, the second signaling comprises the second priority, and the first priority and the second priority are respectively two non-negative integers not greater than 12.

In one embodiment, the multicarrier symbol is a Single-Carrier Frequency-Division Multiple Access (SC-FDMA) symbol.

In one embodiment, the multicarrier symbol is a Discrete Fourier Transform Spread Orthogonal Frequency Division Multiplexing (DFT-S-OFDM) symbol.

In one embodiment, the multicarrier symbol is a Frequency Division Multiple Access (FDMA) symbol.

In one embodiment, the multi-carrier symbol is a Filter Bank Multi-Carrier (FBMC) symbol.

In one embodiment, the multicarrier symbol is an Interleaved Frequency Division Multiple Access (IFDMA) symbol.

Embodiment 2

Figure 2:
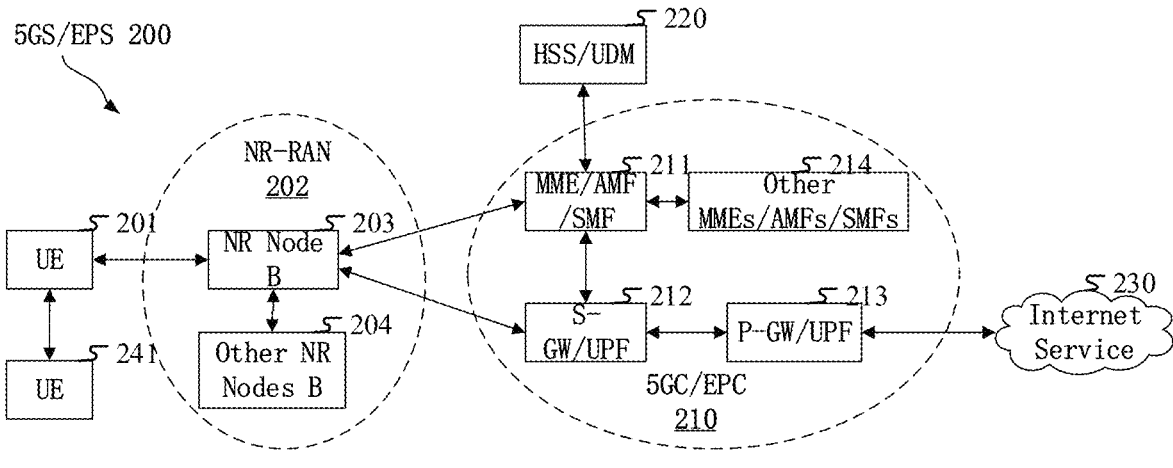
FIG. 2 illustrates a schematic diagram of a network architecture according to one embodiment of the present application.

Embodiment 2 illustrates a schematic diagram of a network architecture according to the present application, as shown in FIG. 2. FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, a UE 241 that is in Sidelink communications with a UE 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In NTN networks, examples of gNB 203 include satellites, aircrafts, or ground base stations relayed through satellites. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (I) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present application comprises the UE 201.

In one embodiment, the second node in the present application comprises the UE 241.

In one embodiment, the third node in the present application comprises the UE 241.

In one embodiment, the UE in the present application comprises the UE 201.

In one embodiment, the UE in the present application comprises the UE 241.

In one embodiment, the base station in the present application comprises the gNB 203.

In one embodiment, a receiver of the first signaling in the present application comprises the UE 201.

In one embodiment, a transmitter of the first signaling in the present application comprises the UE 241.

In one embodiment, a receiver of the second signaling in the present application comprises the UE 201.

In one embodiment, a transmitter of the second signaling in the present application comprises the UE 241.

In one embodiment, a receiver of the first reference signal in the present application comprises the UE 201.

In one embodiment, a transmitter of the first reference signal in the present application comprises the UE 241.

In one embodiment, a transmitter of the third signaling in the present application comprises the UE 201.

In one embodiment, a receiver of the third signaling in the present application comprises the UE 241.

In one embodiment, a receiver of the fourth signaling in the present application comprises the UE 201.

In one embodiment, a transmitter of the fourth signaling in the present application comprises the UE 241.

In one embodiment, a receiver of the first radio signal in the present application comprises the UE 201.

In one embodiment, a transmitter of the first radio signal in the present application comprises the UE 241.

In one embodiment, a receiver of the first signaling in the present application comprises the UE 241.

In one embodiment, a receiver of the first signal in the present application comprises the UE 201.

In one embodiment, a receiver of the first signal in the present application comprises the UE 241.

In one embodiment, a transmitter of the first signal in the present application comprises the UE 241.

In one embodiment, a receiver of the third signaling in the present application comprises the UE 201.

In one embodiment, a transmitter of the third signaling in the present application comprises the UE 241.

In one embodiment, a receiver of the second signaling in the present application comprises the UE 241.

In one embodiment, a transmitter of the second signaling in the present application comprises the UE 201.

In one embodiment, a receiver of the second signal in the present application comprises the UE 241.

In one embodiment, a transmitter of the second signal in the present application comprises the UE 201.

Embodiment 3

Figure 3:
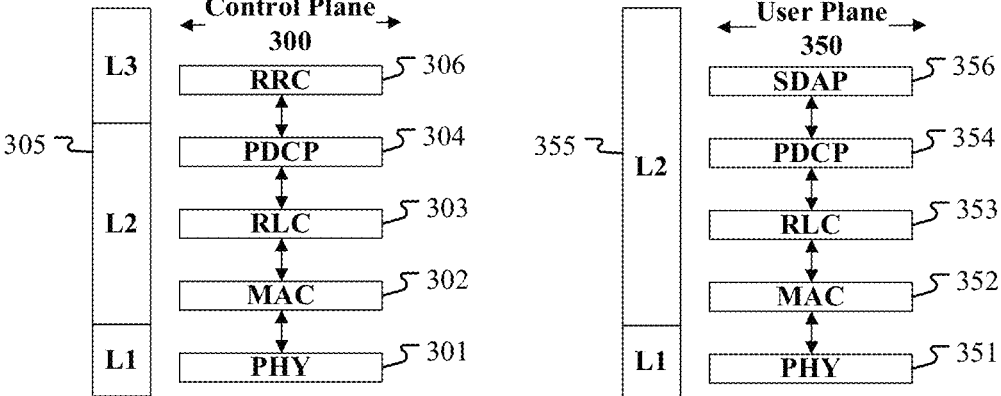
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE or RSU in V2X, vehicle equipment or On-Board Communication Unit) and a second node (gNB, UE or RSU in V2X, vehicle equipment or On-Board Communication Unit), or between two UEs is represented by three layers, which are respectively layer 1, layer 2 and layer 3. The layer 1 (L1) is the lowest layer and performs signal processing functions of various PHY layers. The L1 is called PHY 301 in the present application. The layer 2 (L2) 305 is above the PHY 301, and is in charge of the link between the first node and the second node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes. The PDCP sublayer 304 provides data encryption and integrity protection and provides support for handover of a first node between second nodes. The RLC sublayer 303 provides segmentation and reassembling of a packet, retransmission of a lost data packet through ARQ, as well as repeat data packet detection and protocol error detection. The MAC sublayer 302 provides mapping between a logic channel and a transport channel and multiplexing of the logical channel. The MAC sublayer 302 is also responsible for allocating between first nodes various radio resources (i.e., resource block) in a cell. The MAC sublayer 302 is also responsible for HARQ operations. In the control plane 300, the RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 305, such as a network layer (i.e., IP layer) terminated at a P-GW of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the radio protocol architecture in FIG. 3 is applicable to the third node in the present application.

In one embodiment, the first signaling in the present application is generated by the PHY 301.

In one embodiment, the second signaling in the present application is generated by the PHY 301.

In one embodiment, the first reference signal in the present application is generated by the PHY 301.

In one embodiment, the third signaling in the present application is generated by the PHY 301.

In one embodiment, the fourth signaling in the present application is generated by the PHY 301.

In one embodiment, the first radio signal in the present application is generated by the RRC sublayer 306.

In one embodiment, the first radio signal in the present application is transmitted to the PHY 301 via the MAC sublayer 302.

In one embodiment, the first signal in the present application is generated by the RRC sublayer 306.

In one embodiment, the first signal in the present application is transmitted to the PHY 301 via the MAC sublayer 302.

In one embodiment, the third signaling in the present application is generated by the MAC sublayer 302.

In one embodiment, the second signal in the present application is generated by the RRC sublayer 306.

In one embodiment, the second signal in the present application is transmitted to the PHY 301 via the MAC sublayer 302.

Embodiment 4

Figure 4:
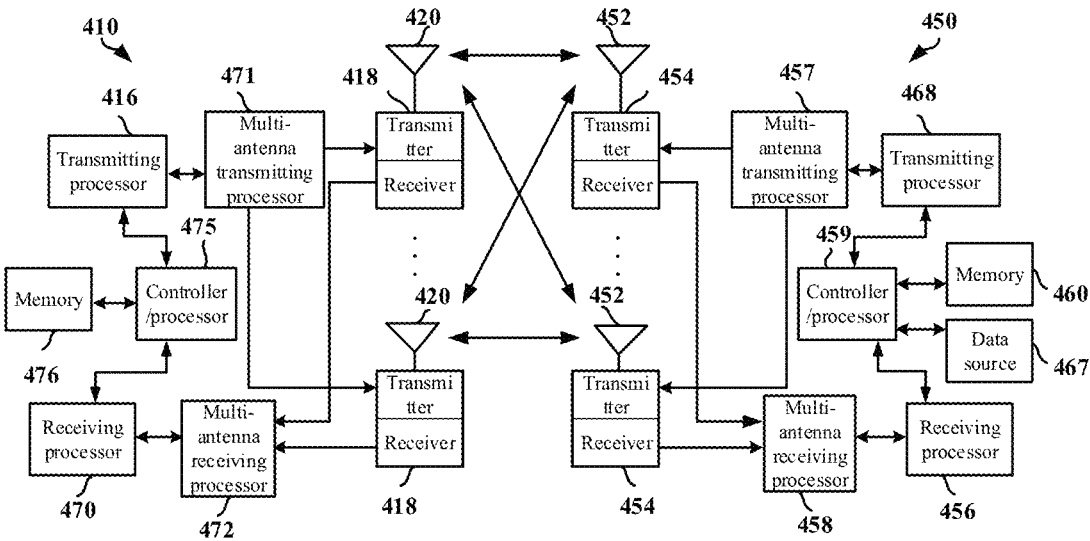
FIG. 4 illustrates a schematic diagram of a first communication device and a second communication device according to one embodiment of the present application.

Embodiment 4 illustrates a schematic diagram of a first communication device and a second communication device in the present application, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present application comprises the second communication device 450, and the second node in the present application comprises the first communication device 410.

In one embodiment, the first node in the present application comprises the second communication device 450, and the third node in the present application comprises the first communication device 410.

In one embodiment, the first node in the present application comprises the second communication device 450, the second node in the present application comprises the first communication device 410, and the third node in the present application comprises the first communication node 410.

In one subembodiment of the above embodiment, the first node is a UE, and the second node is a UE, and the third node is a UE.

In one subembodiment of the above embodiment, the first node is a UE, and the second node is a relay node, and the third node is a relay node.

In one subembodiment of the above embodiment, the first node is a UE, the second node is a relay node, and the third node is a UE.

In one subembodiment of the above embodiment, the first node is a relay node, the second node is a UE, and the third node is a UE.

In one subembodiment of the above embodiment, the first node is a relay node, the second node is a relay node, and the third node is a UE.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first signaling; and executes channel sensing in a first resource pool; and transmits a third signaling; the first resource pool comprises M first-type time-frequency resource blocks, any of the M first-type time-frequency resource blocks occupies L continuous frequency-domain resource unit(s) in frequency domain, M being a positive integer greater than 1, L being a positive integer; the first signaling indicates L, and the first signaling comprises a first priority; the channel sensing comprises receiving a second signaling, the second signaling comprises a second priority, the second signaling indicates time-frequency resources occupied by a first reference signal, at least one of the M first-type time-frequency resource blocks is overlapped with time-frequency resources occupied by the first reference signal; a first time-frequency resource block is a first-type time-frequency resource block overlapping with time-frequency resources occupied by the first reference signal among the M first-type time-frequency resource blocks; a transmitter of the first signaling and a transmitter of the second signaling are non-co-located; the first priority and the second priority are used together to determine a first threshold; the channel sensing comprises measuring a first reference signal, a measurement performed on the first reference signal and the first threshold are used together to determine whether a second time-frequency resource block belongs to a first candidate resource pool, and the second time-frequency resource block is associated with the first time-frequency resource block; the first candidate resource pool comprises N second-type time-frequency resource block(s), and any of the N second-type time-frequency resource block(s) is associated with one of the M first-type time-frequency resource blocks, N being a positive integer; the third signaling is used to indicate the first candidate resource pool.

In one embodiment, the second communication device 450 comprises a memory that stores a computer readable instruction program. The computer readable instruction program generates an action when executed by at least one processor. The action includes: receiving a first signaling; executing channel sensing in a first resource pool; and transmitting a third signaling; the first resource pool comprises M first-type time-frequency resource blocks, any of the M first-type time-frequency resource blocks occupies L continuous frequency-domain resource unit(s) in frequency domain, M being a positive integer greater than 1, L being a positive integer; the first signaling indicates L, and the first signaling comprises a first priority; the channel sensing comprises receiving a second signaling, the second signaling comprises a second priority, the second signaling indicates time-frequency resources occupied by a first reference signal, at least one of the M first-type time-frequency resource blocks is overlapped with time-frequency resources occupied by the first reference signal; a first time-frequency resource block is a first-type time-frequency resource block overlapping with time-frequency resources occupied by the first reference signal among the M first-type time-frequency resource blocks; a transmitter of the first signaling and a transmitter of the second signaling are non-co-located; the first priority and the second priority are used together to determine a first threshold; the channel sensing comprises measuring a first reference signal, a measurement performed on the first reference signal and the first threshold are used together to determine whether a second time-frequency resource block belongs to a first candidate resource pool, and the second time-frequency resource block is associated with the first time-frequency resource block; the first candidate resource pool comprises N second-type time-frequency resource block(s), and any of the N second-type time-frequency resource block(s) is associated with one of the M first-type time-frequency resource blocks, N being a positive integer; the third signaling is used to indicate the first candidate resource pool.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first signaling; and receives a third signaling; the first signaling comprises a first priority, and the first priority is a priority of a first data block; time-frequency resources reserved for the first data block comprise L continuous frequency-domain resource unit(s) in frequency domain, and the first signaling is used to indicate L, L being a positive integer; the first signaling is not used to schedule the first data block; the third signaling indicates a first candidate resource pool, and the first candidate resource pool comprises N second-type time-frequency resource block(s), N being a positive integer.

In one embodiment, the first communication device 410 comprises a memory that stores a computer readable instruction program. The computer readable instruction program generates an action when executed by at least one processor. The action includes: transmitting a first signaling; and receiving a third signaling; the first signaling comprises a first priority, and the first priority is a priority of a first data block; time-frequency resources reserved for the first data block comprise L continuous frequency-domain resource unit(s) in frequency domain, and the first signaling is used to indicate L, L being a positive integer; the first signaling is not used to schedule the first data block; the third signaling indicates a first candidate resource pool, and the first candidate resource pool comprises N second-type time-frequency resource block(s), N being a positive integer.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a second signaling and a first reference signal; the second signaling comprises a second priority, and the second signaling indicates time-frequency resources occupied by the first reference signal; the second signaling comprises a first field, the first field in the second signaling indicates one of a positive integer number of second-type value(s), the second signaling is used to schedule a second data block, the second data block is used to generate a second radio signal, and the second radio signal comprises the first reference signal.

In one embodiment, the first communication device 410 comprises a memory that stores a computer readable instruction program. The computer readable instruction program generates an action when executed by at least one processor. The action includes: transmitting a second signaling and a first reference signal; the second signaling comprises a second priority, and the second signaling indicates time-frequency resources occupied by the first reference signal; the second signaling comprises a first field, the first field in the second signaling indicates one of a positive integer number of second-type value(s), the second signaling is used to schedule a second data block, the second data block is used to generate a second radio signal, and the second radio signal comprises the first reference signal.

In one embodiment, at least one of the antenna 452, the receiver 454, the multi-antenna receiving processor 458, the receiving processor 456, the controller/processor 459, the memory 460, or the data source 467 is used to receive a first signaling in the present application.

In one embodiment, at least one of the antenna 452, the receiver 454, the multi-antenna receiving processor 458, the receiving processor 456, the controller/processor 459, the memory 460, or the data source 467 is used to receive second signaling in the present application.

In one embodiment, at least one of the antenna 452, the receiver 454, the multi-antenna receiving processor 458, the receiving processor 456, the controller/processor 459, the memory 460, or the data source 467 is used to receive a first reference signal in the present application.

In one embodiment, at least one of the antenna 452, the receiver 454, the multi-antenna receiving processor 458, the receiving processor 456, the controller/processor 459, the memory 460, or the data source 467 is used to execute channel sensing in a first resource pool in the present application.

In one embodiment, at least one of the antenna 452, the transmitter 454, the multi-antenna transmitting processor 458, the transmitting processor 468, the controller/processor 459, the memory 460, or the data sources 467 is used to transmit a third signaling in the present application.

In one embodiment, at least one of the antenna 452, the receiver 454, the multi-antenna receiving processor 458, the receiving processor 456, the controller/processor 459, the memory 460, or the data source 467 is used to monitor a fourth signaling in a first receiving resource pool in the present application.

In one embodiment, at least one of the antenna 452, the receiver 454, the multi-antenna receiving processor 458, the receiving processor 456, the controller/processor 459, the memory 460, or the data source 467 is used to receive a first radio signal on a third time-frequency-resource block in the present application.

In one embodiment, at least one of the antenna 420, the transmitter 418, the multi-antenna transmitting processor 471, the transmitting processor 416, the controller/processor 475, or the memory 476 is used to transmit a first signaling in the present application.

In one embodiment, at least one of the antenna 420, the transmitter 418, the multi-antenna transmitting processor 471, the transmitting processor 416, the controller/processor 475, or the memory 476 is used to transmit a second signaling in the present application.

In one embodiment, at least one of the antenna 420, the transmitter 418, the multi-antenna transmitting processor 471, the transmitting processor 416, the controller/processor 475, or the memory 476 is used to transmit a first reference signal in the present application.

In one embodiment, at least one of the antenna 420, the receiver 418, the multi-antenna receiving processor 472, the receiving processor 470, the controller/processor 475, or the memory 476 is used to receive a third signaling in the present application.

In one embodiment, at least one of the antenna 420, the transmitter 418, the multi-antenna transmitting processor 471, the transmitting processor 416, the controller/processor 475, or the memory 476 is used to transmit a fourth signaling in the present application.

In one embodiment, at least one of the antenna 420, the transmitter 418, the multi-antenna transmitting processor 471, the transmitting processor 416, the controller/processor 475, or the memory 476 is used to transmit a first radio signal on a third time-frequency resource block in the present application.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first signaling in a first time window; transmits a second signaling and a second signal on a second time-frequency resource block; the first signaling comprises a first priority and a first identifier, the first signaling indicates a first time-frequency resource block, and the first time-frequency resource block is a first-type time-frequency resource block in the first time window; the second signaling comprises a second priority and a second identifier, and the second signaling indicates the second time-frequency resource block; a first bit block is used to generate the second signal; the first priority and the second priority are used together to determine a first threshold, and the first priority and the second priority are used together to determine a second threshold; when the first identifier is the same as the second identifier, a target threshold is the first threshold; when the first identifier is different from the second identifier, a target threshold is the second threshold; the first time-frequency resource block is associated with a first target time-frequency resource block, and the target threshold is used to determine whether the first target time-frequency resource block belongs to a first candidate resource pool; the first candidate resource pool comprises a positive integer number of second-type time-frequency resource block(s), and the second time-frequency resource block is a second-type time-frequency resource block in the first candidate resource pool.

In one embodiment, the second communication device 450 comprises a memory that stores a computer readable instruction program. The computer readable instruction program generates an action when executed by at least one processor. The action includes: receiving a first signaling in a first time window; transmitting a second signaling and a second signal on a second time-frequency resource block; the first signaling comprises a first priority and a first identifier, the first signaling indicates a first time-frequency resource block, and the first time-frequency resource block is a first-type time-frequency resource block in the first time window; the second signaling comprises a second priority and a second identifier, and the second signaling indicates the second time-frequency resource block; a first bit block is used to generate the second signal; the first priority and the second priority are used together to determine a first threshold, and the first priority and the second priority are used together to determine a second threshold; when the first identifier is the same as the second identifier, a target threshold is the first threshold; when the first identifier is different from the second identifier, a target threshold is the second threshold; the first time-frequency resource block is associated with a first target time-frequency resource block, and the target threshold is used to determine whether the first target time-frequency resource block belongs to a first candidate resource pool; the first candidate resource pool comprises a positive integer number of second-type time-frequency resource block(s), and the second time-frequency resource block is a second-type time-frequency resource block in the first candidate resource pool.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first signaling in a first time window; transmits a first signal on a first time-domain resource block; the first signaling comprises a first priority and a first identifier, the first signaling indicates a first time-frequency resource block, and the first time-frequency resource block is a first-type time-frequency resource block in the first time window; the first priority is used to determine a first threshold and a second threshold; the first identifier is used to determine that a target threshold is one of the first threshold or the second threshold; the first time-frequency resource block is associated with a first target time-frequency resource block, and the target threshold and a measurement performed on the first signal are used together to determine whether the first target time-frequency resource block belongs to a first candidate resource pool; the first candidate resource pool comprises a positive integer number of second-type time-frequency resource block(s).

In one embodiment, the first communication device 410 comprises a memory that stores a computer readable instruction program. The computer readable instruction program generates an action when executed by at least one processor. The action includes: transmitting a first signaling in a first time window; transmitting a first signal on a first time-domain resource block; the first signaling comprises a first priority and a first identifier, the first signaling indicates a first time-frequency resource block, and the first time-frequency resource block is a first-type time-frequency resource block in the first time window; the first priority is used to determine a first threshold and a second threshold; the first identifier is used to determine that a target threshold is one of the first threshold or the second threshold; the first time-frequency resource block is associated with a first target time-frequency resource block, and the target threshold and a measurement performed on the first signal are used together to determine whether the first target time-frequency resource block belongs to a first candidate resource pool; the first candidate resource pool comprises a positive integer number of second-type time-frequency resource block(s).

In one embodiment, the first communication device 410 comprises at least one processor and at least one memory. The at least one memory comprises computer program codes; the at least one memory and the computer program codes are configured to be used in collaboration with the at least one processor. The first communication device 410 at least: receives a first signaling in a first time window; receives a second signaling and a second signal on a second time-frequency resource block; the first signaling comprises a first priority and a first identifier, the first signaling indicates a first time-frequency resource block, and the first time-frequency resource block is a first-type time-frequency resource block in the first time window; the second signaling comprises a second priority and a second identifier, and the second identifier is used to identify the third node; the second signaling indicates the second time-frequency resource block; a first bit block is used to generate the second signal; the first priority and the second priority are used together to determine a first threshold, and the first priority and the second priority are used together to determine a second threshold; when the first identifier is used to identify the third node, a target threshold is the first threshold; when the first identifier is not used to identify the third node, a target threshold is the second threshold; the first time-frequency resource block is associated with a first target time-frequency resource block, and the target threshold is used to determine whether the first target time-frequency resource block belongs to a first candidate resource pool; the first candidate resource pool comprises a positive integer number of second-type time-frequency resource block(s), and the second time-frequency resource block is a second-type time-frequency resource block in the first candidate resource pool.

In one embodiment, the first communication device 410 comprises a memory that stores a computer readable instruction program. The computer readable instruction program generates an action when executed by at least one processor. The action includes: receiving a first signaling in a first time window; receiving a second signaling and a second signal on a second time-frequency resource block; the first signaling comprises a first priority and a first identifier, the first signaling indicates a first time-frequency resource block, and the first time-frequency resource block is a first-type time-frequency resource block in the first time window; the second signaling comprises a second priority and a second identifier, and the second identifier is used to identify the third node; the second signaling indicates the second time-frequency resource block; a first bit block is used to generate the second signal; the first priority and the second priority are used together to determine a first threshold, and the first priority and the second priority are used together to determine a second threshold; when the first identifier is used to identify the third node, a target threshold is the first threshold; when the first identifier is not used to identify the third node, a target threshold is the second threshold; the first time-frequency resource block is associated with a first target time-frequency resource block, and the target threshold is used to determine whether the first target time-frequency resource block belongs to a first candidate resource pool; the first candidate resource pool comprises a positive integer number of second-type time-frequency resource block(s), and the second time-frequency resource block is a second-type time-frequency resource block in the first candidate resource pool.

In one embodiment, at least one of the antenna 452, the receiver 454, the multi-antenna receiving processor 458, the receiving processor 456, the controller/processor 459, the memory 460, or the data source 467 is used to receive a first signaling in a first time window in the present application.

In one embodiment, at least one of the antenna 452, the transmitter 454, the multi-antenna transmission processor 458, the transmitting processor 468, the controller/processor 459, the memory 460, or the data source 467 is used to transmit a second signaling and a second signal on a second time-frequency resource block in the present application.

In one embodiment, at least one of the antenna 452, the receiver 454, the multi-antenna receiving processor 458, the receiving processor 456, the controller/processor 459, the memory 460, or the data source 467 is used to measure a first signal on a first time-frequency resource block in the present application.

In one embodiment, at least one of the antenna 452, the receiver 454, the multi-antenna receiving processor 458, the receiving processor 456, the controller/processor 459, the memory 460, or the data source 467 is used to receive a third signaling in the present application.

In one embodiment, at least one of the antenna 420, the transmitter 418, the multi-antenna transmitting processor 471, the transmitting processor 416, the controller/processor 475, or the memory 476 is used to transmit a first signaling in a first time window in the present application.

In one embodiment, at least one of the antenna 420, the transmitter 418, the multi-antenna transmitting processor 471, the transmitting processor 416, the controller/processor 475, or the memory 476 is used to transmit a first signal in the present application.

In one embodiment, at least one of the antenna 420, the receiver 418, the multi-antenna receiving processor 472, the receiving processor 470, the controller/processor 475, or the memory 476 is used to receive a first signaling in a first time window in the present application.

In one embodiment, at least one of the antenna 420, the receiver 418, the multi-antenna receiving processor 472, the receiving processor 470, the controller/processor 475, or the memory 476 is used to receive a second signaling and a second signal on a second time-frequency resource block in the present application.

In one embodiment, at least one of the antenna 420, the receiver 418, the multi-antenna receiving processor 472, the receiving processor 470, the controller/processor 475, or the memory 476 is used to receive a first signal on a first time-frequency resource block in the present application.

In one embodiment, at least one of the antenna 420, the transmitter 418, the multi-antenna transmitting processor 471, the transmitting processor 416, the controller/processor 475, or the memory 476 is used to transmit a third signaling in the present application.

Embodiment 5A

Figure 5A:
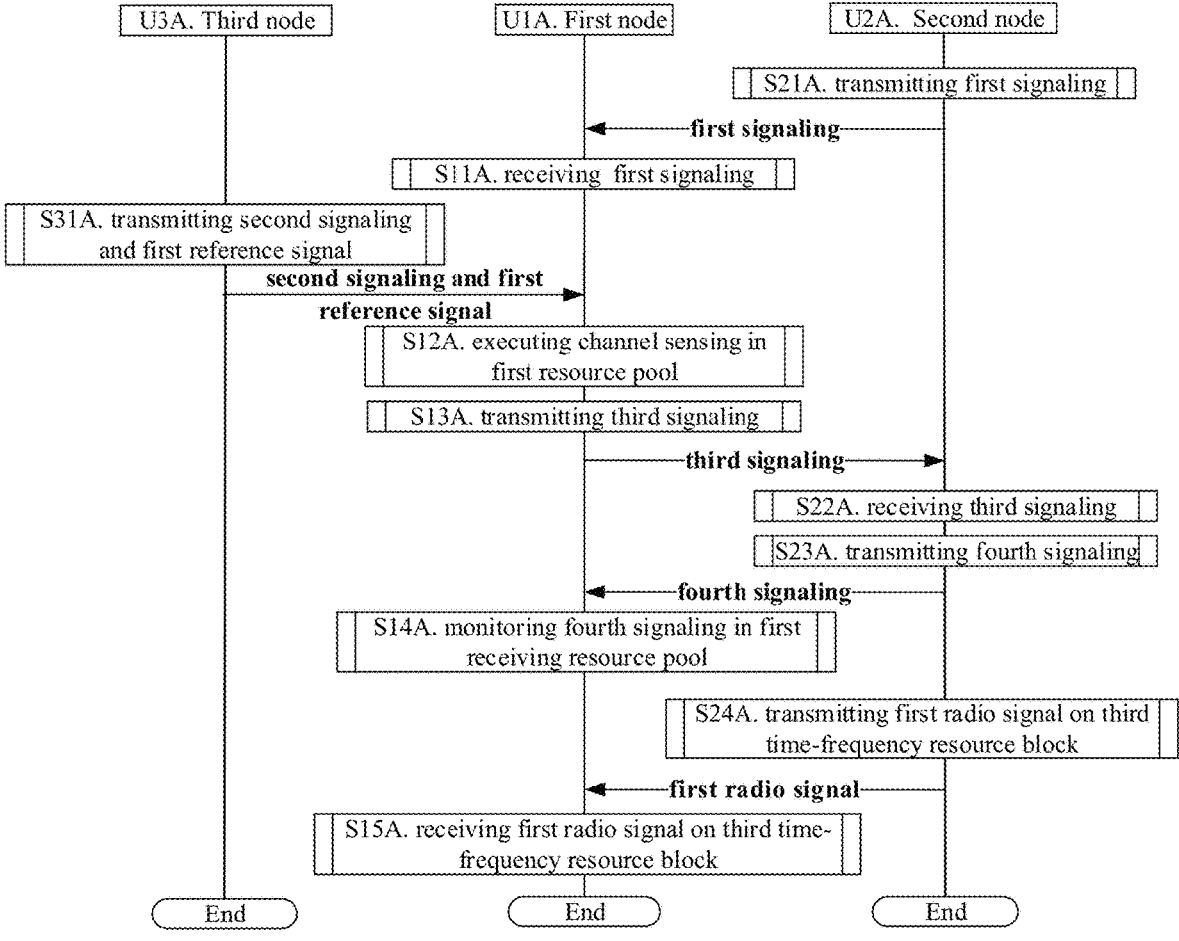
FIG. 5A illustrates a flowchart of radio signal transmission according to one embodiment of the present application.

Embodiment 5A illustrates a flowchart of radio signal transmission according to one embodiment in the present application, as shown in FIG. 5. In FIG. 5A, a first node U1A and a second node U2A as well as a first node U1A and a third node U3A are in communications via an air interface.

The first node U1A receives a first signaling in step S11A; executes channel sensing in a first resource pool in step S12A; transmits a third signaling in step S13A; monitors a fourth signaling in a first receiving resource pool in step S14A; receives a first radio signal on a third time-frequency resource block in step S15A.

The second node U2A transmits a first signaling in step S21A; receives a third signaling in step S22A; transmits a fourth signaling in step S23A; transmits a first radio signal on a third time-frequency resource block in step S24A.

The third node U3A transmits a second signaling and a first reference signal in step S31A.

In embodiment 5A, the first resource pool comprises M first-type time-frequency resource blocks, any of the M first-type time-frequency resource blocks occupies L continuous frequency-domain resource unit(s) in frequency domain, M being a positive integer greater than 1, L being a positive integer; the first signaling indicates L, and the first signaling comprises a first priority; the channel sensing comprises receiving a second signaling, the second signaling comprises a second priority, the second signaling indicates time-frequency resources occupied by a first reference signal, at least one of the M first-type time-frequency resource blocks is overlapped with time-frequency resources occupied by the first reference signal; a first time-frequency resource block is a first-type time-frequency resource block overlapping with time-frequency resources occupied by the first reference signal among the M first-type time-frequency resource blocks; the second node U2A and the third node U3A are non-co-located; the first priority and the second priority are used together to determine a first threshold; the channel sensing comprises that the first node U1A measures a first reference signal, a measurement performed on the first reference signal and the first threshold are used by together the first node U1A to determine whether a second time-frequency resource block belongs to a first candidate resource pool, and the second time-frequency resource block is associated with the first time-frequency resource block; the first candidate resource pool comprises N second-type time-frequency resource block(s), and any of the N second-type time-frequency resource block(s) is associated with one of the M first-type time-frequency resource blocks, N being a positive integer; the third signaling is used to indicate the first candidate resource pool; the third signaling comprises N third-type sub-signaling(s); the N third-type sub-signaling(s) is (are respectively) transmitted on the N second-type time-frequency resource block(s) comprised in the first candidate resource pool; the first receiving resource pool comprises X third-type time-frequency resource block(s), and the third time-frequency resource block is one of the X third-type time-frequency resource block(s); the fourth signaling indicates the third time-frequency resource block, and the fourth signaling comprises the first priority; the N second-type time-frequency resource block(s) comprised in the first candidate resource pool is (are respectively) associated with N third-type time-frequency resource block(s) in the first receiving resource pool, X being a positive integer not less than N.

In one embodiment, the first node U1A and the second node U2A are in communications via a PC5 interface.

In one embodiment, the first node U1A and the third node U3A are in communications via a PC5 interface.

In one embodiment, the first node U1A receives a target signaling.

In one embodiment, the target signaling comprises one or multiple fields of a PHY layer signaling.

In one embodiment, the target signaling comprises one or multiple fields in an SCI.

In one embodiment, the target signaling comprises an SCI.

In one embodiment, the target signaling comprises one or multiple fields in 1$^{st}$-stage SCI format.

In one embodiment, the target signaling comprises all or part of a higher-layer signaling.

In one embodiment, the target signaling comprises all or part of a MAC layer signaling.

In one embodiment, the target signaling comprises one or multiple fields of a MAC CE.

In one embodiment, a channel occupied by the target signaling comprises a PSCCH.

In one embodiment, a channel occupied by the target signaling comprises a PSSCH.

In one embodiment, the target signaling is the first signaling.

In one embodiment, the target signaling is the second signaling.

In one embodiment, the target signaling is one of the first signaling or the second signaling.

In one embodiment, the target signaling comprises a first field, and the first field in the target signaling indicates that the target signaling is one of the first signaling or the second signaling.

In one embodiment, the target signaling comprises a first field, and the first field in the target signaling indicates one of a positive integer number of first-type value(s) or a positive integer number of second-type value(s).

In one embodiment, the positive integer number of first-type value(s) is (are respectively) positive integer number of non-negative integer(s).

In one embodiment, the positive integer number of second-type value(s) is (are respectively) positive integer number of non-negative integer(s).

In one embodiment, any of the positive integer number of first-type value(s) is less than any of the positive integer number of second-type value(s).

In one embodiment, any of the positive integer number of first-type value(s) is greater than any of the positive integer number of second-type value(s).

In one embodiment, when the first field in the target signaling indicates one of a positive integer number of first-type value(s), the target signaling is the first signaling; when the first field in the target signaling indicates one of a positive integer number of second-type value(s), the target signaling is the second signaling;

In one embodiment, when the first field in the target signaling indicates one of a positive integer number of first-type value(s), the target signaling is used to trigger a transmission of the third signaling; when the first field in the target signaling indicates one of the positive integer number of second-type value(s), the target signaling is used to schedule a second radio signal, and the second radio signal comprises the first reference signal.

In one embodiment, the first node U1A receives a target signaling, the target signaling comprises a first field, and the first field in the target signaling indicates one of a positive integer number of first-type value(s) or a positive integer number of second-type value(s); when the first field in the target signaling indicates one of a positive integer number of first-type value(s), the target signaling is the first signaling, and the target signaling is used to trigger a transmission of the third signaling; when the second field in the target signaling indicates one of the positive integer number of second-type value(s), the target signaling is the second signaling, the target signaling is used to schedule a second data block, the second data block is used to generate a second radio signal, and the second radio signal comprises the first reference signal.

In one embodiment, a transmitter of the first signaling and a transmitter of the second signaling are non-co-located.

In one embodiment, a transmitter of the first signaling is the second node U2A in the present application, and a transmitter of the second signaling is the third node U3A in the present application.

In one embodiment, a transmitter of the first signaling and a transmitter of the second signaling are respectively two different communication nodes.

In one embodiment, a transmitter of the first signaling and a transmitter of the second signaling are respectively two different UEs.

In one embodiment, a transmitter of the first signaling is a UE, and a transmitter of the second signaling is a user relay.

In one embodiment, a Backhaul Link between a transmitter of the first signaling and a transmitter of the second signaling is non-ideal (that is, delay cannot be ignored).

In one embodiment, a transmitter of the first signaling and a transmitter of the second signaling do not share a same set of BaseBand devices.

In one embodiment, the first candidate resource pool is used for SL transmission.

In one embodiment, the first candidate resource pool comprises partial resources in an SL resource pool.

In one embodiment, the first candidate resource pool comprises partial resources in an SL receiving resource pool.

In one embodiment, a first candidate resource pool comprises N second-type time-frequency resource block(s), and any of the N second-type time-frequency resource block(s) comprised in the first candidate resource pool comprises multiple REs, N being a positive integer.

In one embodiment, the N second-type time-frequency resource block(s) comprised in the first candidate resource pool comprises (comprise) L continuous frequency-domain resource unit(s) in frequency domain.

In one embodiment, any of the N second-type time-frequency resource block(s) comprised in the first candidate resource pool comprises L continuous frequency-domain resource unit(s) in frequency domain.

In one embodiment, any of the N second-type time-frequency resource block(s) comprised in the first candidate resource pool comprises L continuous sub-channel(s) in frequency domain.

In one embodiment, the N second-type time-frequency resource block(s) comprised in the first candidate resource pool is (are respectively) later than the M first-type time-frequency resource blocks comprised in the first resource pool in time domain.

In one embodiment, any of the N second-type time-frequency resource block(s) comprised in the first candidate resource pool is associated with one of the M first-type time-frequency resource blocks comprised in the first resource pool.

In one embodiment, L continuous frequency-domain resource unit(s) comprised in any of the N second-type time-frequency resource block(s) comprised in the first candidate resource pool in frequency domain is(are) the same as L continuous frequency-domain resource unit(s) comprised in one of the M first-type time-frequency resource blocks in frequency domain.

In one embodiment, a positive integer number of multi-carrier symbol(s) comprised in any of the N second-type time-frequency resource block(s) comprised in the first candidate resource pool is (are respectively) differs by a first-type time interval from a positive integer number of multicarrier symbol(s) comprised in one of the M first-type time-frequency resource blocks in time domain; L continuous frequency-domain resource unit(s) comprised in any of the N second-type time-frequency resource block(s) comprised in the first candidate resource pool in frequency domain is(are) the same as L continuous frequency-domain resource unit(s) comprised in one of the M first-type time-frequency resource blocks in frequency domain.

In one embodiment, the first-type time interval comprises a positive integer number of slot(s).

In one embodiment, the first-type time interval comprises a positive integer number of multicarrier symbol(s).

In one embodiment, the first receiving resource pool is used for an SL reception.

In one embodiment, the first receiving resource pool is used for a PSCCH reception.

In one embodiment, the first receiving resource pool is used for a PSSCH reception.

In one embodiment, the first receiving resource pool comprises all or partial resources in an SL resource pool.

In one embodiment, the first receiving resource pool comprises all or partial resources in an SL receiving resource pool.

In one embodiment, the first receiving resource pool comprises multiple REs.

In one embodiment, any of the multiple REs comprised in the first receiving resource pool occupies a multicarrier symbol in time domain and a subcarrier in frequency domain.

In one embodiment, the first receiving resource pool is configured by a higher-layer signaling.

In one embodiment, the first receiving resource pool is configured by an RRC signaling.

In one embodiment, the first receiving resource pool is pre-configured.

In one embodiment, the first receiving resource pool comprises X third-type time-frequency resource block(s), and any of the X third-type time-frequency resource block(s) comprises L continuous frequency-domain resource unit(s) in frequency domain.

In one embodiment, the first receiving resource pool comprises X third-type time-frequency resource block(s), and any of the X third-type time-frequency resource block(s) comprises L continuous sub-channel(s) in frequency domain.

In one embodiment, the first receiving resource pool comprises X third-type time-frequency resource block(s), and any of the X third-type time-frequency resource block(s) comprises multiple REs.

In one embodiment, the N second-type time-frequency resource block(s) comprised in the first candidate resource pool is (are respectively) associated with N third-type time-frequency resource block(s) in the X third-type time-frequency resource block(s) comprised in the first receiving resource pool, X being a positive integer not less than N.

In one embodiment, X is a positive integer not less than N.

In one embodiment, X is equal to N, and the N second-type time-frequency resource block(s) comprised in the first candidate resource pool is (are respectively) associated with the N third-type time-frequency resource block(s) comprised in the first receiving resource pool.

In one embodiment, there exists a third-type time-frequency resource block in the first receiving resource pool being different from any of the N second-type time-frequency resource block(s) comprised in the first candidate resource pool.

In one embodiment, the N second-type time-frequency resource block(s) comprised in the first candidate resource pool is (are respectively) the same as the N third-type time-frequency resource block(s) comprised in the first receiving resource pool.

In one embodiment, the first receiving resource pool is later than the first candidate resource pool in time domain.

In one embodiment, any of the N second-type time-frequency resource block(s) comprised in the first candidate resource pool is (are respectively) earlier than any third-type time-frequency resource block in the first receiving resource pool in time domain.

In one embodiment, frequency-domain resources occupied by any of the N second-type time-frequency resource block(s) comprised in the first candidate resource pool in frequency domain are the same as frequency-domain resources occupied by a third-type time-frequency resource block comprised in the first receiving resource pool in frequency domain.

In one embodiment, the L continuous frequency-domain resource unit(s) occupied by any of the N second-type time-frequency resource block(s) comprised in the first candidate resource pool in frequency domain is(are) the same as the L continuous frequency-domain resource unit(s) occupied by a third-type time-frequency resource block comprised in the first receiving resource pool in frequency domain.

In one embodiment, the L continuous sub-channel(s) occupied by any of the N second-type time-frequency resource block(s) comprised in the first candidate resource pool in frequency domain is(are) the same as the L continuous sub-channel(s) occupied by a third-type time-frequency resource block comprised in the first receiving resource pool in frequency domain.

In one embodiment, frequency-domain resources occupied by any of the X third-type time-frequency resource block(s) comprised in the first receiving resource pool in frequency domain are the L continuous frequency-domain resource unit(s).

In one embodiment, frequency-domain resources occupied by any of the X third-type time-frequency resource block(s) comprised in the first receiving resource pool in frequency domain are the L continuous sub-channel(s).

In one embodiment, the third time-frequency resource block is one of the X third-type time-frequency resource block(s) comprised in the first receiving resource pool.

In one embodiment, any of the multiple REs comprised in the third time-frequency resource block occupies a multi-carrier symbol in time domain and a subcarrier in frequency domain.

In one embodiment, the third time-frequency resource block comprises L continuous frequency-domain resource unit(s) in frequency domain.

In one embodiment, the third time-frequency resource block comprises L continuous sub-channel(s) in frequency domain.

In one embodiment, the fourth signaling comprises one or multiple fields of a PHY layer signaling.

In one embodiment, the fourth signaling comprises one or multiple fields in an SCI.

In one embodiment, the fourth signaling comprises an SCI.

In one embodiment, the fourth signaling comprises all or part of a higher-layer signaling.

In one embodiment, a channel occupied by the fourth signaling comprises a PSCCH.

In one embodiment, a channel occupied by the fourth signaling comprises a PSSCH.

In one embodiment, the fourth signaling is used to indicate the third time-frequency resource block.

In one embodiment, the fourth signaling indicates time-domain resources comprised in the third time-frequency resource block.

In one embodiment, the fourth signaling indicates frequency-domain resources comprised in the third time-frequency resource block.

In one embodiment, the fourth signaling indicates an index of the third time-frequency resource block in the X third-type time-frequency resource blocks comprised in the first receiving resource pool.

In one embodiment, the fourth signaling comprises the first priority.

In one embodiment, the fourth signaling is used to schedule the first radio signal.

In one embodiment, the fourth signaling is used to indicate a DMRS adopted by the first radio signal.

In one embodiment, the fourth signaling is used to indicate a Modulation and Coding Scheme (MCS) adopted by the first radio signal.

In one embodiment, the monitoring a fourth signaling refers to a reception based on blind detecting, that is, the first node U1A receives a signal in the first receiving resource pool and executes decoding operation, when the decoding is determined correct according to a CRC bit, it is judged that the fourth signaling is successfully received in the first receiving resource pool; when the decoding is determined incorrect according to a CRC bit, it is judged that the fourth signaling is not successfully detected in the first receiving resource pool.

In one embodiment, the monitoring a fourth signaling refers to a reception based on coherent detecting, that is, the first node U1A uses an RS sequence corresponding to a DMRS of the fourth signaling to execute a coherent reception on a radio signal, and measures energy of a signal obtained after the coherent reception; when energy of a signal obtained after the coherent reception is greater than a first given threshold, it is judged that the fourth signaling is successfully received in the first receiving resource pool; when energy of a signal obtained after the coherent reception is less than a first given threshold, it is judged that the fourth signaling is not successfully detected in the first receiving resource pool.

In one embodiment, the monitoring a fourth signaling refers to a reception based on energy detection, that is, the first node U1A senses energy of a radio signal in the first receiving resource pool, and averages it in time to obtain received energy; when the received energy is greater than a second given threshold, it is judged that the fourth signaling is successfully received in the first receiving resource pool; when the received energy is less than a second given threshold, it is judged that the fourth signaling is not successfully detected in the first receiving resource pool.

In one embodiment, the fourth signaling being detected refers to after the fourth signaling is received based on blind detecting, the decoding is determined correct according to a CRC bit.

In one embodiment, when the fourth signaling is detected, the first node U1A receives the first radio signal on the third time-frequency resource block.

In one embodiment, the first radio signal is transmitted on an SL-SCH.

In one embodiment, the first radio signal is transmitted on a PSCCH.

In one embodiment, the first radio signal is transmitted on a PSSCH.

In one embodiment, the first radio signal comprises all or part of a higher-layer signaling.

In one embodiment, the first radio signal comprises all or part in an RRC-layer signal.

In one embodiment, the first radio signal comprises one or multiple fields in a PHY layer signaling.

In one embodiment, the first radio signal comprises an SCI.

In one embodiment, the first radio signal comprises $2^{nd}$-stage SCI.

In one embodiment, the first radio signal comprises a first data block, and the first data block comprises a positive integer number of bit(s).

In one embodiment, a first data block is used to generate the first radio signal, and the first data block comprises a positive integer number of bit(s).

In one embodiment, the first data block comprises a positive integer number of bit(s), and all or partial bits in the positive integer number of bit(s) comprised in the first data block are used to generate the first radio signal.

In one embodiment, the first data block comprises one CW.

In one embodiment, the first data block comprises one CB.

In one embodiment, the first data block comprises one CBG.

In one embodiment, the first data block comprises one TB.

In one embodiment, the first radio signal is obtained after all or partial bits of the first data block sequentially through transport block-level Cyclic Redundancy Check (CRC) attachment, Code Block Segmentation, code block-level CRC attachment, Channel Coding, Rate Matching, Code Block Concatenation, Scrambling, Modulation, Layer Mapping, Antenna Port Mapping, Mapping to Physical Resource Blocks, Baseband Signal Generation and Modulation and Upconversion.

In one embodiment, the first radio signal is an output after the first data block is sequentially through a modulation mapper, a layer mapper, precoding, a resource element mapper, and multi-carrier symbol generation.

In one embodiment, the channel coding is based on a polar code.

In one embodiment, the channel coding is based on a Low-density Parity-Check (LDPC) code.

Embodiment 5B

Figure 5B:
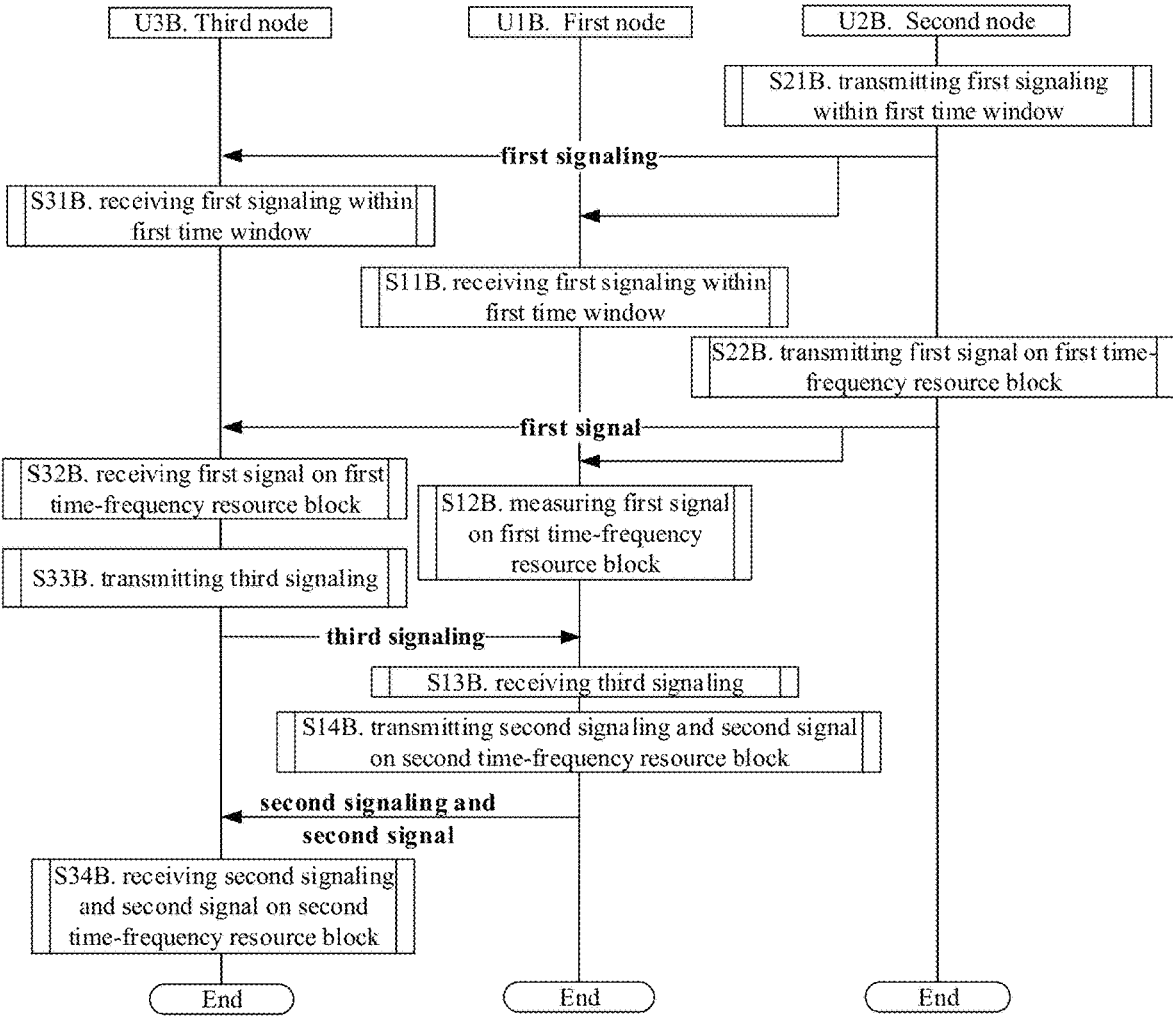
FIG. 5B illustrates a flowchart of radio signal transmission according to one embodiment of the present application.

Embodiment 5B illustrates a flowchart of radio signal transmission according to one embodiment in the present application, as shown in FIG. 5. In FIG. 5B, a first node U1B, a second U2B and a third node U3B are in communications via an air interface.

The first node U1B receives a first signaling in a first time window in step S11B; measures a first signal on a first time-frequency resource block in step S12B; receives a third signaling in step S13B; transmits a second signaling and a second signal on a second time-frequency resource block in step S14B.

The second node U2B transmits a first signaling in a first time window in step S21B; transmits a first signal on a first time-frequency resource block in step S22B.

The third node U3B receives a first signaling in a first time window in step S31B; receives a first signal on a first time-frequency resource block in step S32B; transmits a third signaling in step S33B; receives a second signaling and a second signal on a second time-frequency resource block in step S34B.

In embodiment 5B, the first signaling comprises a first priority and a first identifier, and the first identifier is used to identify a positive integer number of communication node(s); the first signaling indicates a first time-frequency resource block, and the first time-frequency resource block is a first-type time-frequency resource block in the first time window; the second signaling comprises a second priority and a second identifier, the second identifier is used to identify a positive integer number of communication node(s), and the positive integer number of communication node(s) identified by the second identifier comprises the third node U3B; the second signaling indicates the second time-frequency resource block; a first bit block is used to generate the second signal; the first priority and the second priority are used together to determine a first threshold, and the first priority and the second priority are used together to determine a second threshold; the first threshold is less than the second threshold: when the positive integer number of communication node(s) identified by the first identifier comprises (comprise) the third node U3B, a target threshold is the first threshold; when the positive integer number of communication node(s) identified by the first identifier does (do) not comprise the third node U3B, a target threshold is the second threshold; the first time-frequency resource block is associated with a first target time-frequency resource block, and the target threshold is used to determine whether the first target time-frequency resource block belongs to a first candidate resource pool; the first candidate resource pool comprises a positive integer number of second-type time-frequency resource block(s), and the second time-frequency resource block is a second-type time-frequency resource block in the first candidate resource pool; when a measurement performed on the first signal is greater than the target threshold, the first target time-frequency resource block does not belong to the first candidate resource pool; when a measurement performed on the first signal is not greater than the target threshold, the first target time-frequency resource block belongs to the first candidate resource pool; the third signaling is used to indicate a first offset value, and the second threshold is a sum of the first threshold and the first offset value.

In one embodiment, the first node U1B and the second node U2B are in communications via a PC5 interface.

In one embodiment, the first node U1B and the third node U2B are in communications via a PC5 interface.

In one embodiment, the first node U2B and the third node U3B are in communications via a PC5 interface.

In one embodiment, the third signaling comprises one or multiple fields of a PHY layer signaling.

In one embodiment, the third signaling comprises one or multiple fields in an SCI.

In one embodiment, the third signaling comprises an SCI.

In one embodiment, the third signaling comprises one or multiple fields in $1^{st}$-stage SCI format.

In one embodiment, the third signaling comprises one or multiple fields in $2^{nd}$-stage SCI format.

In one embodiment, the third signaling comprises all or part of a higher-layer signaling.

In one embodiment, the third signaling comprises all or part of an RRC signaling.

In one embodiment, the third signaling comprises one or multiple fields of an RRC IE.

In one embodiment, the third signaling comprises all or part of a PC5-RRC signaling.

In one embodiment, the third signaling comprises all or part of a MAC-layer signaling.

In one embodiment, the third signaling comprises one or multiple fields of a MAC CE.

In one embodiment, a channel occupied by the third signaling comprises a PSCCH.

In one embodiment, a channel occupied by the third signaling comprises a PSSCH.

In one embodiment, the third signaling directly indicates the first offset value.

In one embodiment, the third signaling indirectly indicates the first offset value.

In one embodiment, the third signaling comprises a positive integer number of field(s), and the first offset value is one of the positive integer number of field(s) comprised in the third signaling.

In one embodiment, an offset value list comprises a positive integer number offset value(s), and the first offset value is one of the positive integer number offset value(s) comprised in the offset value list.

In one embodiment, the third signaling indicates a position of the first offset value in the positive integer number of offset value(s) comprised in the offset value list.

In one embodiment, the third signaling indicates an index of the first offset value in the positive integer number of offset value(s) comprised in the offset value list.

In one embodiment, the first offset value is a non-negative integer.

In one embodiment, the first offset value is a non-negative integer less than 129.

In one embodiment, the first offset value is equal to 0.

In one embodiment, the first offset value is a positive real number.

In one embodiment, the first offset value is measured by dB.

In one embodiment, the first offset value is measured by dBm.

In one embodiment, the first offset value is measured by W.

In one embodiment, the first offset value is measured by mW.

In one embodiment, the first offset value is related to a relation of the first priority and the second priority.

In one embodiment, one subembodiment of the above embodiment, when the first priority is greater than the second priority, the first offset value is a positive real number.

In one embodiment, one subembodiment of the above embodiment, when the first priority is greater than the second priority, the first offset value is a positive integer.

In one embodiment, one subembodiment of the above embodiment, when the first priority is equal to the second priority, the first offset value is a positive real number.

In one embodiment, one subembodiment of the above embodiment, when the first priority is equal to the second priority, the first offset value is a positive integer.

In one embodiment, one subembodiment of the above embodiment, when the first priority is less than the second priority, the first offset value is equal to 0.

In one embodiment, one subembodiment of the above embodiment, when the first priority is less than the second priority, the first offset value is equal to 0.

In one embodiment, any of the positive integer number of offset value(s) comprised in an offset value list is a non-negative integer less than 129.

In one embodiment, any of the positive integer number of offset value(s) comprised in an offset value list is a non-negative real number.

In one embodiment, any of the positive integer number of offset value(s) comprised in an offset value list is measured by dB.

In one embodiment, any of the positive integer number of offset value(s) comprised in an offset value list is measured by dBm.

In one embodiment, any of the positive integer number of offset value(s) comprised in an offset value list is measured by W.

In one embodiment, any of the positive integer number of offset value(s) comprised in an offset value list is measured by mW.

In one embodiment, the first signal comprises a first sequence.

In one embodiment, a first sequence is used to generate the first signal.

In one embodiment, the first sequence is a Pseudo-Random Sequence.

In one embodiment, the first sequence is a Low-Peak to Average Power Ratio (Low-PAPR) sequence.

In one embodiment, the first sequence is a Gold sequence.

In one embodiment, the first sequence is an M sequence.

In one embodiment, the first sequence is a Zadeoff-Chu (ZC) sequence.

In one embodiment, the first signal is obtained after the first sequence is sequentially through Sequence Generation, DFT, Modulation and Resource Element Mapping, and wideband symbol generation.

In one embodiment, the first signal is obtained after the first sequence is sequentially through sequence generation, resource elements mapping and wideband symbol generation.

In one embodiment, the first sequence is mapped to a positive integer number of RE(s).

In one embodiment, the first signal is used for data demodulation.

In one embodiment, the first signal is used to detect channel status information.

In one embodiment, the first signal comprises an SL Demodulation Reference Signal (DMRS).

In one embodiment, the first signal comprises a PSCCH DMRS.

In one embodiment, the first signal comprises a PSSCH DMRS.

In one embodiment, the first signal comprises an Uplink (UL) DMRS.

In one embodiment, the first signal comprises an SL Channel State Information-Reference Signal (SL CSI-RS).

In one embodiment, the first signal comprises a UL Sounding Reference Signal (UL SRS).

In one embodiment, the first signal comprises a Sidelink Synchronization Signal/Physical Sidelink Broadcast Channel Block (S-SS/PSBCH Block).

In one embodiment, the first signal is measured on the first time-frequency resource block.

In one embodiment, the phrase of "measuring a first signal" comprises measuring the first signal on time-frequency resources occupied by the first signal.

In one embodiment, the phrase of "measuring a first signal" comprises executing a coherent detection based reception on time-frequency resources occupied by the first signal, that is, the first node uses the first sequence comprised in the first signal to coherently receive signals on time-frequency resources occupied by the first signal, and measures signal energy obtained after the coherent reception.

In one embodiment, the phrase of "measuring a first signal" comprises executing a coherent detection based reception on time-frequency resources occupied by the first signal, that is, the first node uses the first sequence comprised in the first signal to coherently receive signals on time-frequency resources occupied by the first signal, and then linearly averages signal power received on the multiple REs comprised in time-frequency resources occupied by the first signal to obtain received power.

In one embodiment, the phrase of "measuring a first signal" comprises executing a coherent detection based reception on time-frequency resources occupied by the first signal, that is, the first node uses the first sequence comprised in the first signal to coherently receive signals on time-frequency resources occupied by the first signal, and then averages received signal energy in time domain and frequency domain to obtain received power.

In one embodiment, the phrase of "measuring a first signal" comprises executing an energy detection based reception on time-frequency resources occupied by the first signal, that is, the first node senses energy of radio signals on the multiple REs comprised in time-frequency resources occupied by the first signal, and averages it on the multiple REs comprised in time-frequency resources occupied by the first signal to obtain received power.

In one embodiment, the phrase of "measuring a first signal on the first time-frequency resource block" comprises executing an energy detection based reception on the first time-frequency resource block, that is, the first node receives power of a radio signal on the first time-frequency resource block, and linearly averages the received signal power to obtain a signal strength indication; the first time-frequency resource block comprises time-frequency resources occupied by the first signal.

In one embodiment, the phrase of "measuring a first signal on the first time-frequency resource block" comprises executing an energy detection based reception on the first time-frequency resource block, that is, the first node senses energy of a radio signal on the first time-frequency resource block and averages it on time to obtain a signal strength indication; the first time-frequency resource block comprises time-frequency resources occupied by the first signal.

In one embodiment, the phrase of "measuring a first signal on the first time-frequency resource block" comprising a blind detection based reception on the first time-frequency resource block, that is, the first node receives a signal on the first time-frequency resource block and executes a decoding operation, determines whether the decoding is correct based on a CRC bit to obtain channel quality of the first signal on time-frequency resources occupied by the first signal.

Embodiment 6A

Figure 6A:
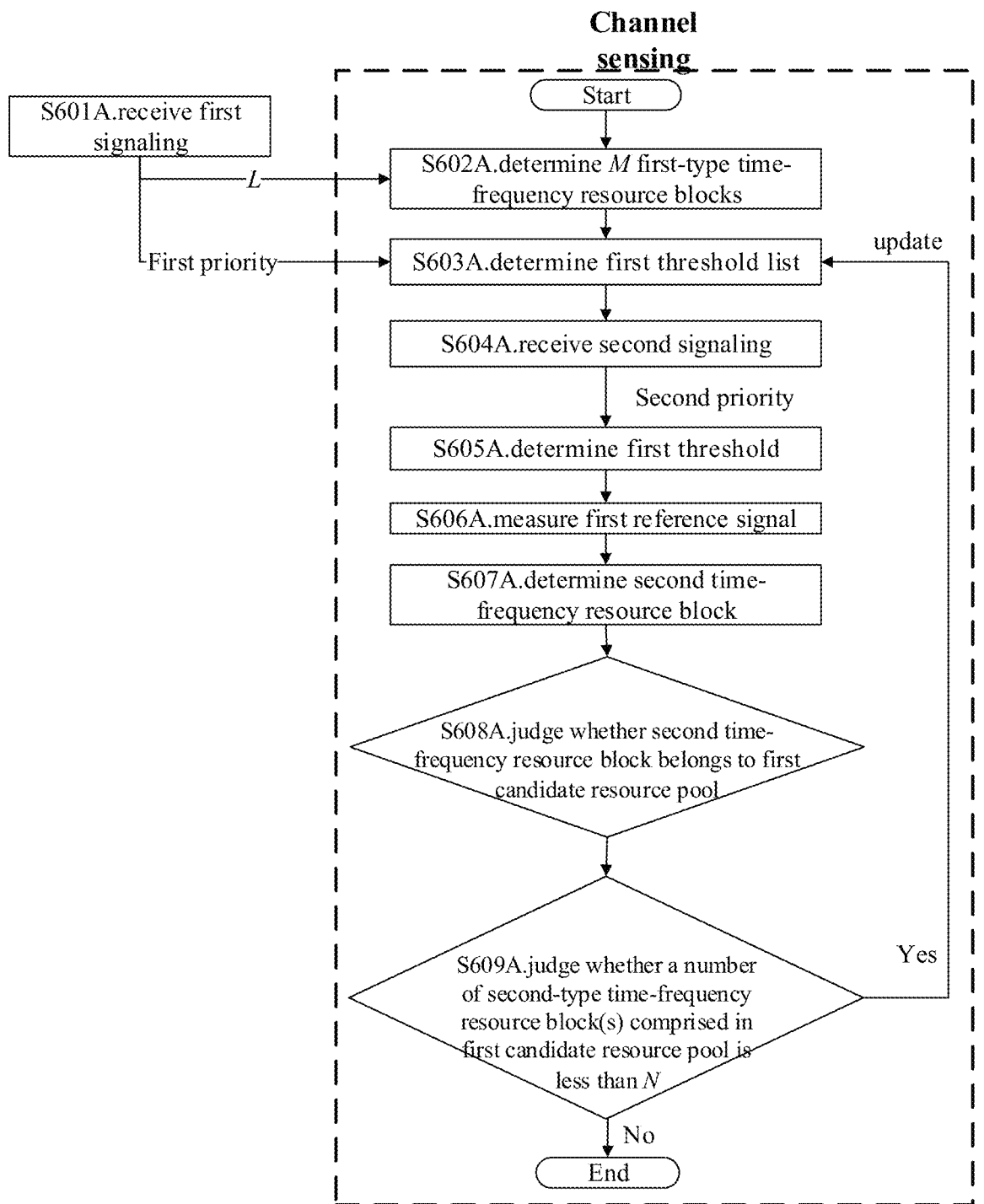
FIG. 6A illustrates a flowchart of executing channel sensing according to one embodiment of the present application.

Embodiment 6A illustrates a flowchart of executing channel sensing according to one embodiment of the present application, as shown in FIG. 6A. In FIG. 6A, receive a first signaling in step S601A; determine M first-type time-frequency resource blocks in step S602A; determine a first threshold list in step S603A; receive a second signaling in step S604A; determine a first threshold in step S605A; measure a first reference signal in step S606A; determine a second time-frequency resource block in step S607A; judge whether a second time-frequency resource block belongs to a first candidate resource pool in step S608A; judge whether a number of second-type time-frequency resource block(s) comprised in a first candidate resource pool is less than N in step S609A, N being a positive integer; if yes, update a first threshold list, and start executing from the step S603A; if no, end the executing.

In embodiment 6A, the channel sensing comprises receiving a second signaling and measuring a first reference signal; the second signaling indicates the second priority and time-frequency resources occupied by the first reference signal; a first time-frequency resource block is a first-type time-frequency resource block overlapping with time-frequency resources occupied by the first reference signal among the M first-type time-frequency resource blocks; the second time-frequency resource block is associated with a second-type time-frequency resource block in the first time-frequency resource block; the first priority and the second priority in the present application are used together to determine a first threshold; a measurement performed on the first reference signal and the first threshold are used together to determine whether the second time-frequency resource block belongs to the first candidate resource pool.

In one embodiment, the channel sensing comprises receiving a second signaling, measuring a first reference signal and judging whether a second time-frequency resource block belongs to a first candidate resource pool.

In one embodiment, the channel sensing comprises determining M first-type time-frequency resource blocks, determining a first threshold list, receiving a second signaling, determining the first threshold, measuring a first reference signal, determining a second time-frequency resource block, and judging whether a second time-frequency resource block belongs to a first candidate resource pool.

In one embodiment, the channel sensing is used to determine the first candidate resource pool.

In one embodiment, the channel sensing is performed with L continuous frequency-domain resource unit(s) as a unit.

In one embodiment, granularity of the channel sensing is L continuous frequency-domain resource unit(s).

In one embodiment, L indicated by the first signaling is used to determine the M first-type time-frequency resource block from the first resource pool, and any of the M first-type time-frequency resource blocks comprises L continuous frequency resource unit(s).

In one embodiment, a first threshold pool comprises a positive integer number of first-type threshold(s).

In one embodiment, any first-type threshold in the first threshold pool is measured by dBm.

In one embodiment, any first-type threshold in the first threshold pool is measured by dB.

In one embodiment, any first-type threshold in the first threshold pool is measured by mW.

In one embodiment, any first-type threshold in the first threshold pool is measured by W.

In one embodiment, the first threshold pool comprises 64 first-type thresholds.

In one embodiment, any first-type threshold in the first threshold pool is a non-positive integer.

In one embodiment, any first-type threshold in the first threshold pool is $(-128+(n-1)\times2)$ dBm, n being a positive integer not greater than 65.

In one embodiment, any first-type threshold in the first threshold pool is one of minus infinity dBm, $(-128+(n-1)\times2)$ dBm, or infinity dBm, n being a positive integer not greater than 65.

In one embodiment, the first threshold pool comprises [−infinity dBm, −128 dBm, −126 dBm, . . . , 0 dBm, infinity dBm].

In one embodiment, any two adjacent thresholds other than a first threshold and a last threshold in the first threshold pool differ by 2 dB.

In one embodiment, the first threshold pool comprises a positive integer number of first-type threshold list(s), any of the positive integer number of first-type threshold list(s) comprises a positive integer number of first-type threshold(s), and the first threshold list is one of the positive integer number of first-type threshold list(s) comprised in the first threshold pool.

In one embodiment, the first threshold list comprises a positive integer number of first-type threshold(s), and any of the positive integer number of first-type threshold(s) comprised in the first threshold list belongs to a first-type threshold in the first threshold pool.

In one embodiment, the first priority comprised in the first signaling is used to determine the first threshold list from the positive integer number of first-type threshold list(s) comprised in the first threshold pool.

In one embodiment, the first priority comprised in the first signaling indicates an index of the first threshold list in the positive integer number of first-type threshold list(s) comprised in the first threshold pool.

In one embodiment, the first ode monitors the second signaling in the first resource pool.

In one embodiment, the channel sensing comprises receiving the second signaling in the first resource pool.

In one embodiment, the second signaling indicates time-frequency resources occupied by the first reference signal, and time-frequency resources occupied by the first reference signal comprise a positive integer number of RE(s).

In one embodiment, the second signaling indicates time-frequency resources occupied by the first reference signal, and time-frequency resources occupied by the first reference signal comprise a positive integer number of multicarrier symbol(s) in time domain, and a positive integer number of subcarrier(s) in frequency domain.

In one embodiment, the second signaling indicates time-frequency resources occupied by a second radio signal, and time-frequency resources occupied by the second radio signal comprise a positive integer number of RE(s).

In one embodiment, the second signaling indicates time-frequency resources occupied by a second radio signal, and time-frequency resources occupied by the second radio signal comprise a positive integer number of subcarrier symbol(s) in time domain, and a positive integer number of subcarrier(s) in frequency domain.

In one embodiment, the second signaling indicates time-frequency resources occupied by a second radio signal, and the second radio signal comprises the first reference signal.

In one embodiment, the second signaling indicates time-frequency resources occupied by a second radio signal, and the first reference signal is used to demodulate the second radio signal.

In one embodiment, the second signaling indicates a fourth time-frequency resource block, and the fourth time-frequency resource block comprises multiple REs.

In one embodiment, the second signaling indicates a fourth time-frequency resource block, and the fourth time-frequency resource block comprises multiple multicarrier symbols in time domain and a positive integer number of PRB(s) in frequency domain.

In one embodiment, the second signaling indicates a fourth time-frequency resource block, and the fourth time-frequency resource block comprises multiple multicarrier symbols in time domain and a positive integer number of sub-channel(s) in frequency domain.

In one embodiment, any of the multiple REs comprised in the fourth time-frequency resource block belongs to the first resource pool.

In one embodiment, any of the multiple REs comprised in the fourth time-frequency resource block is one of the multiple REs comprised in the first resource pool.

In one embodiment, the fourth time-frequency resource block comprises a PSCCH.

In one embodiment, the fourth time-frequency resource block comprises a PSSCH.

In one embodiment, the fourth time-frequency resource block comprises a PSCCH and a PSSCH.

In one embodiment, the second signaling indicates the fourth time-frequency resource block, the fourth time-frequency resource block comprises time-frequency resources occupied by the second radio signal and time-frequency resources occupied by the first reference signal, and the first reference signal is used to demodulate the second radio signal.

In one embodiment, any of the positive integer number of RE(s) comprised in time-frequency resources occupied by the second radio signal belongs to the fourth time-frequency resource block, any of the positive RE(s) comprised in time-frequency resources occupied by the first reference signal belongs to the fourth time-frequency resource block, and the first reference signal is used to demodulate the first radio signal.

In one embodiment, at least one of the M first-type time-frequency resource blocks comprised in the first resource pool has an overlapping with time-frequency resources occupied by the first reference signal.

In one embodiment, time-frequency resources occupied by the first reference signal comprise multiple REs.

In one embodiment, time-frequency resources occupied by the first reference signal comprise a positive integer number of multicarrier symbol(s) in time domain.

In one embodiment, time-frequency resources occupied by the first reference signal comprise a positive integer number of subcarrier(s) in frequency domain.

In one embodiment, time-frequency resources occupied by the first reference signal comprise a positive integer number of PRB(s) in frequency domain.

In one embodiment, at least one of multiple REs comprised in at least one of the M first-type time-frequency resource blocks is the same as one of the multiple REs comprised in time-frequency resources occupied by the first reference signal.

In one embodiment, at least one of the positive integer number of multicarrier symbol(s) comprised in at least one of the M first-type time-frequency resource blocks in time domain is the same as one of the positive integer number of multicarrier symbol(s) comprised in time-frequency resources occupied by the first reference signal in time domain.

In one embodiment, at least one multicarrier symbol comprised in at least one of the M first-type time-frequency resource blocks in time domain is the same as one multicarrier symbol comprised in time-frequency resources occupied by the first reference signal in time domain.

In one embodiment, at least one of the positive integer number of slot(s) comprised in at least one of the M first-type time-frequency resource blocks in time domain comprises one of the positive integer number of multicarrier symbol(s) comprised in time-frequency resources occupied by the first reference signal in time domain.

In one embodiment, at least one of the positive integer number of multicarrier symbol(s) comprised in time-frequency resources occupied by the first reference signal in time domain belongs to at least one of the positive integer number of slot(s) comprised in at least one of the M first-type time-frequency resource blocks in time domain.

In one embodiment, all of the positive integer number of multicarrier symbol(s) comprised in time-frequency resources occupied by the first reference signal in time domain belongs to at least one of the positive integer number of slot(s) comprised in at least one of the M first-type time-frequency resource blocks in time domain.

In one embodiment, at least one of the positive integer number of multicarrier symbol(s) comprised in time-frequency resources occupied by the first reference signal in time domain and the positive integer number of multicarrier symbol(s) comprised in at least one of the M first-type time-frequency resource blocks in time domain belong to a same slot.

In one embodiment, the positive integer number of multicarrier symbol(s) comprised in time-frequency resources occupied by the first reference signal in time domain and the positive integer number of multicarrier symbol(s) comprised in at least one of the M first-type time-frequency resource blocks in time domain belong to a same slot.

In one embodiment, at least one of the positive integer number of subcarrier(s) comprised in at least one of the M first-type time-frequency resource blocks in frequency domain is the same as one of the positive integer number of subcarrier(s) comprised in time-frequency resources occupied by the first reference signal in frequency domain.

In one embodiment, at least one of the positive integer number of subcarrier(s) comprised in time-frequency resources occupied by the first reference signal in frequency domain belong to the positive integer number of subcarrier(s) comprised in at least one of the M first-type time-frequency resource blocks in frequency domain.

In one embodiment, the positive integer number of subcarrier(s) comprised in time-frequency resources occupied by the first reference signal in frequency domain belong to the positive integer number of subcarrier(s) comprised in at least one of the M first-type time-frequency resource blocks in frequency domain.

In one embodiment, the positive integer number of subcarrier(s) comprised in at least one of the M first-type time-frequency resource blocks in frequency domain belongs (belong) to the positive integer number of subcarrier(s) comprised in time-frequency resources occupied by the first reference signal in frequency domain.

In one embodiment, at least one of the positive integer number of PRB(s) comprised in at least one of the M first-type time-frequency resource blocks in frequency domain is the same as one of the positive integer number of PRB(s) comprised in time-frequency resources occupied by the first reference signal in frequency domain.

In one embodiment, the positive integer number of PRB(s) comprised in time-frequency resources occupied by the first reference signal in frequency domain belongs (belong) to the positive integer number of PRB(s) comprised in at least one of the M first-type time-frequency resource blocks in frequency domain.

In one embodiment, the positive integer number of PRB(s) comprised in at least one of the M first-type time-frequency resource blocks in frequency domain belongs (belong) to the positive integer number of PRB(s) comprised in time-frequency resources occupied by the first reference signal in frequency domain.

In one embodiment, at least one of the positive integer number of subcarrier(s) comprised in time-frequency resources occupied by the first reference signal in frequency domain is different from one of the positive integer number of subcarrier(s) comprised in at least one of the M first-type time-frequency resource blocks in frequency domain; at least one of the positive integer number of multicarrier symbol(s) comprised in time-frequency resources occupied by the first reference signal in time domain is the same as one of the positive integer number of multicarrier symbol(s) comprised in at least one of the M first-type time-frequency resource blocks in time domain.

In one embodiment, at least one of the positive integer number of subcarrier(s) comprised in time-frequency resources occupied by the first reference signal in frequency domain is different from one of the positive integer number of subcarrier(s) comprised in at least one of the M first-type time-frequency resource blocks in frequency domain; the positive integer number of multicarrier symbol(s) comprised in time-frequency resources occupied by the first reference signal in time domain belongs (belong) to the positive integer number of multicarrier symbol(s) comprised in at least one of the M first-type time-frequency resource blocks in time domain.

In one embodiment, at least one of the positive integer number of subcarrier(s) comprised in at least one of the M first-type time-frequency resource blocks in frequency domain is different from one of the positive integer number of subcarrier(s) comprised in time-frequency resources occupied by the first reference signal in frequency domain; the positive integer number of multicarrier symbol(s) comprised in time-frequency resources occupied by the first reference signal in time domain belongs (belong) to the positive integer number of multicarrier symbol(s) comprised in at least one of the M first-type time-frequency resource blocks in time domain.

In one embodiment, at least one of the positive integer number of PRB(s) comprised in time-frequency resources occupied by the first reference signal in frequency domain is different from one of the positive integer number of PRB(s) comprised in at least one of the M first-type time-frequency resource blocks in frequency domain; the positive integer number of multicarrier symbol(s) comprised in time-frequency resources occupied by the first reference signal in time domain belongs (belong) to the positive integer number of multicarrier symbol(s) comprised in at least one of the M first-type time-frequency resource blocks in time domain.

In one embodiment, at least one of the positive integer number of PRB(s) comprised in at least one of the M first-type time-frequency resource blocks in frequency domain is different from one of the positive integer number of PRB(s) comprised in time-frequency resources occupied by the first reference signal in frequency domain; the positive integer number of multicarrier symbol(s) comprised in time-frequency resources occupied by the first reference signal in time domain belongs (belong) to the positive integer number of multicarrier symbol(s) comprised in at least one of the M first-type time-frequency resource blocks in time domain.

In one embodiment, the second signaling is used to schedule a second data block, and the second data block is used to generate the second radio signal.

In one embodiment, the second radio signal comprises the second data block, and the second data block comprises a positive integer number of bit(s).

In one embodiment, the second data block is used to generate the second radio signal, and the second data block comprises a positive integer number of bit(s).

In one embodiment, the second radio signal is obtained after all or partial bits of the second data block is sequentially subjected to TB-level CRC attachment, code-block segmentation, code-block-level CRC attachment, channel coding, rate matching, code-block concatenation, scrambling, modulation, layer mapping, antenna port mapping, mapping to physical resource blocks, baseband signal generation as well as modulation and upconversion.

In one embodiment, the second radio signal is an output after the second data block is sequentially subjected to a modulation mapper, a layer mapper, precoding, an RE mapper and multi-carrier symbol generation.

In one embodiment, the first reference signal comprises a first sequence.

In one embodiment, a first sequence is used to generate the first reference signal.

In one embodiment, the first sequence is a Pseudo-Random Sequence.

In one embodiment, the first sequence is a Low-Peak to Average Power Ratio (Low-PAPR) sequence.

In one embodiment, the first sequence is a Gold sequence.

In one embodiment, the first sequence is an M sequence.

In one embodiment, the first sequence is a Zadeoff-Chu (ZC) sequence.

In one embodiment, first reference signal is obtained after the first sequence is sequentially through Sequence Generation, Discrete Fourier Transform (DFT), Modulation and Resource Element Mapping, and wideband symbol generation.

In one embodiment, first reference signal is obtained after the first sequence is sequentially through sequence generation, resource elements mapping and wideband symbol generation.

In one embodiment, the first sequence is mapped to a positive integer number RE(s).

In one embodiment, the first reference signal comprises an SL Demodulation Reference Signal (DMRS).

In one embodiment, the first reference signal comprises a PSCCH DMRS.

In one embodiment, the first reference signal comprises a PSSCH DMRS.

In one embodiment, the first reference signal comprises an Uplink (UL) DMRS.

In one embodiment, the first reference signal comprises an SL Channel State Information-Reference Signal (SL CSI-RS).

In one embodiment, the first reference signal comprises a UL Sounding Reference Signal (UL SRS).

In one embodiment, the first reference signal comprises a Sidelink Synchronization Signal/Physical Sidelink Broadcast Channel Block (S-SS/PSBCH Block).

In one embodiment, a first threshold pool comprises a positive integer number of first-type threshold(s), and the first threshold is one of the positive integer number of first-type threshold(s) comprised in the first threshold pool.

In one embodiment, the first priority and the second priority are used together to determine the first threshold, and the first threshold is one of the positive integer number of first-type threshold(s) comprised in the first threshold pool.

In one embodiment, the first priority and the second priority are used together to determine the first threshold from the first threshold pool.

In one embodiment, the first threshold is one of the positive integer number of first-type threshold(s) comprised in the first threshold list.

In one embodiment, the first threshold pool comprises 8 first-type threshold lists, and the first threshold list comprises 8 first-type thresholds.

In one embodiment, the first priority is used to determine the first threshold list from the positive integer number of first-type threshold list(s) comprised in the first threshold pool, and the second priority is used to determine the first threshold from the positive integer number of first-type threshold(s) comprised in the first threshold list.

In one embodiment, the first priority indicates an index of the first threshold list in the positive integer number of first-type threshold list(s) comprised in the first threshold pool, and the second priority indicates an index of the first threshold in the positive integer number of first-type threshold(s) comprised in the first threshold list.

In one embodiment, an index of the first threshold in the first threshold pool is equal to a sum of C times the first priority and the second priority plus 1, C being a positive integer.

In one embodiment, an index of the first threshold in the first threshold pool is equal to a sum of C times the second priority and the first priority plus 1, C being a positive integer.

In one embodiment, C is equal to 8.

In one embodiment, C is equal to 10.

In one embodiment, the first reference signal is measured on the fourth time-frequency resource block.

In one embodiment, the phrase of "measuring the first reference signal" comprises measuring the first reference signal on time-frequency resources occupied by the first reference signal.

In one embodiment, the phrase of "measuring the first reference signal" comprises executing a coherent detection based reception on time-frequency resources occupied by the first reference signal, that is, the first node uses the first sequence comprised in the first reference signal to coherently receive a signal on time-frequency resources occupied by the first reference signal, and measures signal energy obtained after the coherent reception.

In one embodiment, the phrase of "measuring the first reference signal" comprises executing a coherent detection based reception on time-frequency resources occupied by the first reference signal, that is, the first node uses the first sequence comprised in the first reference signal to coherently receive a signal on time-frequency resources occupied by the first reference signal, and then linearly averages signal power received on the multiple REs comprised in time-frequency resources occupied by the first reference signal to obtain received power.

In one embodiment, the phrase of "measuring the first reference signal" comprises executing a coherent detection based reception on time-frequency resources occupied by the first reference signal, that is, the first node uses the first sequence comprised in the first reference signal to coherently receive a signal on time-frequency resources occupied by the first reference signal, and then averages received signal energy in time domain and frequency domain to obtain received power.

In one embodiment, the phrase "measuring the first reference signal" comprises executing an energy detection based reception on time-frequency resources occupied by the first reference signal, that is, the first node senses energy of a radio signal on the multiple REs comprised in time-frequency resources occupied by the first reference signal, and averages it on the multiple REs comprised in time-frequency resources occupied by the first reference signal to obtain received power.

In one embodiment, the phrase of "measuring the first reference signal" comprises executing an energy detection based reception on the fourth time-frequency resource block, that is, the first node receives power of a radio signal on the fourth time-frequency resource block, and linearly averages the received signal power to obtain a signal strength indication; the fourth time-frequency resource block comprises time-frequency resources occupied by the first reference signal.

In one embodiment, the phrase of "measuring the first reference signal" comprises executing an energy detection based reception on the fourth time-frequency resource block, that is, the first node senses energy of a radio signal on the fourth time-frequency resource block and averages it on time to obtain a signal strength indication; the fourth time-frequency resource block comprises time-frequency resources occupied by the first reference signal.

In one embodiment, the phrase of "measuring the first reference signal" comprises a blind detection based reception on the fourth time-frequency resource block, that is, the first node receives a signal on the fourth time-frequency resource block and executes decoding operation, and determines whether the decoding is correct according to a CRC bit to obtain channel quality of the first reference signal on time-frequency resources occupied by the first reference signal.

In one embodiment, the measurement performed on the first reference signal is a result after the phrase of "measuring the first reference signal".

In one embodiment, the measurement performed on the first reference signal is a result after executing the measuring the first reference signal.

In one embodiment, the measurement performed on the first reference signal comprises a Signal to Noise Ratio (SNR).

In one embodiment, the measurement performed on the first reference signal comprises a Signal to Interference plus Noise Ratio (SINR).

In one embodiment, the measurement performed on the first reference signal comprises an SL SINR.

In one embodiment, the measurement performed on the first reference signal comprises Reference Signal Receiving Power (RSRP).

In one embodiment, the measurement performed on the first reference signal comprises SL RSRP.

In one embodiment, the measurement performed on the first reference signal comprises Layer 1-RSRP (L1-RSRP).

In one embodiment, the measurement performed on the first reference signal comprises Layer 3-RSRP (L3-RSRP).

In one embodiment, the measurement performed on the first reference signal comprises Reference Signal Receiving Quality (RSRQ).

In one embodiment, the measurement performed on the first reference signal comprises SL RSRQ.

In one embodiment, the measurement performed on the first reference signal comprises an RSSI.

In one embodiment, the measurement performed on the first reference signal comprises an SL Received Signal Strength Indication (RSSI).

In one embodiment, the measurement performed on the first reference signal comprises a Channel Quality Indicator (CQI).

In one embodiment, the measurement performed on the first reference signal comprises an SL CQI.

In one embodiment, the measurement performed on the first reference signal and the first threshold are used together to determine whether the second time-frequency resource block belongs to the first candidate resource pool.

In one embodiment, when a measurement performed on the first reference signal is greater than the first threshold, the second time-frequency resource block does not belong to the first candidate resource pool; when a measurement performed on the first reference signal is less than the first threshold, the second time-frequency resource set belongs to the first candidate resource pool.

In one embodiment, when a measurement performed on the first reference signal is greater than the first threshold, the second time-frequency resource block does not belong to the first candidate resource pool; when a measurement performed on the first reference signal is equal to the first threshold, the second time-frequency resource block does not belong to the first candidate resource pool; when a measurement performed on the first reference signal is less than the first threshold, the second time-frequency resource set belongs to the first candidate resource pool.

In one embodiment, when a measurement performed on the first reference signal is greater than the first threshold, the second time-frequency resource block does not belong to the first candidate resource pool; when a measurement performed on the first reference signal is equal to the first threshold, the second time-frequency resource block belongs to the first candidate resource pool; when a measurement performed on the first reference signal is less than the first threshold, the second time-frequency resource set belongs to the first candidate resource pool.

Embodiment 6B

Figure 6B:
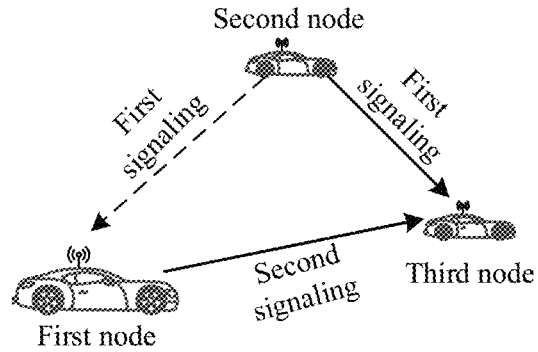
FIG. 6B illustrates a topological structure diagram between a first node, a second node, and a third node according to one embodiment of the present application.

Embodiment 6B illustrates a topology diagram of a first node, a second node and a third node, as shown in FIG. 6B. In FIG. 6B, the arrow represents the transmission direction, the solid arrow points to a target receiver, and the dotted arrow points to a receiver other than a target receiver.

In embodiment 6B, the first node receives a first signaling in the present application in a first time window, the first signaling comprises a first identifier, the first identifier is used to identify a target receiver of the first signaling, and a target receiver of the first signaling comprises the third node; the first node transmits a second signaling on a second time-frequency resource block, the second signaling comprises a second identifier, the second identifier is used to identify a target receiver of the second signaling, and a target receiver of the second signaling comprises the third node.

In one embodiment, a transmitter of the third signaling and a target receiver of the first signaling are co-located.

In one embodiment, a transmitter of the third signaling is the third node in the present application, and a target receiver of the first signaling is also the third node in the present application.

In one embodiment, a transmitter of the third signaling and a target receiver of the first signaling are a same communication node.

In one embodiment, a transmitter of the third signaling and a target receiver of the first signaling are a same UE.

In one embodiment, a backhaul link between a transmitter of the third signaling and a target receiver of the first signaling are ideal (i.e., the delay can be ignored).

In one embodiment, a transmitter of the third signaling and a target receiver of the first signaling share a same set of BaseBand devices.

In one embodiment, a target receiver of the first signaling and a target receiver of the second signaling are co-located.

In one embodiment, a target receiver of the first signaling is the third node in the present application, and a target receiver of the second signaling is the third node in the present application.

In one embodiment, a target receiver of the second signaling and a target receiver of the first signaling are a same communication node.

In one embodiment, a target receiver of the second signaling and a target receiver of the first signaling are a same UE.

In one embodiment, a backhaul link between a target receiver of the second signaling and a target receiver of the first signaling is ideal (i.e., the delay can be ignored).

In one embodiment, a target receiver of the second signaling and a target receiver of the first signaling share a same set of baseband devices.

In one embodiment, a transmitter of the first signaling and a transmitter of the second signaling are non-co-located.

In one embodiment, a transmitter of the first signaling is the second node in the present application, and a transmitter of the second signaling is the first node in the present application.

In one embodiment, a transmitter of the first signaling and a transmitter of the second signaling are respectively two different communication nodes.

In one embodiment, a transmitter of the first signaling and a transmitter of the second signaling are respectively two different UEs.

In one embodiment, a transmitter of the first signaling is a UE, and a transmitter of the second signaling is a relay.

In one embodiment, a Backhaul Link between a transmitter of the first signaling and a transmitter of the second signaling is non-ideal (i.e., a delay cannot be ignored).

In one embodiment, a transmitter of the first signaling and a transmitter of the second signaling do not share a same set of baseband devices.

In one embodiment, a transmitter of the first signaling and a transmitter of the third signaling are non-co-located.

In one embodiment, a transmitter of the first signaling is the second node in the present application, and a transmitter of the third signaling is the third node in the present application.

In one embodiment, a transmitter of the first signaling and a transmitter of the third signaling are respectively two different communication nodes.

In one embodiment, a transmitter of the first signaling and a transmitter of the third signaling are respectively two different UEs.

In one embodiment, a transmitter of the first signaling is a UE, and a transmitter of the third signaling is a relay.

In one embodiment, a Backhaul Link between a transmitter of the first signaling and a transmitter of the third signaling is non-ideal (i.e., a delay cannot be ignored).

In one embodiment, a transmitter of the first signaling and a transmitter of the third signaling do not share a same set of baseband devices.

In one embodiment, the first identifier is used to identify the third node.

In one embodiment, the second identifier is used to identify the third node.

In one embodiment, the first identifier is used to identify a target receiver of the first signaling.

In one embodiment, the second identifier is used to identify a target receiver of the second signaling.

In one embodiment, the first identifier is one of X1 first-type identifier (identifiers), X1 being a positive integer.

In one embodiment, the second identifier is one of X1 first-type identifier (identifiers), X1 being a positive integer.

In one embodiment, a number of bit(s) occupied by the first identifier is configurable.

In one embodiment, a number of bit(s) occupied by the second identifier is configurable.

In one embodiment, X1 is a positive integer equal to 2 to the 16th power, and the first identifier comprises 16 bits.

In one embodiment, X1 is a positive integer equal to 2 to the 16th power, and the second identifier comprises 16 bits.

In one embodiment, X1 is a positive integer equal to 2 to the 8th power, and the first identifier comprises 8 bits.

In one embodiment, X1 is a positive integer equal to 2 to the 8th power, and the second identifier comprises 8 bits.

In one embodiment, any of the X1 first-type identifier (identifiers) is a non-negative integer.

In one embodiment, the first ID comprises 16 bits, and the second ID comprises 16 bits.

In one embodiment, the first ID comprises 16 bits, and the second ID comprises 8 bits.

In one embodiment, any of the X1 first-type identifier (identifiers) is used to identify a receiver of a radio signal.

In one embodiment, any of the X1 first-type identifier (identifiers) comprises (comprise) a Destination Identifier (ID).

In one embodiment, any of the X1 first-type identifier (identifiers) comprises (comprise) a Layer-1 destination ID.

In one embodiment, any of the X1 first-type identifier (identifiers) comprises (comprise) a layer-1 source ID.

In one embodiment, any of the X1 first-type identifier (identifiers) comprises (comprise) a source ID.

In one embodiment, the first identifier is used to identify a first UE group, the first UE group comprises a positive integer number of UE(s), and the third node is a UE in the first UE group.

In one embodiment, the second identifier is used to identify a second UE group, the second UE group comprises a positive integer number of UE(s), and the third node is a UE in the second UE group.

In one embodiment, the first identifier comprises a Radio Network Temporary Identifier (RNTI).

In one embodiment, the first identifier comprises a Cell-Radio Network Temporary Identifier (C-RNTI).

In one embodiment, the first identifier comprises a Temporary Cell Radio Network Temporary Identifier (TC-RNTI).

In one embodiment, the first identifier comprises an International Mobile Subscriber Identifier (IMSI).

In one embodiment, the second identifier is an RNTI.

In one embodiment, the second identifier is a C-RNTI.

In one embodiment, the second identifier comprises a TC-RNTI.

In one embodiment, the second identifier comprises an IMSI.

Embodiment 7A

Figure 7A:
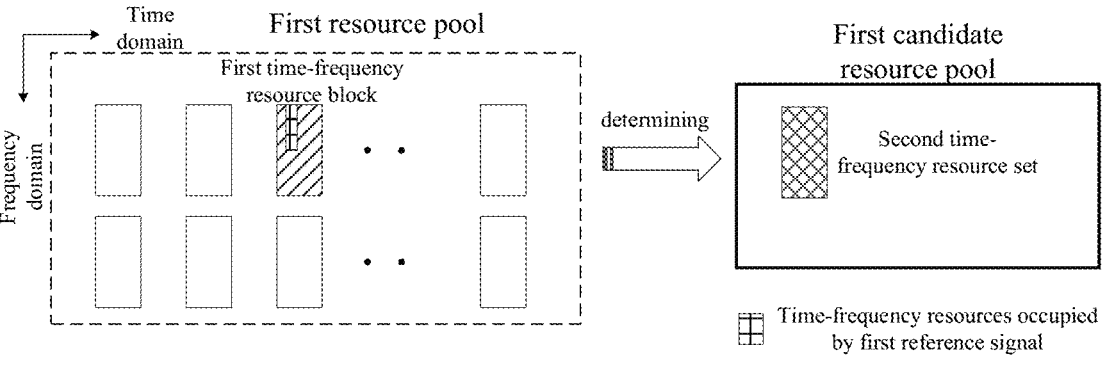
FIG. 7A illustrates a schematic diagram of relations among a first resource pool, a first time-frequency resource block, time-frequency resources occupied by a first reference signal, a second time-frequency resource block and a first candidate resource pool according to one embodiment of the present application.

Embodiment 7A illustrates a schematic diagram of relations among a first resource pool, a first time-frequency resource block, time-frequency resources occupied by a first reference signal, a second time-frequency resource block and a first candidate resource pool according to one embodiment of the present application, as shown in FIG. 7A. In FIG. 7A, the dotted box represents a first resource pool in the present application; the rectangle in the dotted box represents M first-type time-frequency resource blocks in a first resource pool; the slash-filled rectangle represents a first time-frequency resource block in the present application; the square-filled thin rectangle represents time-frequency resources occupied by a first reference signal in the present application; the thick solid box represents a first candidate resource pool in the present application; the oblique-square filled rectangle represents a second time-frequency resource block in the present application.

In embodiment 7A, the first resource pool comprises the M first-type time-frequency resource blocks; the first time-frequency resource block is a first-type time-frequency resource block being overlapped with time-frequency resources occupied by the first reference signal among the M first-type time-frequency resource blocks; the second time-frequency resource block is associated with the first time-frequency resource block; a measurement performed on the first reference signal and a first threshold in the present application are used together to determine whether the second time-frequency resource block belongs to the first candidate resource pool.

In one embodiment, a first time-frequency resource block is a time-frequency resource block in the M first-type time-frequency resource blocks comprised in the first resource pool.

In one embodiment, the first time-frequency resource block has an overlapping with time-frequency resources occupied by the first reference signal.

In one embodiment, the first time-frequency resource block is a first-type time-frequency resource block being overlapped with time-frequency resources occupied by the first reference signal among the M first-type time-frequency resource blocks.

In one embodiment, at least one of multiple REs comprised in the first time-frequency resource block is the same as one of the multiple REs comprised in time-frequency resources occupied by the first reference signal.

In one embodiment, at least one of the positive integer number of multicarrier symbol(s) comprised in the first time-frequency resource block in time domain is the same as one of the positive integer number of multicarrier symbol(s) comprised in time-frequency resources occupied by the first reference signal in time domain.

In one embodiment, a slot occupied by the first time-frequency resource block in time domain comprises one of the positive integer number of multicarrier symbol(s) comprised in time-frequency resources occupied by the first reference signal in time domain.

In one embodiment, at least one of the positive integer number of multicarrier symbol(s) comprised in time-frequency resources occupied by the first reference signal in time domain and the positive integer number of multicarrier symbol(s) comprised in the first time-frequency resource block in time domain belong to a same slot.

In one embodiment, at least one of the positive integer number of subcarrier(s) comprised the first time-frequency resource block in frequency domain is the same as one of the positive integer number of subcarrier(s) comprised in time-frequency resources occupied by the first reference signal in frequency domain.

In one embodiment, the positive integer number of subcarrier(s) comprised in the first time-frequency resource block in frequency domain comprises (comprise) the positive integer number of subcarrier(s) comprised in time-frequency resources occupied by the first reference signal in frequency domain.

In one embodiment, the positive integer number of subcarrier(s) comprised in the first time-frequency resource block in frequency domain belongs (belong) the positive integer number of subcarrier(s) comprised in time-frequency resources occupied by the first reference signal in frequency domain.

In one embodiment, at least one of the positive integer number of subcarrier(s) comprised in time-frequency resources occupied by the first reference signal in frequency domain is different from one of the positive integer number of subcarrier(s) comprised in the first time-frequency resource block in frequency domain; at least one of the positive integer number of multicarrier symbol(s) comprised in time-frequency resources occupied by the first reference signal in time domain is the same as one of the positive integer number of multicarrier symbol(s) comprised in the first time-frequency resource block in time domain.

In one embodiment, the second time-frequency resource block is used for sidelink transmission.

In one embodiment, the second time-frequency resource block comprises a PSCCH.

In one embodiment, the second time-frequency resource block comprises a PSSCH.

In one embodiment, the second time-frequency resource block comprises a PSFCH.

In one embodiment, the second time-frequency resource block comprises multiple REs.

In one embodiment, any of the multiple REs comprised in the second time-frequency resource block occupies a multicarrier symbol in time domain and a subcarrier in frequency domain.

In one embodiment, the second time-frequency resource block comprises a positive integer number of slot(s) in time domain.

In one embodiment, the second time-frequency resource block comprises a positive integer number of multi-carrier symbol(s) in time domain.

In one embodiment, the second time-frequency resource block comprises a positive integer number of sub-carrier(s) in frequency domain.

In one embodiment, the second time-frequency resource block comprises a positive integer number of PRB(s) in frequency domain.

In one embodiment, the second time-frequency resource block comprises a positive integer number of sub-channel(s) in frequency domain.

In one embodiment, the second time-frequency resource block comprises L continuous frequency-domain resource unit(s) in frequency domain.

In one embodiment, the second time-frequency resource block is associated with the first time-frequency resource block.

In one embodiment, the first time-frequency resource block is associated with the second time-frequency resource block.

In one embodiment, the first time-frequency resource block and the second time-frequency resource block are orthogonal.

In one embodiment, the first time-frequency resource block and the second time-frequency resource block are orthogonal in time domain, and the first time-frequency resource block and the second time-frequency resource block occupy same frequency-domain resources.

In one embodiment, the first time-frequency resource block comprises L continuous frequency-domain resource unit(s), the second time-frequency resource block comprises L continuous frequency-domain resource unit(s), and the L continuous frequency-domain resource unit(s) in the first time-frequency resource block is(are) the same as the L continuous frequency-domain resource unit(s) in the second time-frequency resource block.

In one embodiment, the first time-frequency resource block and the second time-frequency resource block are orthogonal in time domain, and the positive integer number of subcarrier(s) occupied by the first time-frequency resource block in frequency domain is(are) the same as the positive integer number of subcarrier(s) occupied by the second time-frequency resource block in frequency domain.

In one embodiment, the first time-frequency resource block and the second time-frequency resource block are orthogonal in time domain, and the first time-frequency resource block and the second time-frequency resource block are orthogonal in frequency domain.

In one embodiment, the first time-frequency resource block and the second time-frequency resource block are two Time Division Multiplexing (TDM) time-frequency resource blocks in a sidelink resource pool.

In one embodiment, the first time-frequency resource block and the second time-frequency resource block are two TDM time-frequency resource blocks in a sidelink receiving resource pool.

In one embodiment, the first time-frequency resource block is earlier than the second time-frequency resource block in time domain.

In one embodiment, the first time-frequency resource block and the second time-frequency resource block are two TDM time-frequency resource blocks in a sidelink resource pool, and the first time-frequency resource block is earlier than the second time-frequency resource block in time domain.

In one embodiment, the second time-frequency resource block and the first time-frequency resource block are spaced by a first time difference in time domain, and the second time-frequency resource block and the first time-frequency resource block occupy same frequency-domain resources.

In one embodiment, the second time-frequency resource block and the first time-frequency resource block are spaced by a first time difference in time domain, and the L continuous frequency-domain resource unit(s) comprised in the second time-frequency resource block in frequency domain is(are) the same as the L continuous frequency-domain resource unit(s) comprised in the first time-frequency resource block in frequency domain.

In one embodiment, the first time difference comprises a positive integer number of time-domain resource unit(s).

In one embodiment, the first time difference comprises a positive integer number of slot(s).

In one embodiment, the first time difference comprises a positive integer number of multicarrier symbol(s).

In one embodiment, the first resource pool comprises a first time-frequency resource group, the first time-frequency resource group comprises multiple first-type time-frequency resource blocks, any two adjacent first-type time-frequency resource blocks in the multiple first-type time-frequency resource blocks comprised in the first time-frequency resource group are spaced at equal intervals in time domain, and the first time-frequency resource block is a first-type time-frequency resource block in the first time-frequency resource group.

In one embodiment, frequency-domain resources occupied by the multiple first-type time-frequency resource blocks comprised in the first time-frequency resource group are all the same.

In one embodiment, the L continuous frequency-domain resource unit(s) comprised in any first-type time-frequency resource block in the first time-frequency resource group in frequency domain is(are) the same as L continuous frequency-domain resource unit(s) comprised in the first time-frequency resource block in the frequency domain.

In one embodiment, the first time-frequency resource block is one of the multiple first-type time-frequency resource blocks comprised in the first time-frequency resource group, the second time-frequency resource block is a time-frequency resource block other than the multiple first-type time-frequency resource blocks comprised in the first time-frequency resource group, and an interval between the second time-frequency resource block and a latest first-type time-frequency resource block in the first time-frequency resource group in time domain is equal to an interval between any two adjacent time-frequency resource blocks in the multiple first-type time-frequency resource blocks comprised in the first time-frequency resource group in time domain.

In one embodiment, the second time-frequency resource block is later than any first-type time-frequency resource block in the first time-frequency resource group in time domain.

In one embodiment, the L continuous frequency-domain resource unit(s) comprised in the second time-frequency resource block in frequency domain is(are) the same as the L continuous frequency-domain resource unit(s) comprised in any first-type time-frequency resource block in the first time-frequency resource group.

In one embodiment, the second time-frequency resource block is later than any first-type time-frequency resource block in the first time-frequency resource group in time domain; the L continuous sub-channel(s) comprised in the second time-frequency resource block in frequency domain is(are) the same as the L continuous sub-channel(s) comprised in any first-type time-frequency resource block in the first time-frequency resource group.

In one embodiment, the interval between any two adjacent first-type time-frequency resource blocks in the multiple first-type time-frequency resource blocks comprised in the first time-frequency resource group comprises a positive integer number of multicarrier symbol(s) in time domain.

In one embodiment, the interval between any two adjacent first-type time-frequency resource blocks in the multiple first-type time-frequency resource blocks comprised in the first time-frequency resource group comprises a positive integer number of multicarrier slot(s) in time domain.

In one embodiment, the interval between the second time-frequency resource block and a latest first-type time-frequency resource block in the first time frequency resource group in time domain comprises a positive integer number of multicarrier symbol(s).

In one embodiment, the interval between the second time-frequency resource block and a latest first-type time-frequency resource block in the first time frequency resource group in time domain comprises a positive integer number of slot(s).

In one embodiment, the first time-frequency resource block is used to determine the second time-frequency resource block, and the second time-frequency resource block is associated with the first time-frequency resource block.

In one embodiment, the second time-frequency resource block comprises the L continuous frequency-domain resource unit(s) in the first time-frequency resource block, and the positive integer number of slot(s) comprised in the second time-frequency resource block in time domain is(are) equal to a sum of the positive integer number of slot(s) in the first time-frequency resource block and the first time interval.

In one embodiment, the second time-frequency resource block comprises the L continuous frequency-domain resource unit(s) in the first time-frequency resource block, and the positive integer number of multicarrier symbol(s) comprised in the second time-frequency resource block in time domain is (are respectively) equal to a sum of the positive integer number of multicarrier symbol(s) in the first time-frequency resource block and the first time interval.

In one embodiment, the second time-frequency resource block belongs to the first candidate resource pool.

In one embodiment, the second time-frequency resource block is one of the N second-type time-frequency resource block(s) comprised in the first candidate resource pool.

In one embodiment, the second time-frequency resource block does not belong to the first candidate resource pool.

In one embodiment, the second time-frequency resource block is different from any of the N second-type time-frequency resource block(s) comprised in the first candidate resource pool.

Embodiment 7B

Figures 7B, 8A:
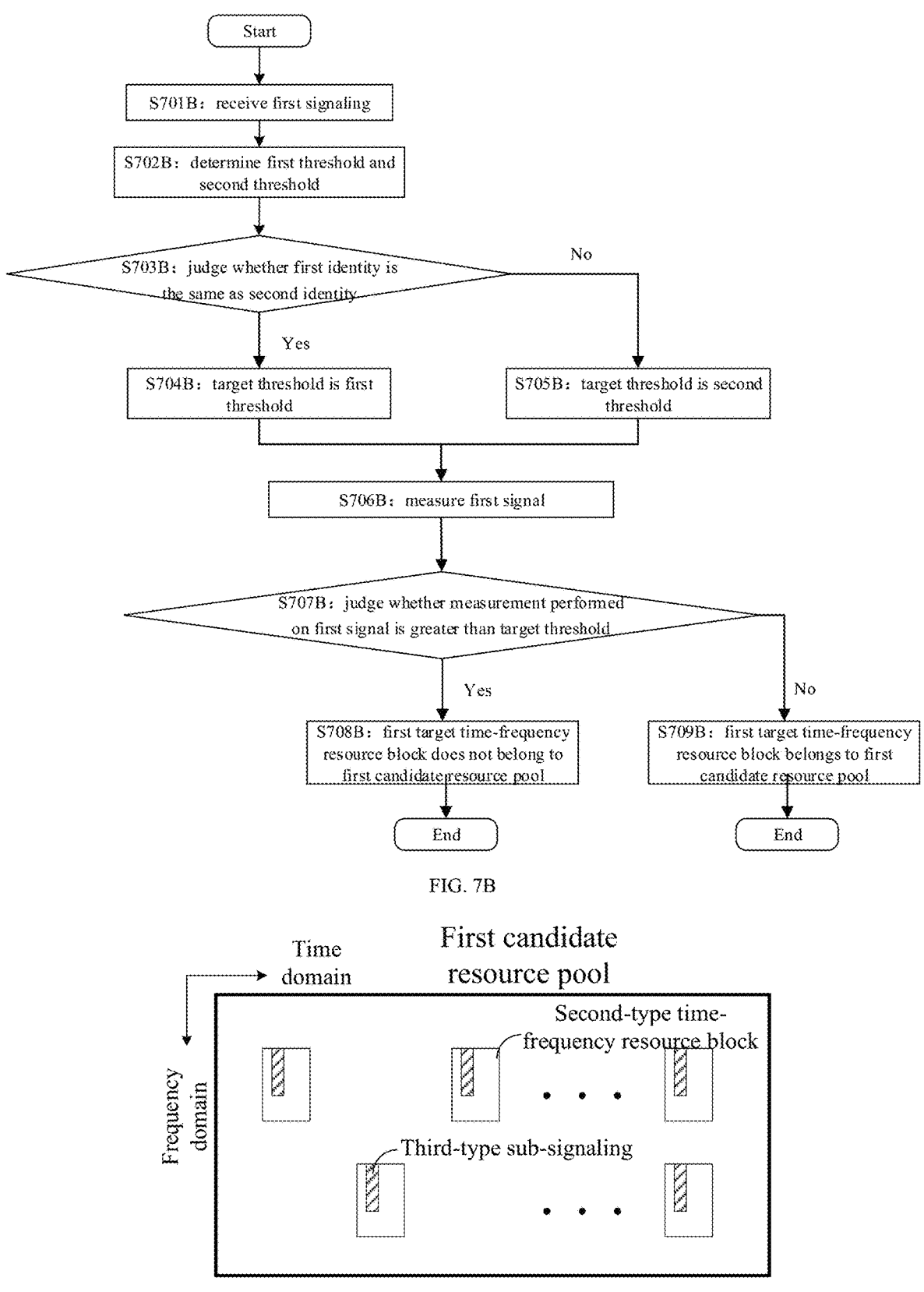
FIG. 7B illustrates a flowchart of determining a first candidate resource pool according to one embodiment of the present application.
FIG. 8A illustrates a schematic diagram of relations among a first candidate resource pool, N second-type time-frequency resource block(s) and N third-type sub-signaling (s) according to one embodiment of the present application.

Embodiment 7B illustrates a flowchart of determining a first candidate resource pool according to one embodiment of the present application, as shown in FIG. 7B. In FIG. 7B, receive a first signaling in step S701B; determine a first threshold and a second threshold in step S702B; judge whether a first identifier is the same as a second identifier in step S703B; when the first identifier is the same as the second identifier, execute step S704B, and a target threshold is a first threshold; when the first identifier is different from the second identifier, execute step S705B, and a target threshold is a second threshold; and then in step S706B, measure a first signal; in step S707B judge whether a measurement performed on a first signal is greater than a target threshold; when a measurement performed on a first signal is greater than a target threshold, execute step S708B, and a first target time-frequency resource block does not belong to a first candidate resource pool; when a measurement performed on a first signal is not greater than a target threshold, execute step S709B, and a first target time-frequency resource block belongs to a first candidate resource pool.

In embodiment 7B, the first signaling comprises a first priority and a first identifier; the first priority and the second priority in the present application are used together to determine a first threshold, and the first priority and the second priority are used together to determine a second threshold; whether the first identifier and the second identifier in the present application are the same is used to determine that a target threshold is one of the first threshold or the second threshold; the first threshold is less than the second threshold.

In one embodiment, a first threshold pool comprises a positive integer number of first-type threshold(s), and the first threshold is one of the positive integer number of first-type threshold(s) comprised in the first threshold pool.

In one embodiment, a first threshold pool comprises a positive integer number of first-type threshold(s), the first threshold and the second threshold are respectively two of the positive integer number of first-type thresholds comprised in the first threshold pool, and the first threshold is less than the second threshold.

In one embodiment, a first threshold pool comprises a positive integer number of first-type threshold(s), the first threshold is one of the positive integer number of first-type threshold(s) comprised in the first threshold pool, and the second threshold is different from any of the positive integer number of first-type threshold(s) comprised in the first threshold pool.

In one embodiment, the first priority and the second priority are used together to determine the first threshold from the first threshold pool, and the first priority and the second priority are used together to determine the second threshold from the first threshold pool.

In one embodiment, the first priority and the second priority are used together to determine an index of the first threshold in the positive integer number of first-type threshold(s) comprised in the first threshold pool, and the first priority and the second priority are used together to determine an index of the second threshold in the positive integer number of first-type threshold(s) comprised in the first threshold pool.

In one embodiment, the first priority and the second priority are used together to determine the first threshold from the first threshold pool, and the first threshold and the first offset value are used together to determine the second threshold.

In one embodiment, the first priority and the second priority are used together to determine the second threshold from the first threshold pool, and the second threshold and the first offset value are used together to determine the first threshold.

In one embodiment, the second threshold is a sum of the first threshold and the first offset value.

In one embodiment, the second threshold is a product of the first threshold and the first offset value.

In one embodiment, the first threshold is a difference value of the threshold and the first offset value.

In one embodiment, the first threshold is a quotient of the second threshold and the first offset value.

In one embodiment, the first priority and the second priority are used together to determine an index of the first threshold in the positive integer number of first-type threshold(s) comprised in the first threshold pool, and the first threshold and the first offset value are used together to determine the second threshold.

In one embodiment, the first priority and the second priority are used together to determine an index of the second threshold in the positive integer number of first-type threshold(s) comprised in the first threshold pool, and the second threshold and the first offset value are used together to determine the first threshold.

In one embodiment, a first threshold pool comprises a positive integer first-type threshold(s), a second threshold pool comprises a positive integer second-type threshold(s), the first threshold is one of the positive integer first-type threshold(s) comprised in the first threshold pool, and the second threshold is one of the positive integer second-type threshold(s) comprised in the second threshold pool.

In one embodiment, the positive integer number of first-type threshold(s) comprised in the first threshold corresponds (respectively correspond) to the positive integer number of second-type threshold(s) comprised in the second threshold pool.

In one embodiment, a first candidate threshold is any of the positive integer number of first-type threshold(s) comprised in the first threshold pool, a second candidate threshold is a second-type threshold corresponding to the first candidate threshold among the positive integer number of second-type threshold(s) comprised in the second threshold pool, and the first candidate threshold is less than the second candidate threshold.

In one embodiment, a first candidate threshold value is any of the positive integer number of first-type threshold(s) comprised in the first threshold pool, and a second candidate threshold value is a second-type threshold value corresponding to the first candidate threshold value among the positive integer number of second-type threshold(s) comprised in the second threshold pool, and an index of the first candidate threshold in the first threshold pool is the same as an index of the second candidate threshold in the second threshold pool.

In one embodiment, the first priority and the second priority are used together to determine the first threshold from the first threshold pool, and the first priority and the second priority are used together to determine the second threshold from the second threshold pool.

In one embodiment, the first priority and the second priority are used together to determine an index of the first threshold among the positive integer number of first-type threshold(s) comprised in the first threshold pool, and the first priority and the second priority are used together to determine an index of the second threshold among the positive integer number of second-type threshold(s) comprised in the second threshold pool.

In one embodiment, the first priority and the second priority are used together to determine a first index, the first index is used to indicate the first threshold from the first threshold pool, and the first index is used to indicate the second threshold from the second threshold pool.

In one embodiment, the first priority and the second priority are used together to determine a first index, the first index is used to indicate the first threshold from the first threshold pool, and a sum of the first index and the first offset value is used to indicate the second threshold from the second threshold pool.

In one embodiment, the first priority and the second priority are used together to determine a second index, the second index is used to indicate the second threshold from the second threshold pool, and a difference value between the second index and the first offset value is used to indicate the first threshold from the first threshold pool.

In one embodiment, the first priority and the second priority are used together to determine a first index, the first index indicates a position of the first threshold among the positive integer number of first-type threshold(s) comprised in the first threshold pool, and the first index indicates a position of the second threshold among the positive integer number of second-type threshold(s) comprised in the second threshold pool.

In one embodiment, the first priority and the second priority are used together to determine a first index, the first index indicates a position of the first threshold among the positive integer number of first-type threshold(s) comprised in the first threshold pool, and a sum of the first index and the first offset value indicates a position of the second threshold among the positive integer number of second-type threshold(s) comprised in the second threshold pool.

In one embodiment, the first priority and the second priority are used together to determine a second index, the second index is used to indicate the second threshold from the second threshold pool, and a difference value between the second index and the first offset value is used to indicate the first threshold from the first threshold pool.

In one embodiment, an index of the first threshold in the first threshold pool is equal to a sum of C times the first priority and the second priority then plus 1, C being a positive integer.

In one embodiment, an index of the second threshold in the second threshold pool is equal to a sum of C times the first priority and the second priority then plus 1, C being a positive integer.

In one embodiment, an index of the first threshold in the first threshold pool is equal to a sum of C times the second priority and the first priority then plus 1, C being a positive integer.

In one embodiment, an index of the second threshold in the second threshold pool is equal to a sum of C times the second priority and the first priority then plus 1, C being a positive integer.

In one embodiment, C is equal to 8.

In one embodiment, C is equal to 10.

In one embodiment, the first threshold pool comprises a positive integer number of first-type threshold list(s), and any of the positive integer number of first-type threshold list(s) comprises a positive integer number of first-type threshold(s).

In one embodiment, a first threshold list is one of the positive integer number of first-type threshold list(s) comprised in the first threshold pool, and a first threshold is one of a positive integer number of first-type threshold(s) comprised in the first threshold list; the first priority is used to determine the first threshold list from the first threshold pool, and the second priority is used to determine the first threshold from the first threshold list.

In one embodiment, a first threshold list is one of the positive integer number of first-type threshold list(s) comprised in the first threshold pool, and a first threshold is one of a positive integer number of first-type threshold(s) comprised in the first threshold list; the first priority indicates an index of the first threshold list in the positive integer number of first-type threshold list(s) comprised in the first threshold pool, and the second priority indicates an index of the first threshold in the positive integer number of first-type threshold(s) comprised in the first threshold list.

In one embodiment, a first threshold list is one of the positive integer number of first-type threshold list(s) comprised in the first threshold pool, and a first threshold is one of a positive integer number of first-type threshold(s) comprised in the first threshold list; a second threshold list is one of the positive integer number of first-type threshold list(s) comprised in the first threshold pool, the second threshold list is different from the first threshold list, and a second threshold is one of the positive integer number of first-type threshold(s) comprised in the second threshold list; the first priority is used to indicate the first threshold list and the second threshold list from the first threshold pool, the second priority is used to indicate the first threshold from the first threshold list, and the second priority is used to indicate the second threshold from the second threshold list.

In one embodiment, a first threshold list is one of the positive integer number of first-type threshold list(s) comprised in the first threshold pool, and a first threshold and a second threshold are respectively two different first-type thresholds in a positive integer number of first-type thresholds comprised in the first threshold list; the first priority is used to indicate the first threshold list from the first threshold pool, and the second priority is used to indicate the first threshold and the second threshold from the first threshold list.

In one embodiment, the first threshold pool comprises a positive integer number of first-type threshold list(s), and any of the positive integer number of first-type threshold list(s) comprises a positive integer number of first-type threshold(s); the second threshold pool comprises a positive integer number of second-type threshold list(s), and any of the positive integer number of second-type threshold list(s) comprises a positive integer second-type threshold(s).

In one embodiment, a first threshold list is one of the positive integer number of first-type threshold list(s) comprised in the first threshold pool, and a first threshold is one of a positive integer number of first-type threshold(s) comprised in the first threshold list; a second threshold list is one of the positive integer number of second-type threshold list(s) comprised in the second threshold pool, the second threshold list is different from the first threshold list, and a second threshold is one of a positive integer number of second-type threshold(s) comprised in the second threshold list; the first priority is used to indicate the first threshold list and the second threshold list from the first threshold pool, the second priority is used to indicate the first threshold from the first threshold list, and the second threshold is a sum of the first threshold and the first offset value.

In one embodiment, a first threshold list is one of the positive integer number of first-type threshold list(s) comprised in the first threshold pool, and a first threshold is one of a positive integer number of first-type threshold(s) comprised in the first threshold list; a second threshold list is one of the positive integer number of second-type threshold list(s) comprised in the second threshold pool, the second threshold list is different from the first threshold list, and a second threshold is one of a positive integer number of second-type threshold(s) comprised in the second threshold list; the first priority is used to indicate the first threshold list and the second threshold list from the first threshold pool, the second priority is used to indicate the second threshold from the second threshold list, and the first threshold is a difference value of the second threshold and the first offset value.

In one embodiment, the first threshold is measured by dBm.

In one embodiment, the first threshold is measured by dB.

In one embodiment, the first threshold is measured by mW.

In one embodiment, the first threshold is measured by W.

In one embodiment, the second threshold is measured by dBm.

In one embodiment, the second threshold is measured by dB.

In one embodiment, the second threshold is measured by mW.

In one embodiment, the second threshold is measured by W.

In one embodiment, the first threshold pool comprises 64 first-type thresholds.

In one embodiment, the second threshold pool comprises 64 second-type thresholds.

In one embodiment, any first-type threshold in the first threshold pool is a non-positive integer.

In one embodiment, any first-type threshold in the second threshold pool is a non-positive integer.

In one embodiment, any first-type threshold in the first threshold pool is $(-128+(n-1)\times2)$ dBm, n being a positive integer not greater than 65.

In one embodiment, any second-type threshold in the second threshold pool is $(-128+(n-1)\times2)$ dBm, n being a positive integer not greater than 65.

In one embodiment, any first-type threshold in the first threshold pool is one of minus infinity dBm, $(-128+(n-1)\times2)$ dBm, or, infinity dBm, n being a positive integer not greater than 65.

In one embodiment, any second-type threshold in the second threshold pool is one of minus infinity dBm, $(-128+(n-1)\times2)$ dBm, or, infinity dBm, n being a positive integer not greater than 65.

In one embodiment, the first threshold pool comprises [−infinity dBm, −128 dBm, −126 dBm, . . . , 0 dBm, infinity dBm].

In one embodiment, the second threshold pool comprises [−infinity dBm, −128 dBm, −126 dBm, . . . , 0 dBm, infinity dBm].

In one embodiment, any two adjacent first-type thresholds other than a first one of first-type thresholds and a last one of first-type thresholds in the first threshold pool differ by 2 dB.

In one embodiment, any two adjacent second-type thresholds other than a first one of second-type thresholds and a last one of second-type thresholds in the second threshold pool differ by 2 dB.

In one embodiment, the first threshold pool comprises 8 first-type threshold lists, and the first threshold list comprises 8 first-type thresholds.

In one embodiment, the second threshold pool comprises 8 second-type threshold lists, and the second threshold list comprises 8 second-type thresholds.

In one embodiment, the first candidate resource pool belongs to the first resource pool.

In one embodiment, the first candidate resource pool comprises partial resources in an SL resource pool.

In one embodiment, a first candidate resource pool comprises N second-type time-frequency resource block(s), any of the N second-type time-frequency resource block(s) comprised in the first candidate resource pool comprises multiple REs, N being a positive integer.

In one embodiment, any of the N second-type time-frequency resource block(s) comprised in the first candidate resource pool comprises L continuous frequency-domain resource unit(s) in frequency domain.

In one embodiment, any of the N second-type time-frequency resource block(s) comprised in the first candidate resource pool comprises L continuous sub-channel(s) in frequency domain.

In one embodiment, the N second-type time-frequency resource block(s) comprised in the first candidate resource pool is (are respectively) later than any first-type time-frequency resource block in the first time window.

In one embodiment, any of the N second-type time-frequency resource block(s) comprised in the first candidate resource pool is associated with one of the M first-type time-frequency resource blocks.

In one embodiment, L continuous frequency-domain resource unit(s) comprised in any of the N second-type time-frequency resource block(s) comprised in the first candidate resource pool in frequency domain is(are) the same as L continuous frequency-domain resource unit(s) comprised in one of the M first-type time-frequency resource blocks in frequency domain.

In one embodiment, a positive integer number of multi-carrier symbol(s) comprised in any of the N second-type time-frequency resource block(s) comprised in the first candidate resource pool is (are respectively) differs by a first-type time interval from a positive integer number of multicarrier symbol(s) comprised in one of the M first-type time-frequency resource blocks in time domain; L continuous frequency-domain resource unit(s) comprised in any of the N second-type time-frequency resource block(s) comprised in the first candidate resource pool in frequency domain is(are) the same as L continuous frequency-domain resource unit(s) comprised in one of the M first-type time-frequency resource blocks in frequency domain.

In one embodiment, the first-type time interval comprises a positive integer number of slot(s).

In one embodiment, the first-type time interval comprises a positive integer number of multicarrier symbol(s).

In one embodiment, a measurement performed on the first signal is a result after the phrase of "measuring a first signal".

In one embodiment, a measurement performed on the first signal is a result after executing measuring a first signal.

In one embodiment, a measurement performed on the first signal comprises a Signal to Noise Ratio (SNR).

In one embodiment, a measurement performed on the first signal comprises a Signal to Interference plus Noise Ratio (SINR).

In one embodiment, a measurement performed on the first signal comprises an SL SINR.

In one embodiment, a measurement performed on the first signal comprises Reference Signal Receiving Power (RSRP).

In one embodiment, a measurement performed on the first signal comprises SL RSRP.

In one embodiment, a measurement performed on the first signal comprises Layer 1-RSRP (L1-RSRP).

In one embodiment, a measurement performed on the first signal comprises Layer 3-RSRP (L3-RSRP).

In one embodiment, a measurement performed on the first signal comprises Reference Signal Receiving Quality (RSRQ).

In one embodiment, a measurement performed on the first signal comprises SL RSRQ.

In one embodiment, a measurement performed on the first signal comprises an RSSI.

In one embodiment, a measurement performed on the first signal comprises an SL Received Signal Strength Indication (RSSI).

In one embodiment, a measurement performed on the first signal comprises a Channel Quality Indicator (CQI).

In one embodiment, a measurement performed on the first signal comprises an SL CQI.

In one embodiment, a measurement performed on the first signal and the target threshold are used together to determine whether the target time-frequency resource block belongs to the first candidate resource pool.

In one embodiment, when a measurement performed on the first signal is greater than the target threshold, the first target time-frequency resource block does not belong to the first candidate resource pool; when a measurement performed on the first signal is less than the target threshold, the first target time-frequency resource set belongs to the first candidate resource pool.

In one embodiment, when a measurement performed on the first signal is greater than the target threshold, the first target time-frequency resource block does not belong to the first candidate resource pool; when a measurement performed on the first signal is equal to the target threshold, the first target time-frequency resource block does not belong to the first candidate resource pool; when a measurement performed on the first signal is less than the target threshold, the first target time-frequency resource set belongs to the first candidate resource pool.

In one embodiment, when a measurement performed on the first signal is greater than the target threshold, the first target time-frequency resource block does not belong to the first candidate resource pool; when a measurement performed on the first signal is equal to the target threshold, the first target time-frequency resource block belongs to the first candidate resource pool; when a measurement performed on the first signal is less than the target threshold, the first target time-frequency resource set belongs to the first candidate resource pool.

Embodiment 8A

Embodiment 8A illustrates a schematic diagram of relations among a first candidate resource pool, N second-type time-frequency resource block(s) and N third-type sub-signaling(s) according to one embodiment of the present application, as shown in FIG. 8A. In FIG. 8A, the thick solid box represents a first candidate resource pool in the present application; the unfilled rectangle represents one of N second-type time-frequency resource block(s) in the present application; the slash-filled rectangle represents one of N third-type sub-signaling(s) in the present application.

In embodiment 8A, the first candidate resource pool comprises N second-type time-frequency resource block(s); the third signaling comprises N third-type sub-signaling(s); the N third-type sub-signaling(s) is (are respectively) transmitted on the N second-type time-frequency resource block(s) comprised in the first candidate resource pool.

In one embodiment, the N third-type sub-signaling(s) corresponds (respectively correspond) to the N second-type time-frequency resource block(s) comprised in the first candidate resource pool.

In one embodiment, the N third-type sub-signaling(s) is (are respectively) associated with the N second-type time-frequency resource block(s) comprised in the first candidate resource pool.

In one embodiment, an association relation between any of the N third-type sub-signaling(s) and one of the N second-type time-frequency resource block(s) comprised in the first candidate resource pool is configurable.

In one embodiment, an association relation between any of the N third-type sub-signaling(s) and one of the N second-type time-frequency resource block(s) comprised in the first candidate resource pool is pre-configured.

In one embodiment, the N third-type sub-signaling(s) indicates (respectively indicate) the N second-type time-frequency resource block(s) comprised in the first candidate resource pool.

In one embodiment, any of the N third-type sub-signaling(s) indicates time-domain resources occupied by any of the N second-type time-frequency resource block(s) comprised in the first candidate resource pool.

In one embodiment, any of the N third-type sub-signaling(s) indicates frequency-domain resources occupied by any of the N second-type time-frequency resource block(s) comprised in the first candidate resource pool.

In one embodiment, the N third-type sub-signaling(s) is (are respectively) N SCI(s).

In one embodiment, the N third-type sub-signaling(s) is (are respectively) N $1^{st}$-stage SCI(s).

In one embodiment, the N third-type sub-signaling(s) is (are respectively) transmitted on N PSCCH(s).

In one embodiment, the N third-type sub-signaling(s) is (are respectively) N HARQ.

In one embodiment, any of the N third-type sub-signaling(s) is one of HARQ-ACK or HARQ-NACK.

In one embodiment, the N third-type sub-signaling(s) is (are respectively) N SL HARQ.

In one embodiment, the N third-type sub-signaling(s) is (are respectively) N PSFCH(s).

In one embodiment, the N third-type sub-signaling(s) is (are respectively) transmitted on N PSFCH(s).

In one embodiment, any of the N third-type sub-signaling(s) comprises the first priority.

Embodiment 8B

Embodiment 8B illustrates a schematic diagram of relations among a first resource pool, a first time window, a first time-frequency resource block, time-frequency resources occupied by a first signal and a first target time-frequency

US 12,568,471 B2

Figure 8B:
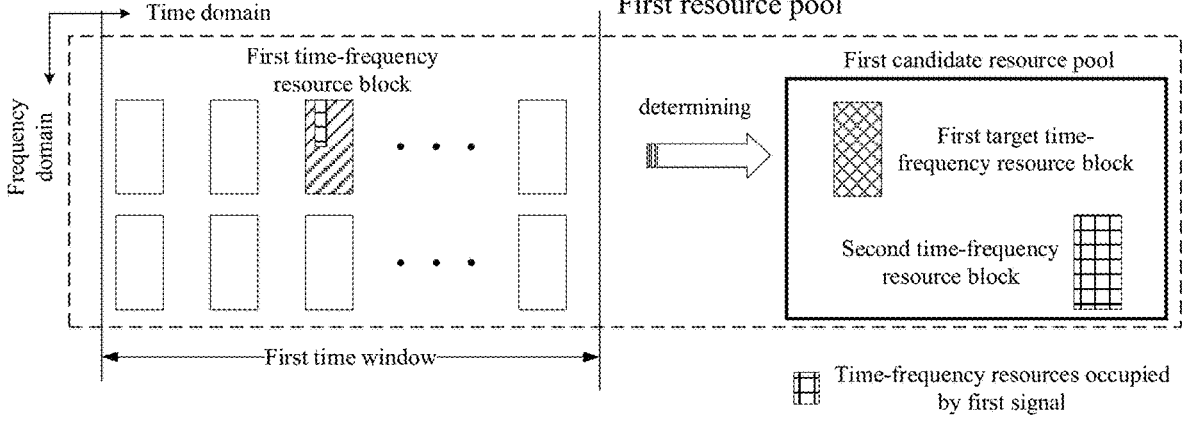
FIG. 8B illustrates a schematic diagram of relations among a first resource pool, a first time window, a first time-frequency resource block, time-frequency resources occupied by a first signal and a first target time-frequency resource block, a second time-frequency resource block and a first candidate resource pool according to one embodiment of the present application.

73 resource block, a second time-frequency resource block and a first candidate resource pool according to one embodiment of the present application, as shown in FIG. 8B. In FIG. 8B, the dotted rectangle represents a first resource pool in the present application; time domain between the two vertical solid lines represents a first time window in the present application; the rectangle between two vertical solid lines represents M first-type time-frequency resource blocks in a first resource pool; the slash-filled rectangle represents a first time-frequency resource block in the present application; the thin rectangle filled with squares represents time-frequency resources occupied by a first signal in the present application; the thick solid box represents a first candidate resource pool in the present application; the cross-line-filled rectangle represents a first target time-frequency resource block in the present application; the square-filled rectangle represents a second time-frequency resource block in the present application.

In embodiment 8B, the first time-frequency resource block is a first-type time-frequency resource block in the first time window, the first time-frequency resource block is associated with a first target time-frequency resource block, the target threshold is used to determine whether the first target time-frequency resource block belongs to a first candidate resource pool, the first candidate resource pool comprises a positive integer number of second-type time-frequency resource block(s), and the second time-frequency resource block is a second-type time-frequency resource block in the first candidate resource pool.

In one embodiment, the first target time-frequency resource block belongs to the first candidate resource pool.

In one embodiment, the first target time-frequency resource block does not belong to the first candidate resource pool.

In one embodiment, the first target time-frequency resource block is the same as one of the N second-type time-frequency resource block(s) comprised in the first candidate resource pool.

In one embodiment, the first target time-frequency resource block belongs to the first resource pool, and the first target time-frequency resource block is different from any of the N second-type time-frequency resource block(s) comprised in the first candidate resource pool.

In one embodiment, the first time-frequency resource block is associated with the first target time-frequency resource block.

In one embodiment, the first target time-frequency resource block is associated with the first time-frequency resource block.

In one embodiment, the first time-frequency resource block is associated with the first target time-frequency resource block.

In one embodiment, the first time-frequency resource block and the first target time-frequency resource block are orthogonal.

In one embodiment, the first time-frequency resource block and the first target time-frequency resource block are orthogonal in time domain, and the first time-frequency resource block and the first target time-frequency resource block occupy same frequency-domain resources.

In one embodiment, the first time-frequency resource block comprises L continuous frequency-domain resource unit(s), the first target time-frequency resource block comprises L continuous frequency-domain resource unit(s), and the L continuous frequency-domain resource unit(s) in the first time-frequency resource block is(are) the same as the L continuous frequency-domain resource unit(s) in the first target time-frequency resource block.

In one embodiment, the first time-frequency resource block and the first target time-frequency resource block are orthogonal in time domain, and the positive integer number of subcarrier(s) occupied by the first time-frequency resource block infrequency domain is(are) the same as the positive integer number of subcarrier(s) occupied by the first target time-frequency resource block in frequency domain.

In one embodiment, the first time-frequency resource block and the first target time-frequency resource block are orthogonal in time domain, and the first time-frequency resource block and the first target time-frequency resource block are orthogonal in frequency domain.

In one embodiment, the first time-frequency resource block and the first target time-frequency resource block are two Time Division Multiplexing (TDM) time-frequency resource blocks in the first resource pool.

In one embodiment, both the first time-frequency resource block and the first target time-frequency resource block belong to the first resource pool, and the first time-frequency resource block and the first target time-frequency resource block are TDM.

In one embodiment, the first time-frequency resource block is a first-type time-frequency resource block in the first resource pool, and the first target time-frequency resource block is a second-type time-frequency resource block in the first resource pool.

In one embodiment, the first time-frequency resource block is earlier than the first target time-frequency resource block in time domain.

In one embodiment, the first time-frequency resource block is a first-type time-frequency resource block in the first resource pool, the first target time-frequency resource block is a second-type time-frequency resource block in the first resource pool, and the first time-frequency resource block is earlier than the first target time-frequency resource block in time domain.

In one embodiment, the first time-frequency resource block is a first-type time-frequency resource block in the first time window, and the first target time-frequency resource block is a second-type time-frequency resource block other than the first time window.

In one embodiment, the first target time-frequency resource block and the first time-frequency resource block are spaced by a first time difference in time domain, and the first target time-frequency resource block and the first time-frequency resource block occupy same frequency-domain resources.

In one embodiment, the first target time-frequency resource block and the first time-frequency resource block are spaced by a first time difference in time domain, and the L continuous frequency-domain resource unit(s) comprised in the first target time-frequency resource block in frequency domain is(are) the same as the L continuous frequency-domain resource unit(s) comprised in the first time-frequency resource block in frequency domain.

In one embodiment, the first time difference comprises a positive integer number of time-domain resource unit(s).

In one embodiment, the first time difference comprises a positive integer number of slot(s).

In one embodiment, the first time difference comprises a positive integer number of multicarrier symbol(s).

In one embodiment, the first resource pool comprises a first time-frequency resource group, the first time-frequency resource group comprises multiple first-type time-frequency resource blocks, any two adjacent first-type time-frequency resource blocks in the multiple first-type time-frequency resource blocks comprised in the first time-frequency resource group are spaced at equal intervals in time domain, and the first time-frequency resource block is a first-type time-frequency resource block in the first time-frequency resource group.

In one embodiment, frequency-domain resources occupied by the multiple first-type time-frequency resource blocks comprised in the first time-frequency resource group are all the same.

In one embodiment, the L continuous frequency-domain resource unit(s) comprised in any first-type time-frequency resource block in the first time-frequency resource group in frequency domain are the same as L continuous frequency-domain resource unit(s) comprised in the first time-frequency resource block in frequency domain.

In one embodiment, the first time-frequency resource block is one of the multiple first-type time-frequency resource blocks comprised in the first time-frequency resource group, the first target time-frequency resource block is a second-type time-frequency resource block in the first resource pool, and an interval between the first target time-frequency resource block and a latest first-type time-frequency resource block in the first time-frequency resource group in time domain and an interval between any two adjacent time-frequency resource blocks in the multiple first-type time-frequency resource blocks comprised in the first time-frequency resource group in time domain are equal.

In one embodiment, the first target time-frequency resource block is later than any first-type time-frequency resource block in the first time-frequency resource group in time domain.

In one embodiment, the L continuous frequency-domain resource unit(s) comprised in the first target time-frequency resource block in frequency domain is(are) the same as the L continuous frequency-domain resource unit(s) comprised in any first-type time-frequency resource block in the first time-frequency resource group.

In one embodiment, the first target time-frequency resource block is later than any first-type time-frequency resource block in the first time-frequency resource group in time domain; the L continuous sub-channel(s) comprised in the first target time-frequency resource block in frequency domain is(are) the same as the L continuous sub-channel(s) comprised in any first-type time-frequency resource block in the first time-frequency resource group.

In one embodiment, the interval between any two adjacent first-type time-frequency resource blocks in the multiple first-type time-frequency resource blocks comprised in the first time-frequency resource group comprises a positive integer number of multicarrier symbol(s) in time domain.

In one embodiment, the interval between any two adjacent first-type time-frequency resource blocks in the multiple first-type time-frequency resource blocks comprised in the first time-frequency resource group comprises a positive integer number of slot(s) in time domain.

In one embodiment, the interval between the first target time-frequency resource block and a latest first-type time-frequency resource block in the first time frequency resource group in time domain comprises a positive integer number of multicarrier symbol(s).

In one embodiment, the interval between the first target time-frequency resource block and a latest first-type time-frequency resource block in the first time frequency resource group in time domain comprises a positive integer number of slot(s).

Embodiment 9A

Figure 9A:
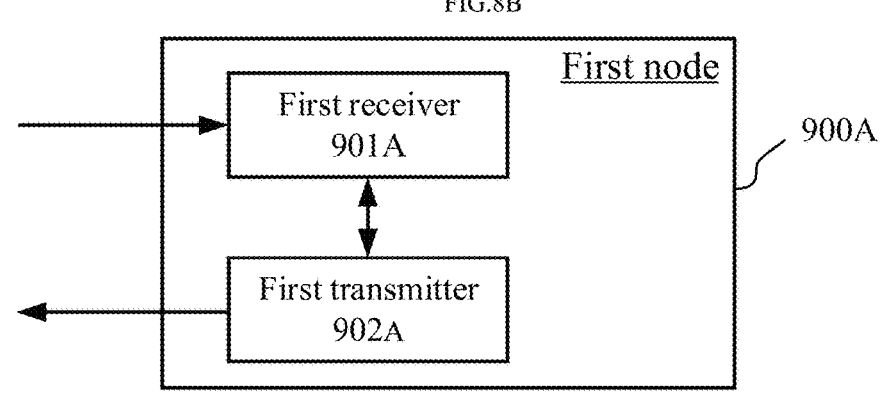
FIG. 9A illustrates a structure block diagram of a processor in a first node according to one embodiment of the present application.

Embodiment 9A illustrates a structure block diagram of a processor in first node according to one embodiment of the present application, as shown in FIG. 9A. In Embodiment 9A, a processor 900A in a first node mainly consists of a first receiver 901A and a first transmitter 902A.

In one embodiment, the first receiver 901A comprises at least one of the antenna 452, the transmitter/receiver 454, the multi-antenna receiving processor 458, the receiving processor 456, the controller/processor 459, the memory 460 or the data source 467 in FIG. 4 of the present application.

In one embodiment, the first transmitter 902A comprises at least one of the antenna 452, the transmitter/receiver 454, the multi-antenna transmitting processor 457, the transmitting processor 468, the controller/processor 459, the memory 460, or the data source 467 in FIG. 4 of the present application.

In embodiment 9A, the first receiver 901A receives a first signaling, and executes channel sensing in a first resource pool; the first transmitter 902A transmits a third signaling; the first resource pool comprises M first-type time-frequency resource blocks, any of the M first-type time-frequency resource blocks occupies L continuous frequency-domain resource unit(s) in frequency domain, M being a positive integer greater than 1, L being a positive integer; the first signaling indicates L, and the first signaling comprises a first priority; the channel sensing comprises receiving a second signaling, the second signaling comprises a second priority, the second signaling indicates time-frequency resources occupied by a first reference signal, at least one of the M first-type time-frequency resource blocks is overlapped with time-frequency resources occupied by the first reference signal; a first time-frequency resource block is a first-type time-frequency resource block overlapping with time-frequency resources occupied by the first reference signal among the M first-type time-frequency resource blocks; a transmitter of the first signaling and a transmitter of the second signaling are non-co-located; the first priority and the second priority are used together to determine a first threshold; the channel sensing comprises measuring a first reference signal, a measurement performed on the first reference signal and the first threshold are used together to determine whether a second time-frequency resource block belongs to a first candidate resource pool, and the second time-frequency resource block is associated with the first time-frequency resource block; the first candidate resource pool comprises N second-type time-frequency resource block(s), and any of the N second-type time-frequency resource block(s) is associated with one of the M first-type time-frequency resource blocks, N being a positive integer; the third signaling is used to indicate the first candidate resource pool.

In one embodiment, the first receiver 901A monitors a fourth signaling in a first receiving resource pool, and receives a first radio signal on a third time-frequency resource block; the first receiving resource pool comprises X third-type time-frequency resource block(s), and the third time-frequency resource block is one of the X third-type time-frequency resource block(s); the fourth signaling indicates the third time-frequency resource block, and the fourth signaling comprises the first priority; the N second-type time-frequency resource block(s) comprised in the first candidate resource pool is (are respectively) associated with N third-type time-frequency resource block(s) in the first receiving resource pool, X being a positive integer not less than N.

In one embodiment, the third signaling comprises N third-type sub-signaling(s); the N third-type sub-signaling(s) is (are respectively) transmitted on the N second-type time-frequency resource block(s) comprised in the first candidate resource pool.

In one embodiment, the first receiver 901A receives a target signaling; the target signaling comprises a first field, and the first field in the target signaling indicates one of a positive integer number of first-type value(s) or a positive integer number of second-type value(s); when the first field in the target signaling indicates one of a positive integer number of first-type value(s), the target signaling is the first signaling, and the target signaling is used to trigger a transmission of the third signaling; when the second field in the target signaling indicates one of the positive integer number of second-type value(s), the target signaling is the second signaling, the target signaling is used to schedule a second data block, the second data block is used to generate a second radio signal, and the second radio signal comprises the first reference signal.

In one embodiment, the first node 900A is a UE.

In one embodiment, the first node 900A is a relay node.

In one embodiment, the first node 900A is a base station.

Embodiment 9B

Figure 9B:
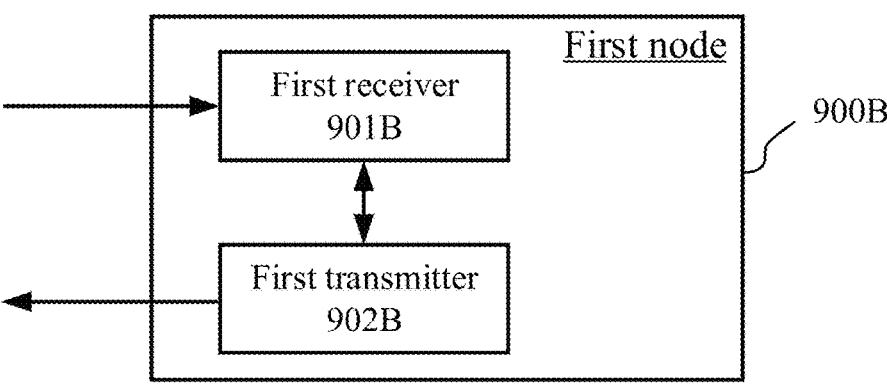
FIG. 9B illustrates a structure block diagram of a processor in a first node according to one embodiment of the present application.

Embodiment 9B illustrates a structure block diagram of a processor in a first node, as shown in FIG. 9B. In Embodiment 9B, a processor 900B of a first node mainly consists of a first receiver 901B and a first transmitter 902B.

In one embodiment, the first receiver 901B comprises at least one of the antenna 452, the transmitter/receiver 454, the multi-antenna receiving processor 458, the receiving processor 456, the controller/processor 459, the memory 460 or the data source 467 in FIG. 4 of the present application.

In one embodiment, the first transmitter 902B comprises at least one of the antenna 452, the transmitter/receiver 454, the multi-antenna transmitting processor 457, the transmitting processor 468, the controller/processor 459, the memory 460, or the data source 467 in FIG. 4 of the present application.

In embodiment 9B, the first receiver 901B receives a first signaling in a first time window; the first transmitter 902B transmits a second signaling and a second signal on a second time-frequency resource block; the first signaling comprises a first priority and a first identifier, the first signaling indicates a first time-frequency resource block, and the first time-frequency resource block is a first-type time-frequency resource block in the first time window; the second signaling comprises a second priority and a second identifier, and the second signaling indicates the second time-frequency resource block; a first bit block is used to generate the second signal; the first priority and the second priority are used together to determine a first threshold, and the first priority and the second priority are used together to determine a second threshold; when the first identifier is the same as the second identifier, a target threshold is the first threshold; when the first identifier is different from the second identifier, a target threshold is the second threshold; the first time-frequency resource block is associated with a first target time-frequency resource block, and the target threshold is used to determine whether the first target time-frequency resource block belongs to a first candidate resource pool; the first candidate resource pool comprises a positive integer number of second-type time-frequency resource block(s), and the second time-frequency resource block is a second-type time-frequency resource block in the first candidate resource pool.

In one embodiment, the first threshold is less than second threshold.

In one embodiment, the first identifier is used to identify a target receiver of the first signaling; the second identifier is used to identify a target receiver of the second signaling.

In one embodiment, the first receiver 901B measures a first signal on the first time-frequency resource block; when a measurement performed on the first signal is greater than the target threshold, the first target time-frequency resource block does not belong to the first candidate resource pool; when a measurement performed on the first signal is not greater than the target threshold, the first target time-frequency resource block belongs to the first candidate resource pool.

In one embodiment, the first receiver 901B receives a third signaling; the third signaling is used to indicate a first offset value, and the second threshold is a difference value of the first threshold and the first offset value.

In one embodiment, the first node 900B is a UE.

In one embodiment, the first node 900B is a relay node.

In one embodiment, the first node 900B is a base station.

Embodiment 10A

Figures 10A, 10B, 11A, 11B:
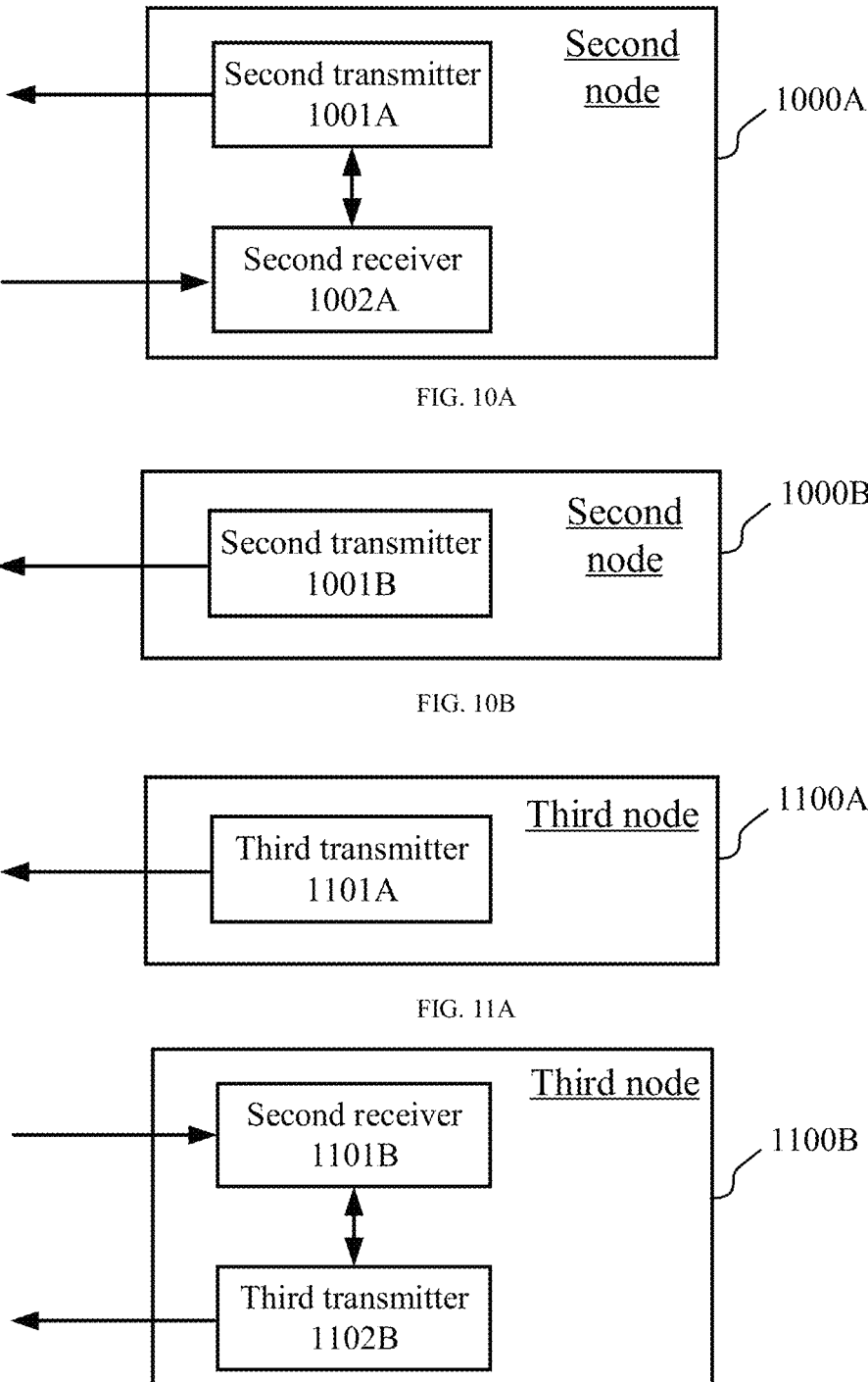
FIG. 10A illustrates a structure block diagram of a processor in a second node according to one embodiment of the present application.
FIG. 10B illustrates a structure block diagram of a processor in a second node according to one embodiment of the present application.
FIG. 11A illustrates a structure block diagram of a processor in a third node according to one embodiment of the present application.
FIG. 11B illustrates a structure block diagram of a processor in a third node according to one embodiment of the present application.

Embodiment 10A illustrates a structure block diagram of a processor in a first node, as shown in FIG. 10A. In FIG. 10A, a processor 1000A of a second node mainly consists of a second transmitter 1001A and a second receiver 1002A.

In one embodiment, the second transmitter 1001A comprises at least one of the antenna 420, the transmitter/receiver 418, the multi-antenna transmitting processor 471, the transmitting processor 416, the controller/processor 475 or the memory 476 in FIG. 4 of the present application.

In one embodiment, the second receiver 1002A comprises at least one of the antenna 420, the transmitter/receiver 418, the multi-antenna receiving processor 472, the receiving processor 470, the controller/processor 475 or the memory 476 in FIG. 4 of the present application.

In embodiment 10A, the second transmitter 1001A transmits a first signaling; the second receiver 1002A receives a third signaling; the first signaling comprises a first priority, and the first priority is a priority of a first data block; time-frequency resources reserved for the first data block comprise L continuous frequency-domain resource unit(s) in frequency domain, and the first signaling is used to indicate L, L being a positive integer; the first signaling is not used to schedule the first data block; the third signaling indicates a first candidate resource pool, and the first candidate resource pool comprises N second-type time-frequency resource block(s), N being a positive integer.

In one embodiment, the second transmitter 1001A transmits a fourth signaling, and transmits a first radio signal on a third time-frequency resource block; the fourth signaling comprises the first priority, the fourth signaling is used to indicate the third time-frequency resource block, and the third time-frequency resource block comprises L continuous frequency-domain resource unit(s) in frequency domain; the third time-frequency resource block is associated with a second time-frequency resource block, and the second time-frequency resource block is one of the N second-type time-frequency resource block(s) comprised in the first candidate resource pool; the first data block is used to generate the first radio signal.

In one embodiment, the third signaling comprises N third-type sub-signaling(s); the N third-type sub-signaling(s) is (are respectively) received on the N second-type time-frequency resource block(s) comprised in the first candidate resource pool.

In one embodiment, the first signaling comprises a first field, the first field in the first signaling indicates one of a positive integer number of first-type value(s), and the first signaling is used to trigger a reception of the third signaling.

In one embodiment, the second node 1000A is a UE.

In one embodiment, the second node 1000A is a relay node.

In one embodiment, the second node 1000A is a base station.

Embodiment 10B

Embodiment 10B illustrates a structure block diagram of a processor in a second node, as shown in FIG. 10B. In FIG. 10B, a processor 1000B of a second node mainly consists of a second transmitter 1001B.

In one embodiment, the second transmitter 1001B comprises at least one of the antenna 420, the transmitter/receiver 418, the multi-antenna transmitting processor 471, the transmitting processor 416, the controller/processor 475 or the memory 476 in FIG. 4 of the present application.

In embodiment 10B, the second transmitter 1001B transmits a first signaling in a first time window; the second transmitter 1001 transmits a first signal on a first time-frequency resource block; the first signaling comprises a first priority and a first identifier, the first signaling indicates a first time-frequency resource block, and the first time-frequency resource block is a first-type time-frequency resource block in the first time window; the first priority is used to determine a first threshold and a second threshold; the first identifier is used to determine that a target threshold is one of the first threshold or the second threshold; the first time-frequency resource block is associated with a first target time-frequency resource block, and the target threshold and a measurement performed on the first signal are used together to determine whether the first target time-frequency resource block belongs to a first candidate resource pool; the first candidate resource pool comprises a positive integer number of second-type time-frequency resource block(s).

In one embodiment, the first threshold is less than the second threshold.

In one embodiment, the first identifier is used to identify a target receiver of the first signaling.

In one embodiment, when a measurement performed on the first signal is greater than the target threshold, the first target time-frequency resource block does not belong to the first candidate resource pool; when a measurement performed on the first signal is not greater than the target threshold, the first target time-frequency resource block belongs to the first candidate resource pool.

In one embodiment, a difference value between the second threshold and the first threshold is a first offset value, and the first offset value is indicated by a third signaling; a transmitter of the third signaling is a target receiver of the first signaling.

In one embodiment, the second node 1000B is a UE.

In one embodiment, the second node 1000B is a relay node.

In one embodiment, the second node 1000B is a base station.

Embodiment 11A

Embodiment 11A illustrates a structure block diagram of a processor in a third node, as shown in FIG. 11A. In FIG. 11A, a processor 1100A of a third node mainly consist of a third transmitter 1101A.

In one embodiment, the third transmitter 1001A comprises at least one of the antenna 420, the transmitter/receiver 418, the multi-antenna transmitting processor 471, the transmitting processor 416, the controller/processor 475 or the memory 476 in FIG. 4 of the present application.

In embodiment 11A, the third transmitter 1001A transmits a second signaling and a first reference signal; the second signaling comprises a second priority, and the second signaling indicates time-frequency resources occupied by the first reference signal; the second signaling comprises a first field, the first field in the second signaling indicates one of a positive integer number of second-type value(s), the second signaling is used to schedule a second data block, the second data block is used to generate a second radio signal, and the second radio signal comprises the first reference signal.

In one embodiment, the third node 1100A is a UE.

In one embodiment, the third node 1100A is a relay node.

In one embodiment, the third node 1100A is a base station.

Embodiment 11B

Embodiment 11B illustrates a structure block diagram of a processor in a third node, as shown in FIG. 11B. In FIG. 11B, a processor 1100 in a third node mainly consists of a second receiver 1101B and a third transmitter 1102B.

In one embodiment, the second receiver 1101B comprises at least one of the antenna 420, the transmitter/receiver 418, the multi-antenna receiving processor 472, the receiving processor 470, the controller/processor 475 or the memory 476 in FIG. 4 of the present application.

In one embodiment, the third transmitter 1102B comprises at least one of the antenna 420, the transmitter/receiver 418, the multi-antenna transmitting processor 471, the transmitting processor 416, the controller/processor 475 or the memory 476 in FIG. 4 of the present application.

In embodiment 11B, the second receiver 1101B receives a first signaling in a first time window; the second receiver 1101B receives a second signaling and a second signal on a second time-frequency resource block; the first signaling comprises a first priority and a first identifier, the first signaling indicates a first time-frequency resource block, and the first time-frequency resource block is a first-type time-frequency resource block in the first time window; the second signaling comprises a second priority and a second identifier, and the second identifier is used to identify the third node; the second signaling indicates the second time-frequency resource block; a first bit block is used to generate the second signal; the first priority and the second priority are used together to determine a first threshold, and the first priority and the second priority are used together to determine a second threshold; when the first identifier is used to identify the third node, a target threshold is the first threshold; when the first identifier is not used to identify the third node, a target threshold is the second threshold; the first time-frequency resource block is associated with a first target time-frequency resource block, and the target threshold is used to determine whether the first target time-frequency resource block belongs to a first candidate resource pool; the first candidate resource pool comprises a positive integer number of second-type time-frequency resource block(s), and the second time-frequency resource block is a second-type time-frequency resource block in the first candidate resource pool.

In one embodiment, the first threshold is less than the second threshold.

In one embodiment, the second receiver 1101B receives a first signal on the first time-frequency resource block; the first signaling is used to schedule the first signaling, and the received first signal is used to determine a first offset value.

In one embodiment, the third transmitter 1102B transmits a third signaling; the third signaling is used to indicate the first offset value, and the first offset value is a difference value between the second threshold and the first threshold.

In one embodiment, the third node 1100B is a UE.

In one embodiment, the third node 1100B is a relay node.

In one embodiment, the third node 1100B is a base station.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The UE or terminal in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present application includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A first node for wireless communications, comprising:
a first receiver, receiving a first signaling; executing channel sensing in a first resource pool; and
a first transmitter, transmitting a third signaling;
wherein the first resource pool comprises M first-type time-frequency resource blocks, any of the M first-type time-frequency resource blocks occupies L continuous frequency-domain resource unit(s) in frequency domain, M being a positive integer greater than 1, L being a positive integer; the first signaling indicates L, and the first signaling comprises a first priority; the channel sensing comprises receiving a second signaling, the second signaling comprises a second priority, the second signaling indicates time-frequency resources occupied by a first reference signal, at least one of the M first-type time-frequency resource blocks is overlapped with time-frequency resources occupied by the first reference signal; a first time-frequency resource block is a first-type time-frequency resource block overlapping with time-frequency resources occupied by the first reference signal among the M first-type time-frequency resource blocks; a transmitter of the first signaling and a transmitter of the second signaling are non-co-located; the first priority and the second priority are used together to determine a first threshold; the channel sensing comprises measuring a first reference signal, a measurement performed on the first reference signal and the first threshold are used together to determine whether a second time-frequency resource block belongs to a first candidate resource pool, and the second time-frequency resource block is associated with the first time-frequency resource block; the first candidate resource pool comprises N second-type time-frequency resource block(s), and any of the N second-type time-frequency resource block(s) is associated with one of the M first-type time-frequency resource blocks, N being a positive integer; the third signaling is used to indicate the first candidate resource pool.

2. The first node according to claim 1, wherein a transmitter of the first signaling and a transmitter of the second signaling are respectively two different communication nodes.

3. The first node according to claim 1, wherein the first priority is a priority of the first data block, the second priority is a priority of the second data block, the first data block is generated by a transmitter of the first signaling, and the second data block is generated by a transmitter of the second signaling.

4. The first node according to claim 1, wherein the channel sensing comprises receiving the second signaling, measuring the first reference signal, determining the second time-frequency resource block, and judging whether the second time-frequency resource block belongs to the first candidate resource pool.

5. The first node according to claim 1, comprising:
the first receiver, monitoring a fourth signaling in a first receiving resource pool;
a first receiver, receiving a first radio signal on a third time-frequency resource block;
wherein the first receiving resource pool comprises X third-type time-frequency resource block(s), and the third time-frequency resource block is one of the X third-type time-frequency resource block(s); the fourth signaling indicates the third time-frequency resource block, and the fourth signaling comprises the first priority; the N second-type time-frequency resource block(s) comprised in the first candidate resource pool is (are respectively) associated with N third-type time-frequency resource block(s) in the first receiving resource pool, X being a positive integer not less than N.

6. The first node according to claim 5, wherein the N second-type time-frequency resource block(s) comprised in the first candidate resource pool is(are) the same as the N third-type time-frequency resource block(s) comprised in the first receiving resource pool.

7. The first node according to claim 5, wherein any of the N second-type time-frequency resource block(s) comprised in the first candidate resource pool is earlier than any third-type time-frequency resource block in the first receiving resource pool; the L continuous frequency-domain resource unit(s) occupied by any of the N second-type time-frequency resource block(s) comprised in the first candidate resource pool is(are) the same as the L continuous frequency-domain resource unit(s) occupied by a third-type time-frequency resource block comprised in the first receiving resource pool in frequency domain.

8. The first node according to claim 1, wherein the third signaling comprises N third-type sub-signaling(s); the N third-type sub-signaling(s) is (are respectively) transmitted on the N second-type time-frequency resource block(s) comprised in the first candidate resource pool.

9. The first node according to claim 1, wherein
the first receiver, receiving a target signaling;
wherein the target signaling comprises a first field, the first field in the target signaling indicates a value in a first value range or a second value range, the first value range comprises a positive integer number of first-type value(s), and the second value range comprises a positive integer number of second-type value(s);
when the first field in the target signaling indicates a first-type value in the first value range, the target signaling is the first signaling, and the target signaling is used to trigger a transmission of the third signaling;
when the first field in the target signaling indicates a second-type value in the second value range, the target signaling is the second signaling, the target signaling is used to schedule a second radio signal, and the second radio signal comprises the first reference signal.

10. A second node for wireless communications, comprising:
a second transmitter, transmitting a first signaling; and
a second receiver, receiving a third signaling;
wherein the first signaling comprises a first priority, and the first priority is a priority of a first data block; time-frequency resources reserved for the first data block comprise L continuous frequency-domain resource unit(s) in frequency domain, and the first signaling is used to indicate L, L being a positive integer; the first signaling is not used to schedule the first data block; the third signaling indicates a first candidate resource pool, and the first candidate resource pool comprises N second-type time-frequency resource block(s), N being a positive integer.

11. The second node according to claim 10, comprising:
the second transmitter, transmitting a fourth signaling;
the second transmitter, transmitting a first radio signal on a third time-frequency resource block;
wherein the fourth signaling comprises the first priority, the fourth signaling is used to indicate the third time-frequency resource block, and the third time-frequency resource block comprises L continuous frequency-domain resource unit(s) in frequency domain; the third time-frequency resource block is associated with a second time-frequency resource block, and the second time-frequency resource block is one of the N second-type time-frequency resource block(s) comprised in the first candidate resource pool; the first data block is used to generate the first radio signal.

12. The second node according to claim 10, wherein the third signaling comprises N third-type sub-signaling(s); the N third-type sub-signaling(s) is (are respectively) received on the N second-type time-frequency resource block(s) comprised in the first candidate resource pool.

13. The second node according to claim 10, wherein the first signaling comprises a first field, the first field in the first signaling indicates one of a positive integer number of first-type value(s), and the first signaling is used to trigger a reception of the third signaling.

14. A method in a first node for wireless communications, comprising:
receiving a first signaling;
executing channel sensing in a first resource pool; and
transmitting a third signaling;
wherein the first resource pool comprises M first-type time-frequency resource blocks, any of the M first-type time-frequency resource blocks occupies L continuous frequency-domain resource unit(s) in frequency domain, M being a positive integer greater than 1, L being a positive integer; the first signaling indicates L, and the first signaling comprises a first priority; the channel sensing comprises receiving a second signaling, the second signaling comprises a second priority, the second signaling indicates time-frequency resources occupied by a first reference signal, at least one of the M first-type time-frequency resource blocks is overlapped with time-frequency resources occupied by the first reference signal; a first time-frequency resource block is a first-type time-frequency resource block overlapping with time-frequency resources occupied by the first reference signal among the M first-type time-frequency resource blocks; a transmitter of the first signaling and a transmitter of the second signaling are non-co-located; the first priority and the second priority are used together to determine a first threshold; the channel sensing comprises measuring a first reference signal, a measurement performed on the first reference signal and the first threshold are used together to determine whether a second time-frequency resource block belongs to a first candidate resource pool, and the second time-frequency resource block is associated with the first time-frequency resource block; the first candidate resource pool comprises N second-type time-frequency resource block(s), and any of the N second-type time-frequency resource block(s) is associated with one of the M first-type time-frequency resource blocks, N being a positive integer; the third signaling is used to indicate the first candidate resource pool.

15. The method in a first node according to claim 14, wherein the first signaling only carries the first priority and L, and the first signaling does not carry any resource scheduling information.

16. The method in a first node according to claim 14, wherein the first priority is a priority of the first data block, the second priority is a priority of the second data block, the first data block is generated by a transmitter of the first signaling, and the second data block is generated by a transmitter of the second signaling.

17. The method in a first node according to claim 14, wherein the channel sensing comprises receiving the second signaling, measuring the first reference signal, determining the second time-frequency resource block, and judging whether the second time-frequency resource block belongs to the first candidate resource pool.

18. The method in a first node according to claim 14, comprising:
monitoring a fourth signaling in a first receiving resource pool; and receiving a first radio signal on a third time-frequency resource block;

wherein the first receiving resource pool comprises X third-type time-frequency resource block(s), and the third time-frequency resource block is one of the X third-type time-frequency resource block(s); the fourth signaling indicates the third time-frequency resource block, and the fourth signaling comprises the first priority; the N second-type time-frequency resource block(s) comprised in the first candidate resource pool is (are respectively) associated with N third-type time-frequency resource block(s) in the first receiving resource pool, X being a positive integer not less than N.

19. The method in a first node according to claim 18, wherein the N second-type time-frequency resource block(s) comprised in the first candidate resource pool is(are) the same as the N third-type time-frequency resource block(s) comprised in the first receiving resource pool.

20. A method in a second node for wireless communications, comprising:

transmitting a first signaling; and receiving a third signaling;

wherein the first signaling comprises a first priority, and the first priority is a priority of a first data block; time-frequency resources reserved for the first data block comprise L continuous frequency-domain resource unit(s) in frequency domain, and the first signaling is used to indicate L, L being a positive integer; the first signaling is not used to schedule the first data block; the third signaling indicates a first candidate resource pool, and the first candidate resource pool comprises N second-type time-frequency resource block(s), N being a positive integer.

* * * * *